US008600930B2

(12) United States Patent
Sata et al.

(10) Patent No.: US 8,600,930 B2
(45) Date of Patent: Dec. 3, 2013

(54) INFORMATION PROCESSING DEVICE AND INFORMATION PROCESSING METHOD

(75) Inventors: Ichiko Sata, Osaka (JP); Masato Iida, Osaka (JP); Norihide Iida, legal representative, Okayama (JP)

(73) Assignee: Sharp Kabushiki Kaisha, Osaka (JP)

( * ) Notice: Subject to any disclaimer, the term of this patent is extended or adjusted under 35 U.S.C. 154(b) by 158 days.

(21) Appl. No.: 13/055,467

(22) PCT Filed: Jul. 23, 2009

(86) PCT No.: PCT/JP2009/063176
§ 371 (c)(1),
(2), (4) Date: Jan. 24, 2011

(87) PCT Pub. No.: WO2010/010921
PCT Pub. Date: Jan. 28, 2010

(65) Prior Publication Data
US 2011/0231432 A1    Sep. 22, 2011

(30) Foreign Application Priority Data
Jul. 25, 2008   (JP) ................................. 2008-192333

(51) Int. Cl.
*G06F 17/30*   (2006.01)
*G06F 17/00*   (2006.01)

(52) U.S. Cl.
USPC .................. 707/602; 707/899; 704/2; 704/3; 704/4; 704/7

(58) Field of Classification Search
USPC ............................... 707/899; 704/2–10, 277
See application file for complete search history.

(56) References Cited

U.S. PATENT DOCUMENTS

| 4,593,356 | A | 6/1986 | Hashimoto et al. |
| 6,067,510 | A | 5/2000 | Kimura et al. |
| 7,707,026 | B2* | 4/2010 | Liu ................................... 704/7 |
| 7,752,032 | B2* | 7/2010 | Izuha ............................... 704/7 |
| 8,156,109 | B2* | 4/2012 | Kamvar et al. ............... 707/713 |
| 8,239,188 | B2* | 8/2012 | Liu ................................... 704/4 |
| 2006/0241934 | A1 | 10/2006 | Izuha |
| 2008/0059146 | A1 | 3/2008 | Liu |

FOREIGN PATENT DOCUMENTS

| CN | 1855090 A | 11/2006 |
| CN | 101140570 A | 3/2008 |
| JP | 57-27367 A | 2/1982 |

(Continued)

OTHER PUBLICATIONS

Korean Office Action dated Jun. 15, 2012 with English Translation.

*Primary Examiner* — Yicun Wu
(74) *Attorney, Agent, or Firm* — Birch, Stewart, Kolasch & Birch, LLP

(57) ABSTRACT

Provided is a conversation assistance device which enables a user to easily search for a desired content. The conversation assistance device includes an input unit, a memory unit, a processing unit, and an output unit. A template database stored in the memory unit includes a plurality of templates. Each of the templates associates category sentences in a plurality of languages with a keyword. A keyword is specified by one keyword expression and one or more character inputs (keyword reading). When the input unit receives any of the plurality of character inputs, an example sentence selection unit retrieves one of the templates having a keyword corresponding to the input character.

11 Claims, 42 Drawing Sheets

(56) References Cited

FOREIGN PATENT DOCUMENTS

| JP | 9-251462 A | 9/1997 |
| JP | 2002-7390 A | 1/2002 |
| JP | 2004-213146 A | 7/2004 |
| KR | 10-2003-0013814 A | 2/2003 |
| KR | 10-2004-0092829 A | 11/2004 |

* cited by examiner

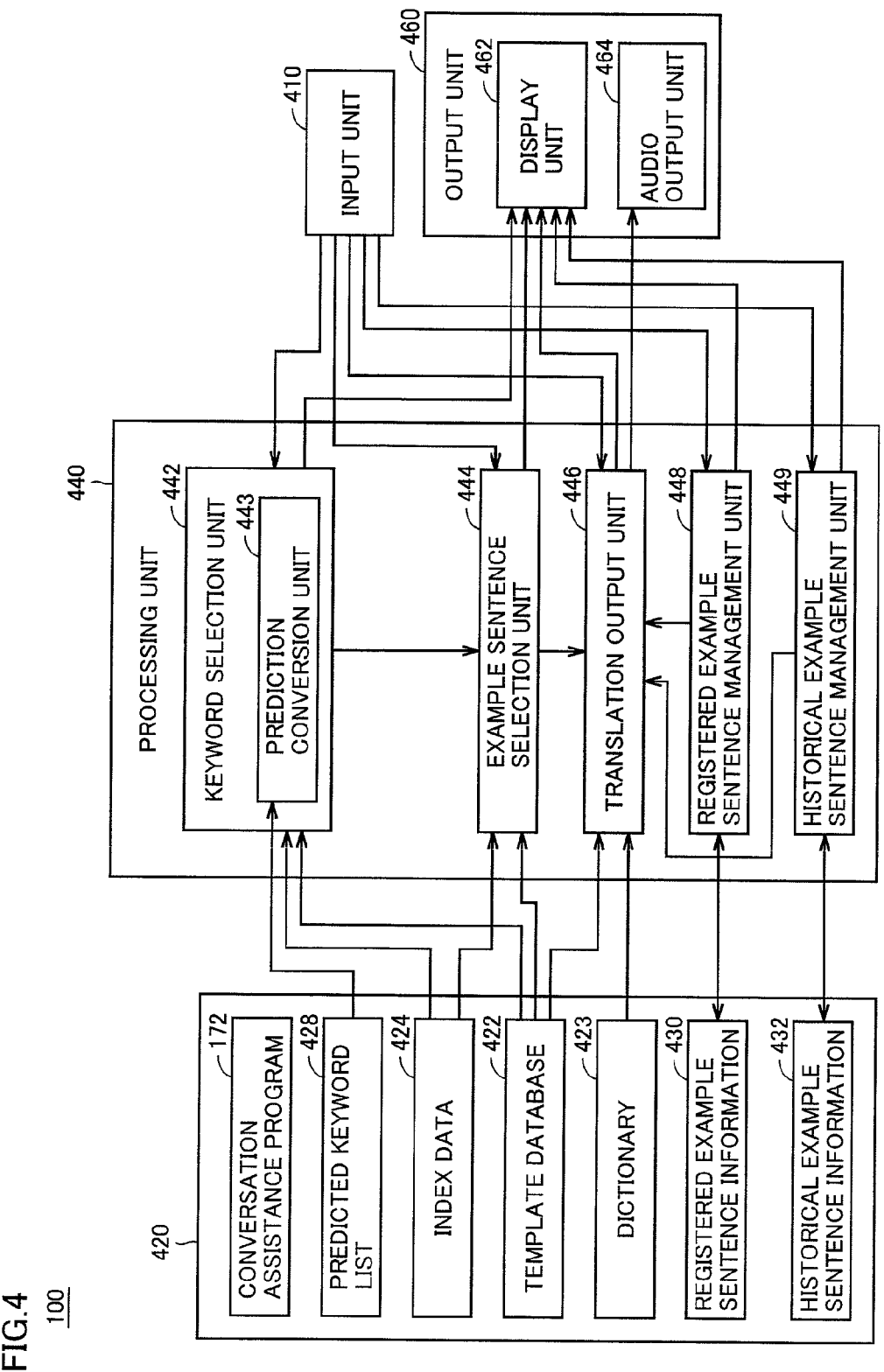

FIG.5

| | | |
|---|---|---|
| 510 | TEMPLATE NUMBER | 10100 |
| 520 | TYPICAL WORD SENTENCE (JAPANESE) | [4:日本]で[3:買え]ない[2:バッグ]は[1:どれ]ですか? |
| 530 | CATEGORY SENTENCE (JAPANESE) | [4:PLACE1]で[3:VB_BUY1+v.kanou]ない[2:GOODS1]は[1:QPRON1]ですか? |
| 540 | TYPICAL WORD SENTENCE (ENGLISH) | [1:Which] [2:bags] can't I [3:buy] in [4:Japan] ? |
| 550 | CATEGORY SENTENCE (ENGLISH) | [1:QPRON1] [2:GOODS1+pl] can't I [3:VB_BUY1+inf] in [4:PLACE1] ? |
| 560 | TYPICAL WORD SENTENCE (CHINESE) | 在[4:日本][3:买]不到的[2:包]是[1:哪个]? |
| 570 | CATEGORY SENTENCE (CHINESE) | 在[4:PLACE1][3:VB_BUY1]不到的[2:GOODS1]是[1:QPRON1]? |
| 580 | KEYWORD | 4:日本=にっぽん,3:買う=かう,2:バッグ=ばっぐ,1:どれ=どれ,ですか |

| | | | 425a |
|---|---|---|---|
| 612 | JAPANESE INPUT | にっぽん | |
| 613 | WORD NUMBER | 2312 | |
| 614 | JAPANESE EXPRESSION | 日本 | |
| 616 | CATEGORY NUMBER | C3001 | |

425b

| JAPANESE INPUT | にほん |
|---|---|
| WORD NUMBER | 2312 |
| JAPANESE EXPRESSION | 日本 |
| CATEGORY NUMBER | C3001 |

425c

| JAPANESE INPUT | ばっぐ |
|---|---|
| WORD NUMBER | 5432 |
| JAPANESE EXPRESSION | バッグ |
| CATEGORY NUMBER | C0010 , C0011 |

(425 brace encompasses 425a, 425b, 425c)

| | | |
|---|---|---|
| 616 | CATEGORY NUMBER | C0010 |
| 510 | TEMPLATE NUMBER | 10100 ,10151 ,10200 |

426b

| CATEGORY NUMBER | C3001 |
|---|---|
| TEMPLATE NUMBER | 10100,17151,18000,18500 |

(426 brace encompasses 426a, 426b)

FIG.7

| CATEGORY NAME | PLACE1 |
|---|---|
| CATEGORY NUMBER | C3001 |

700a

| CATEGORY NAME | GOODS1 |
|---|---|
| CATEGORY NUMBER | C0010 |

| WORD NUMBER | 5432 |
|---|---|
| JAPANESE EXPRESSION | バッグ |
| JAPANESE INPUT | ばっぐ |
| ENGLISH EXPRESSION | bag |
| CHINESE EXPRESSION | 包 |
| CATEGORY NUMBER | C0010,C0011 |

800a

| WORD NUMBER | 2312 |
|---|---|
| JAPANESE EXPRESSION | 日本 |
| JAPANESE INPUT | にほん、にっぽん |
| ENGLISH EXPRESSION | Japan |
| CHINESE EXPRESSION | 日本 |
| CATEGORY NUMBER | C3001 |

| READING | SEARCH RESULT OF (PREFIX MATCH) | | PREDICTED WORDS |
|---|---|---|---|
| | CANDIDATE NUMBER | WORD NUMBER | CANDIDATE |
| あ | 1 | 1024 | ああ |
| あ | 2 | 5213 | アーケード |
| あ | 3 | 2415 | アート |
| ... | | | |
| あ | 964 | 1425 | アンテナ |
| い | 1 | 1542 | 胃 |
| い | 2 | 1295 | 家 |
| い | 3 | 3845 | 位置 |
| ... | | | |
| い | 619 | 552 | 飲料水 |
| ... | | | |
| わ | 1 | 1298 | 輪 |
| わ | 2 | 100 | 私 |
| わ | 3 | 5267 | ワシントン |
| ... | | | |
| わ | 213 | 523 | 湾岸 |
| を | 1 | 6931 | を訪れる |
| を | 2 | 2315 | を貸す |
| を | 3 | 9041 | を連想する |
| ... | | | |
| を | 8 | 4783 | を渡す |
| ん | 1 | 3216 | んだ |
| ん | 2 | 513 | ングラライ国際空港 |
| ん | 3 | 6316 | ンデベレ語 |
| ん | 4 | 589 | ンナムディ・アジキウェ国際空港 |
| しょくじ | 1 | 9312 | 食事 |
| しょくじ | 2 | 7514 | 食事休憩 |
| しょくじ | 3 | 5911 | 食事券 |
| しょくじ | 4 | 2390 | 食事代 |
| しょくじ | 5 | 4256 | 食事の後 |
| しょくじ | 6 | 4257 | 食事の前 |
| みず | 1 | 612 | 水 |
| みず | 2 | 491 | ミズーリ |
| みず | 3 | 492 | ミズーリ州 |
| みず | 4 | 2341 | 水洗い |
| みず | 5 | 43 | 水色 |
| みず | 6 | 44 | 水色の |
| みず | 7 | 4891 | 湖 |
| みず | 8 | 6732 | 水着 |
| みず | 9 | 4328 | 水谷 |
| みず | 10 | 125 | 水谷さん |
| みず | 11 | 26 | 水玉 |
| みず | 12 | 894 | 水玉模様 |
| みず | 13 | 895 | 水玉模様の |
| みず | 15 | 9023 | 水割り |

FIG.10

| READING | SEARCH RESULT OF PREDICTED WORDS (EXACT MATCH) | | |
|---|---|---|---|
| | CANDIDATE NUMBER | WORD NUMBER | CANDIDATE |
| あーかんざす | 1 | 451 | アーカンザス |
| あーかんそー | 1 | 452 | アーカンソー |
| あーかんそーしゅう | 1 | 453 | アーカンソー州 |
| あーけーどげーむ | 1 | 2891 | アーケードゲーム |
| あーちぇりー | 1 | 2873 | アーチェリー |
| あーてぃすと | 1 | 211 | アーティスト |
| あーてぃちょーく | 1 | 711 | アーティチョーク |
| あーもんど | 1 | 725 | アーモンド |
| あーりんとんこくりつぼち | 1 | 477 | アーリントン国立墓地 |
| あにめ | 1 | 3921 | アニメ |
| あに | 1 | 110 | 兄(実兄) |
| あに | 2 | 111 | 兄(義兄・姉の夫) |
| あに | 3 | 112 | 兄(義兄・夫の兄) |
| あに | 4 | 113 | 兄(義兄・嫁の兄) |
| あに | 5 | 114 | 兄(継兄) |
| あね | 1 | 120 | 姉(実姉) |
| あね | 2 | 121 | 姉(義姉・兄の嫁) |
| あね | 3 | 123 | 姉(義姉・夫の姉) |
| あね | 4 | 124 | 姉(義姉・嫁の姉) |
| あね | 5 | 125 | 姉(継姉) |
| ... | | | |
| わるしゃわ | 1 | 481 | ワルシャワ |
| わんたん | 1 | 7762 | ワンタン |
| わんぱくな | 1 | 8291 | わんぱくな |
| わんぴーす | 1 | 2191 | ワンピース |
| をおとずれる | 1 | 9088 | を訪れる |
| をきずつける | 1 | 1213 | を傷つける |
| をたずねる | 1 | 2343 | を訪ねる |
| をだす | 1 | 3293 | を出す |
| をでる | 1 | 3299 | を出る |
| をへこませる | 1 | 9081 | をへこませる |
| をへる | 1 | 8080 | を経る |
| をほうもん | 1 | 3221 | を訪問 |
| んぐららいこくさいくうこう | 1 | 513 | ングラライ国際空港 |
| んでべれご | 1 | 432 | ンデベレ語 |

FIG.11

| INPUT KEYWORD (PREDICTED WORD) | FIRST CANDIDATE IN SEARCH RESULT OF EXAMPLE SENTENCES | FIRST CANDIDATE IN TRANSLATION RESULT | TRANSLATION DICTIONARY DATA ||||| |
|---|---|---|---|---|---|---|---|
| | | | SENTENCE NUMBER | THE NUMBER OF VARIABLE SECTIONS | WORDS FOR VARIABLE SECTION 1 | WORDS FOR VARIABLE SECTION 2 | WORDS FOR VARIABLE SECTION 3 |
| アーカンサス | ■アーカンサスからの便です。 | It's coming from Arkansas. | 4050 | 1 | 18 (451: アーカンサス/Arkansas/401: ロンドン/London/403: アイルランド/Ireland/404: アメリカ/the United States/405: アラブ首長国連邦/United Arab Emirates/406: アルゼンチン/Argentina/407: アンカレッジ/Anchorage/408: イラク/Iraq/409: インド/India/410: オーストラリア/Australia/411: オランダ/Holland/412: カンボジア/Cambodia/413: カメルーン/Cameroon/414: コロンビア/Columbia/415: タンザニア/Tanzania/416: ドイツ/Germany/417: フィジー/Fiji/418: ベトナム/Vietnam/) | | |
| アジアの | ■こちらの_ロアツアーは_ロアジアの_お客様に大変人気です。 | This tour is very popular with our Asian customers. | 5826 | 3 | 2 (11: こちらの/this/12: あちらの/that/) | 2(2331: ツアー/tour/2345: クルーズ/cruise/) | 19 (301: アジアの/Asian/302: アフリカの/African/303: 中東の/Middle Eastern/304: 東アジアの/East Asian/305: 西アジアの/West Asian/306: 南米の/South American/307: 北米の/North American/308: オセアニアの/Oceanian/309: ヨーロッパの/European/310: ペルシャの/Persian/311: 西洋の/Western/312: 日本の/Japanese/313: アメリカの/American/314: ドイツの/German/315: イギリスの/British/316: フランスの/French/317: イタリアの/Italian/318: 韓国の/South Korean/319: 中国の/Chinese/) |
| アジサイ | ■あれ_がロアジサイです。 | That's a hydrangea. | 6867 | 2 | 2 (12: あれ/that/11: これ/this/) | 6 (704: アジサイ/a hydrangea/202: エベレスト山/Mt.Everest/210: ロッキー山脈/the Rocky Mountains/231: モンマルトルの丘/Montmartre/244: モンブラン/MontBlanc/251: エアーズロック/Ayers Rock/) | |
| レストラン | 良い■レストランを教えて頂けますか? | Could you recommend a good restaurant, please? | 2893 | 1 | 3 (1825: レストラン/restaurant/1823: 店/shop/1801: ホテル/hotel/) | | |

430

FIG.12
MENU SCREEN

```
                                              1010
┌──────────────────────────────────────────────────┐
│         CONVERSATION IN SEVEN LANGUAGES I         │
├──┬───────────────────────────────────────────────┤
│ 1│ ♪CONVERSATION ASSISTANCE                       │
│ 2│ JAPANESE-CHINESE-ENGLISH/CHINESE-JAPANESE-ENGLISH DICTIONARY │
│ 3│ ♪TRAVEL CONVERSATION IN ENGLISH                │
│ 4│ ♪TRAVEL CONVERSATION IN ITALIAN                │
│ 5│ ♪TRAVEL CONVERSATION IN FRENCH                 │
│ 6│ ♪TRAVEL CONVERSATION IN SPANISH                │
│ 7│ ♪TRAVEL CONVERSATION IN GERMAN                 │
│ 8│ ♪TRAVEL CONVERSATION IN KOREAN                 │
├──┴───────────────────────────────────────────────┤
│ SELECT CONTENT ETC. WITH [▲] AND [▼] KEYS, AND PRESS DOWN [SEARCH/DETERMINATION] KEY │
└──────────────────────────────────────────────────┘
```

♪SELECT TRAVEL CONVERSATION ASSISTANCE
[SEARCH/DETERMINATION]

① INITIAL SCREEN ← PRESS DOWN CONVERSATION ASSISTANCE KEY

FIG.13

① INITIAL SCREEN　　　MENU SCREEN
　　　　　　　　　　　↑
　　　　　　　　[RETURN]　　　1020　　1023

```
1022─┌ □ CONVERSATION ASSISTANCE [JAPANESE TO ENGLISH]    ▯
1026─┤ KEYWORD?  [_____]
     │
     │
     │   ┌─────────────────────────────┐
1028─┤   │ LANGUAGE MODE               │
     │   │ ■JAPANESE TO ENGLISH        │
     │   │ □JAPANESE TO CHINESE        │
     │   └─────────────────────────────┘
     │
     │ ○ HINT
1024─┤ ● INPUT JAPANESE KEYWORD
     │ ● LANGUAGE MODE CAN BE SWITCHED WITH [SWITCH] KEY (OR IN A SINGLE SENTENCE DISPLAY SCREEN)
     └
```

INPUT "ぺん"　　HANDWRITING PAD
　　↓　　　　　JAPANESE INPUT MODE
② KEYWORD INPUT SCREEN

FIG.17
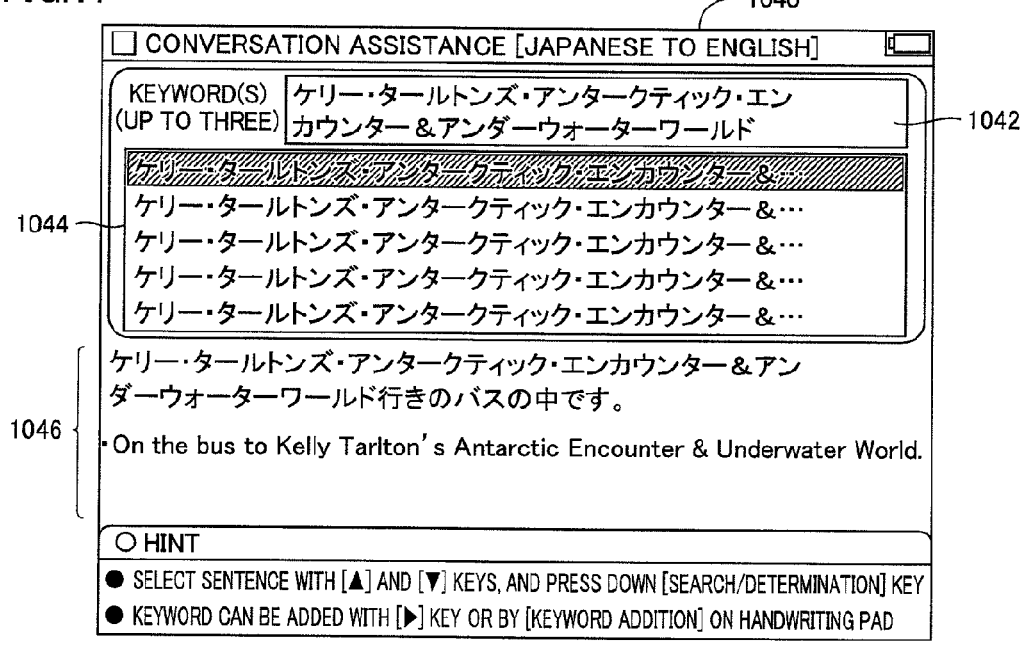
FIG.18 ③ SENTENCE LIST DISPLAY SCREEN    KEYWORD ADDITION INSTRUCTION (HANDWRITING PAD)
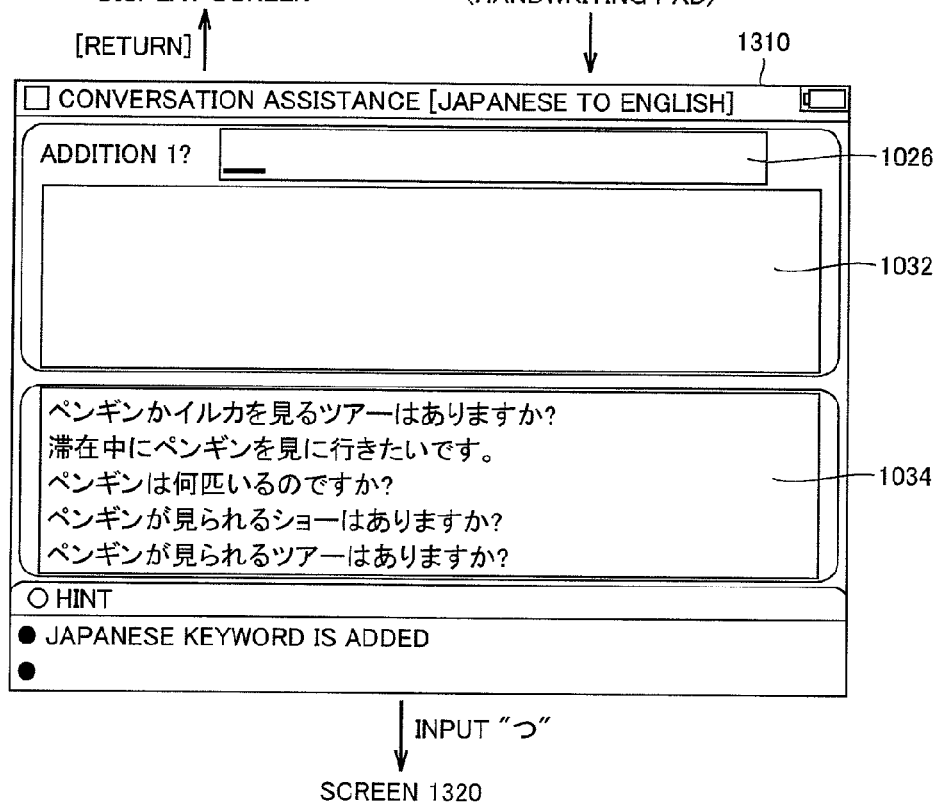

④ SINGLE CONVERSATIONAL SENTENCE DISPLAY SCREEN

④ SINGLE CONVERSATIONAL SENTENCE DISPLAY SCREEN

⑤-3 IN THE CASE OF ALPHABET

⇒ WORDS BEGINNING WITH X COMMON CHARACTERS ARE DISPLAYED IN A GROUP. INPUT OF Y OR MORE CHARACTERS BRINGS ABOUT EXPANSION DISPLAY.

⇒ WORDS BEGINNING WITH X COMMON CHARACTERS ARE DISPLAYED IN A GROUP TOGETHER WITH THE NUMBER OF WORDS IN EACH GROUP. INPUT OF Y OR MORE CHARACTERS BRINGS ABOUT EXPANSION DISPLAY.

にー___
-ニース
-ニース空港
-ニーダーライン
-ニーダーライン空港

INFORMATION PROCESSING DEVICE AND INFORMATION PROCESSING METHOD

TECHNICAL FIELD

The present invention relates to an information processing device that, upon receipt of an input of a predetermined keyword, outputs a content corresponding to the keyword and a method therefor, and more particularly relates to an information processing device, such as an electronic dictionary or a translation device that displays an example sentence and its translation, and an information processing method to which the information processing device is applied.

BACKGROUND ART

Conventionally, an information processing device is widely available that stores data in which keywords and contents are associated with each other, and upon receipt of an input of a keyword, outputs a content corresponding to the keyword.

A typical example of such an information processing device is an electronic dictionary. Another example of such an information processing device is a translation device that stores example sentence data in which a plurality of example sentences described in different languages and having a corresponding content to each other are associated, and when a user selects an example sentence in a certain language, displays an example sentence in another language corresponding to the selected example sentence (hereinafter called a translation), based on the example sentence data.

For example, Japanese Patent Laying-Open No. 9-251462 (Patent Document 1) discloses a translation device in which each example sentence includes a replaceable word (variable section), and when a variable section in an example sentence is changed, a variable section in a translation corresponding to the changed variable section is changed in accordance with the change in the example sentence. The translation device described in Patent Document 1 detects a semantic feature from an input sentence input by a user on a handwriting input board with a dedicated pen, detects a fixed format sentence based on the semantic feature, and replaces a variable semantic feature in the fixed format sentence for display. When displaying words as candidates to replace a variable section, the translation device described in Patent Document 1 classifies the words and displays them in a hierarchical structure.

PRIOR ART DOCUMENTS

Patent Documents

Patent Document 1: Japanese Patent Laying-Open No. 9-251462

SUMMARY OF THE INVENTION

Problems to be Solved by the Invention

Devices that search for a content such as a fixed format sentence based on a user input as in the invention disclosed in Patent Document 1 are disadvantageous in that a user may be unable to obtain a desired example sentence. When a character slightly different from registered keywords is input, these devices cannot retrieve a suitable example sentence.

For example, assume a case where the translation device described in Patent Document 1 contains "エディンバラ" but not "エジンバラ", as a semantic feature (keyword). When an input sentence including a word "エジンバラ" registered as a keyword is input, this device cannot output a fixed format sentence including "エディンバラ". That is, a user cannot obtain a fixed format sentence including "エディン バラ" by inputting "エジンバラ".

Such a problem is also encountered in another information processing device, such as an electronic dictionary, that outputs a content in accordance with a character input.

A conventional translation device is also disadvantageous in having difficulty in finding a translation of a polysemous word. Because indices of polysemous words are not classified by meanings, a user cannot narrow down words, and finds difficulty in selecting a suitable word.

Further, keywords having a containment relationship ("long" one and "short" one) are present in conventional translation devices and the like. When selecting a short keyword, a user cannot reach an index or sentence including a long keyword containing the short keyword.

The present invention was made to solve the above-described problems, and has an object to provide an information processing device and an information processing method enabling a user to easily retrieve a desired content.

Means for Solving the Problems

An invention of the present application according to an aspect is an information processing device including an input unit receiving a character input, an output unit externally outputting information, and a memory unit storing data. The data contains a plurality of keywords, a plurality of contents, each being associated with at least one of the plurality of keywords, and keyword data in which each of the plurality of keywords is associated with a plurality of character inputs. The information processing device further includes a processing unit retrieving one of the plurality of keywords corresponding to one of the plurality of character inputs received by the input unit based on the keyword data, and causing the output unit to output one of the plurality of contents corresponding to the retrieved keyword.

Preferably, each of the plurality of contents contains data for display of an associated one of the plurality of keywords and explanation data corresponding to the associated keyword, and the processing unit causes the output unit to output the data for display of the retrieved keyword and the explanation data of the retrieved keyword.

More preferably, the data for display contains an expression of one of the plurality of keywords, and the data for display of each of two or more of the plurality of keywords having the expression in common further contains data for distinction specific to each of the two or more of the plurality of keywords.

Still preferably, the expression is a first language expression described in a first language, the explanation data is in a second language expression that expresses each of the plurality of keywords in a second language different from the first language, and the data for display of each of the two or more of the plurality of keywords having the first language expression in common and differing in the second language expression contains the first language expression and the data for distinction.

Preferably, each of the plurality of contents contains a first example sentence described in a first language and a second example sentence describing the first example sentence in a second language different from the first language, and the processing unit causes the output unit to output the first example sentence and the second example sentence corresponding to the retrieved keyword.

More preferably, each of the plurality of keywords corresponds to sentence end expressions of the first example sentence and the second example sentence.

Preferably, the keyword data associates one of the plurality of keywords with a plurality of partial character inputs, and when the input unit receives all of the plurality of partial character inputs, the processing unit retrieves the one of the plurality of keywords corresponding to the plurality of partial character inputs, and causes the output unit to output the content corresponding to the retrieved keyword.

An invention of the present application according to another aspect is an information processing method to be performed by an information processing device including a memory unit storing data. The information processing method includes the step of receiving a character input. The data contains a plurality of keywords, a plurality of contents, each being associated with at least one of the plurality of keywords, and keyword data in which each of the plurality of keywords is associated with a plurality of character inputs. The information processing method further includes the steps of retrieving one of the plurality of keywords corresponding to one of the plurality of character inputs received based on the keyword data, and outputting one of the plurality of contents corresponding to the retrieved keyword.

Preferably, each of the plurality of contents contains data for display of an associated one of the plurality of keywords and explanation data corresponding to the associated keyword. The information processing method further includes the step of outputting the data for display of the retrieved keyword and the explanation data of the retrieved keyword.

Preferably, each of the plurality of contents contains a first example sentence described in a first language and a second example sentence describing the first example sentence in a second language different from the first language. The information processing method further includes the step of outputting the first example sentence and the second example sentence corresponding to the retrieved keyword.

Preferably, the keyword data associates one of the plurality of keywords with a plurality of partial character inputs. In the step of retrieving the one of the plurality of keywords, when all of the plurality of partial character inputs are received, the one of the plurality of keywords corresponding to the plurality of partial character inputs is retrieved.

Effects of the Invention

According to the present invention, a keyword corresponding to a character input is retrieved based on data in which a plurality of character inputs are associated with a keyword. Then, a content corresponding to the retrieved keyword is output. As a result, a user can easily retrieve a desired content.

Alternatively, presenting supplementary explanations in displaying polysemous words enables the user to select a suitable word more easily.

Still alternatively, subjecting a long keyword to division designation enables the user to reach an index or sentence including a long keyword with a combination of short keywords.

BRIEF DESCRIPTION OF THE DRAWINGS

FIG. 4 is a block diagram of a functional configuration of conversation assistance device 100.

FIG. 5 shows a specific example of a template 500.

FIG. 6A shows an example of keyword-category data 425.

FIG. 6B shows an example of category-template data 426.

FIG. 7 shows a specific example of a category list.

FIG. 8 shows a specific example of a dictionary 423.

FIG. 9 is a first diagram showing a specific example of data contained in a predicted keyword list 428.

FIG. 10 is a second diagram showing a specific example of data contained in predicted keyword list 428.

FIG. 11 shows a specific example of data contained in registered example sentence information.

FIG. 12 illustrates a menu screen 1010.

FIG. 13 illustrates an initial screen 1020.

FIG. 17 illustrates sentence list display screen 1040 displaying long example sentences.

FIG. 18 is a first diagram for illustrating a screen displayed on a display 130 for determining a first additional keyword.

FIG. 40 illustrates an arrangement of words by a translation output unit 446 according to a first variation.

FIG. 41 illustrates an arrangement of words by translation output unit 446 according to a second variation.

FIG. 42A shows an example according to a third variation in which words beginning with three common characters are displayed in a group.

FIG. 42B shows an example according to the third variation in which the number of words corresponding to a representative indication is displayed on the right of the representative indication.

MODES FOR CARRYING OUT THE INVENTION

Figure 1:
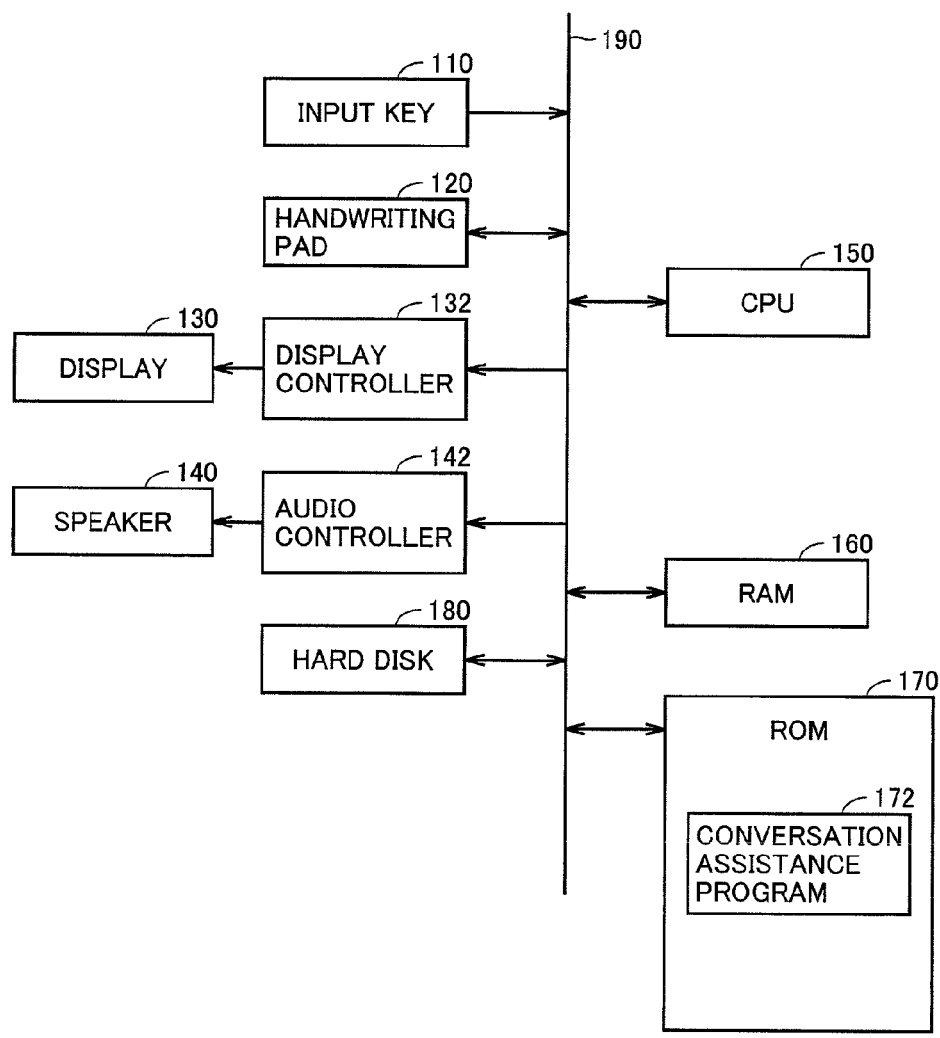
FIG. 1 is a block diagram of a hardware configuration of a conversation assistance device 100 according to the present embodiment.

The embodiments of the present invention will be hereinafter described with reference to the accompanying drawings, in which the same components are designated by the same reference characters. Names and functions thereof are also the same, and therefore, detailed description thereof will not be repeated.

(1. Hardware Configuration)

With reference to FIG. 1, a hardware configuration of conversation assistance device 100 according to the present embodiment will be described. FIG. 1 is a block diagram of the hardware configuration of conversation assistance device 100 according to the present embodiment.

The present embodiment will be described assuming that conversation assistance device 100 is an electronic dictionary having a conversation assisting function, which will be described in detail below. However, conversation assistance device 100 may be another type of apparatus. For example, conversation assistance device 100 may be a dedicated device for conversation assistance, or a mobile terminal (such as a mobile phone or PDA (Personal digital assistant)) having the conversation assisting function, or a personal computer having the conversation assisting function. Alternatively, it may be a network server that presents an example sentence/translation result in response to a remote keyword input.

Conversation assistance device 100 includes an input key 110, a handwriting pad 120, a display 130, a display controller 132, a speaker 140, an audio controller 142, a CPU (Central Processing Unit) 150, a RAM (Random Access Memory) 160, a ROM (Read Only Memory) 170, and a hard disk 180.

When externally pressed down, input key 110 outputs a signal corresponding to input key 110. Handwriting pad 120 detects a touch of an object (e.g., a stylus pen) onto the surface of handwriting pad 120 to output a signal corresponding to a contact position between handwriting pad 120 and the object. Handwriting pad 120 also displays a screen corresponding to an operating state of conversation assistance device 100. Handwriting pad 120 may be configured to perform character recognition based on an input stroke with a stylus pen by means of a handwritten character recognition program not shown or the like for achieving a keyword input. Alternatively, it may be configured to perform speech recognition by means of an audio input unit (e.g., a microphone) and a speech recognition program not shown for achieving a keyword input.

Display 130 displays a screen based on data in conversation assistance device 100. Display controller 132 controls an operation of display 130. Display 130 can be implemented by, for example, a liquid crystal display or an LED (Light-emitting Diode) display panel.

Speaker 140 outputs audio based on data in conversation assistance device 100. Audio controller 142 controls an operation of speaker 140.

CPU 150 executes a computation for controlling an operation of conversation assistance device 100. RAM 160 stores temporary information generated while CPU 150 performs processing. ROM 170 stores information such as a conversation assistance program 172 to be executed by CPU 150. The information stored in ROM 170 will be described later in detail.

Figure 2:
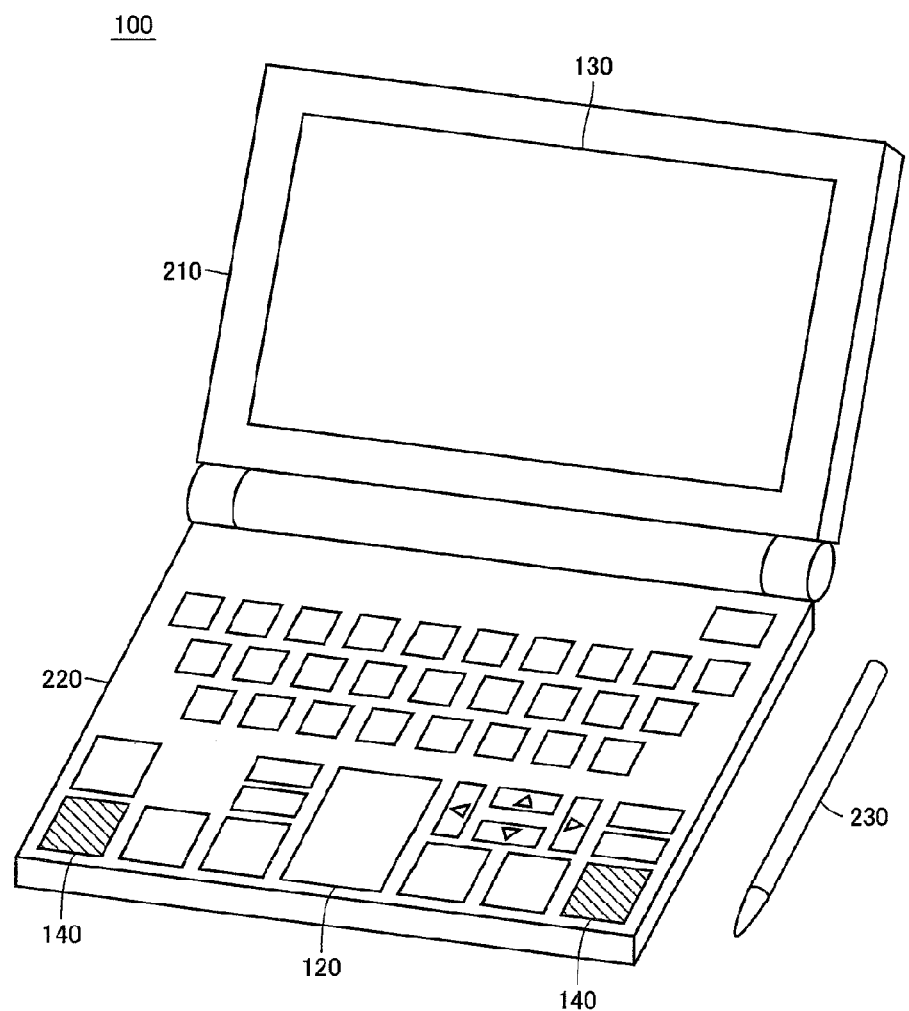
FIG. 2 is a perspective view of conversation assistance device 100.

FIG. 2 is a perspective view of conversation assistance device 100. However, FIG. 2 merely shows exemplary appearance of conversation assistance device 100, and the appearance of conversation assistance device 100 is not limited to that shown in FIG. 2.

With reference to FIG. 2, conversation assistance device 100 includes a first housing 210, a second housing 220, and a stylus pen 230. Display 130 is disposed in first housing 210. Handwriting pad 120, speaker 140, and input key 110 are disposed in second housing 220. First housing 210 and second housing 220 are connected to each other in an openable/closable manner.

Figure 3:
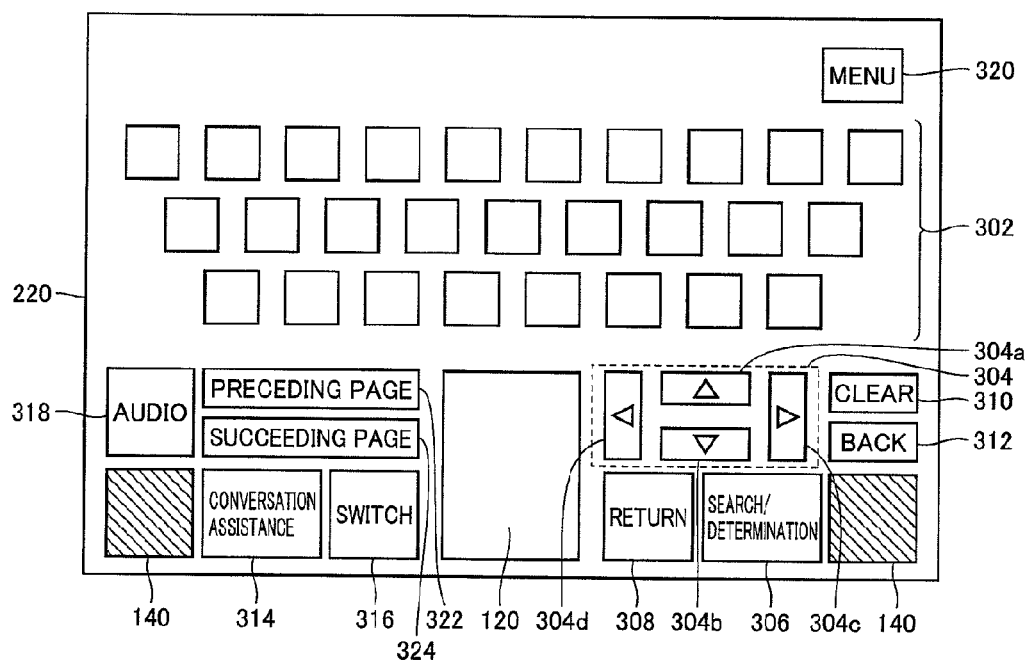
FIG. 3 shows an arrangement of components in a second housing 220.

With reference to FIG. 3, an arrangement of components in second housing 220 will be described. FIG. 3 shows the arrangement of components in second housing 220. However, the arrangement of respective keys and handwriting pad 120 of conversation assistance device 100 shown in FIG. 3 is merely an example, and is not limited to that shown in FIG. 3.

Handwriting pad 120, speaker 140, and various keys are disposed in second housing 220. The keys disposed in second housing 220 include a character key 302, an up key 304a, a down key 304b, a right key 304c, a left key 304d (hereinafter, up key 304a, down key 304b, right key 304c, and left key 304d may be collectively called a direction key 304), direction key 304, a search/determination key 306, a return key 308, a clear key 310, a back key 312, a conversation assistance key 314, a switch key 316, an audio key 318, a menu key 320, a preceding page key 322, and a succeeding page key 324.

Some of the keys will be briefly described now. Character key 302 is used to input a character. Direction key 304 is used to move a cursor in a screen displayed on display 130. Conversation assistance key 314, when pressed down, outputs a signal for activating a conversation assistance application. Menu key 320, when pressed down, outputs a signal for displaying a menu screen on display 130.

(2. Functional Configuration)

With reference to FIG. 4, a functional configuration of conversation assistance device 100 will be described. FIG. 4 is a block diagram of the functional configuration of conversation assistance device 100.

Conversation assistance device 100 includes an input unit 410, a memory unit 420, a processing unit 440, and an output unit 460.

Input unit 410 receives an external instruction. In conversation assistance device 100 shown in FIG. 1, input key 110 and handwriting pad 120 serve as input unit 410. However, input unit 410 may be implemented by another input device such as a mouse depending on the type of conversation assistance device 100.

Output unit 460 outputs information in conversation assistance device 100. Output unit 460 includes a display unit 462 that outputs an image and an audio output unit 464 that outputs audio. In conversation assistance device 100 shown in FIG. 1, display 130 serves as display unit 462. In conversation assistance device 100 shown in FIG. 1, speaker 140 serves as audio output unit 464. It should be noted that audio output unit 464 may be implemented by a device other than speaker 140, such as an earphone.

Memory unit 420 stores various types of information. In conversation assistance device 100 shown in FIG. 1, RAM 160, ROM 170, and hard disk 180 serve as memory unit 420. However, memory unit 420 may be implemented by another storage medium, such as a flash memory.

In the present embodiment, memory unit 420 stores conversation assistance program 172, a template database 422, a dictionary 423, index data 424, a predicted keyword list 428, registered example sentence information 430, and historical example sentence information 432.

Hereinafter, the structure of various types of data stored in memory unit 420 will be described in detail.

<Template Database>

Template database 422 includes a plurality of templates 500 for associating a plurality of example sentences described in a plurality of different languages with one another. Template database 422 is used when conversation assistance device 100 creates a translation of a user selected example sentence.

Template 500 will now be specifically described with reference to FIG. 5. FIG. 5 shows a specific example template 500a of template 500. Template 500 will be specifically described below based on template 500a.

Characters in a category sentence (Japanese) 530 are Japanese words except those bracketed by { }. Characters in a category sentence (English) 550 are English words except those bracketed by { }. Characters in a category sentence (Chinese) 570 are Chinese words except those bracketed by { }. Characters in a typical word sentence (Japanese) 520 are Japanese words except the bracket { }, the sign : in { }, and the numbers in { }. Characters in a typical word sentence (English) 540 are English words except the bracket { }, the sign : in { }, and the numbers in { }. Characters in a typical word sentence (Chinese) 560 are Chinese words except the bracket { }, the sign : in { }, and the numbers in { }.

While a three-language template for translating Japanese into English and Japanese into Chinese is illustrated herein, the combination of languages is not limited to this. It is clear that the following description is also applicable to a two-language template and a template for four or more languages.

Template 500 includes a template number 510 for identifying template 500, typical word sentence (Japanese) 520, category sentence (Japanese) 530, typical word sentence (English) 540, category sentence (English) 550, typical word sentence (Chinese) 560, category sentence (Chinese) 570, and a keyword 580.

Category sentence (Japanese) 530, category sentence (English) 550, and category sentence (Chinese) 570 are described in different languages, but have an identical meaning. Some words have categories set. Category sentence (English) 550 will be explained by way of example. Category sentence (English) 550 consists of four sections ({1:QPRON1}, {2:GOODS1+pl}, {3:VB_BUY1+inf}, and {4:PLACE1}) that designate the categories of words to be inserted into the sentence, and sections represented by fixed words ("can't I" and "in"). Hereinafter, a section designating the category will be referred to as a "variable section", and a section other than the variable section as a "fixed section." Each variable section is identified by the number at the beginning in { }. Hereinafter, to distinguish between variable sections, a variable section whose number in { } is n will be called the n-th variable section.

The structure of variable sections will now be described. Capitalized alphabets (e.g., QPRON1) in { } represent the name of a category of a word to be inserted into a variable section. Depending on the sentence structure, a variable section may contain information that designates the form of a word to be inserted into a variable section. For example, +inf in {3:VB_BUY1+inf} indicates that the bare infinitive of a verb is to be inserted into this variable section. As another example, +pl in {1:GOODS1+pl} in category sentence (English) 550 indicates that the plural form of a noun is to be inserted into this variable section.

Typical word sentence (Japanese) 520, typical word sentence (English) 540, and typical word sentence (Chinese) 560 are each obtained by inserting a priority word into each variable section of category sentence (Japanese) 530, category sentence (English) 550, and category sentence (Chinese) 570. Typical word sentence (English) 540 will be described by way of example. Typical word sentence (English) 540 is obtained by replacing the first variable section of category sentence (English) 550 by "Which", the second variable section by "bags", the third variable section by "buy", and the fourth variable section by "Japan."

It should be noted that typical word sentence (Japanese) 520, typical word sentence (English) 540, typical word sentence (Chinese) 560, category sentence (Japanese) 530, category sentence (English) 550, and category sentence (Chinese) 570 may be formed only by fixed sections. In such a case, a typical word sentence and a category sentence may hold identical data, or one may be null data.

<Dictionary>

Referring back to FIG. 4, dictionary 423 is data in which words of a plurality of languages are associated with one another. A specific example dictionary will be described later.

<Index Data>

Index data 424 is data for associating a user input with an example sentence, and is used for searching for an example sentence based on a user input. In the present embodiment, index data 424 contains keyword-category data 425 for associating a user input with the category of a keyword corresponding to the user input, and category-template data 426 for associating the category with a template.

Index data 424 will now be described with reference to FIGS. 6A and 6B. FIGS. 6A and 6B illustrate index data 424. In FIG. 6A, characters corresponding to a Japanese input and characters corresponding to a Japanese expression are in Japanese.

(Keyword-Category Data)

FIG. 6A shows an example of keyword-category data 425. FIG. 6A shows three pieces of keyword-category data 425 (keyword-category data 425a, keyword-category data 425b, and keyword-category data 425c).

With reference to FIG. 6A, each pieces of keyword-category data 425 associates a Japanese input 612 of a keyword, a word number 613, a Japanese expression 614 of the keyword, and a category number 616 of the keyword with one another. For example, Japanese input 612 of keyword-category data 425a is "にっぽん", word number 613 is "2312", Japanese expression 614 is "日本", and category number 616 is "C3001".

Japanese input 612 is a Japanese word corresponding to a keyword. Japanese expression 614 is an indication of the keyword corresponding to Japanese input 612 on display 130. More specifically, when input key 110, handwriting pad 120 or an audio input microphone not shown receives an input of a character string shown in Japanese input 612, CPU 150 and display controller 132 causes display unit 462 to display the character string of Japanese expression 614 as a keyword. In the example of keyword-category data 425a, when the Japanese word "にっぽん" is input, conversation assistance device 100 recognizes that a keyword of the Japanese expression "日本" has been input. It should be noted that handwriting pad 120 or the like may directly receive an input of Japanese expression 614.

Word number 613 is an ID of a corresponding word in the dictionary. Category number 616 is data specific to each category, representing a category to which a keyword belongs. A keyword belonging to a plurality of categories (in the example shown in FIG. 6A, keyword-category data 425c) has a plurality of category numbers 616.

The foregoing has assumed that a user searches for an example sentence based on a Japanese keyword, and described keyword-category data 425 for Japanese keywords. However, there may also be keyword-category data 425 for another language. With such keyword-category data 425, the user can search for an example sentence in other languages.

(Category-Template Data)

FIG. 6B shows an example of category-template data 426. FIG. 6B shows two pieces of category-template data 426 (category-template data 426a and category-template data 426b).

With reference to FIG. 6B, category-template data 426 associates category number 616 with template number 510. More specifically, each piece of category-template data 426 can identify a template 500 associated with a certain category number 616. For example, category-template data 426a shows that templates 500 having template numbers of 10100, 10151 and 10200 are associated with category number C0010.

(Search Based on Index Data)

Conversation assistance device 100 searches for an example sentence corresponding to a user input character string based on index data 424 as described above. More specifically, conversation assistance device 100 obtains category number 616 of a keyword corresponding to the user input character string based on keyword-category data 425. Then, conversation assistance device 100 obtains template number 510 corresponding to obtained category number 616, based on category-template data 426. Finally, conversation assistance device 100 searches for and retrieves an example sentence corresponding to obtained template number 510, based on template database 422. Search processing for an example sentence corresponding to a keyword will be described later in detail.

With conversation assistance device 100 according to the present embodiment, not only a template 500 having an input character string as a keyword, but also a template 500 having a variable section that designates a category including the input character string, can be retrieved. Therefore, various example sentences related to the input character string can be retrieved. For example, if the number of example sentences is 1000, the average number of variable sections included in an example sentence is 3, and the average number of candidates per variable section is 100, then, 1000×100×100×100=1,000,000,000 example sentences can be retrieved.

Moreover, through the use of index data 424, conversation assistance device 100 can conduct the above-described example sentence search in a shorter time period than when index data 424 is not provided.

More specifically, when index data 424 is not provided, all example sentences need to be subjected to a character string search in order to retrieve an example sentence based on an input keyword. This character string search necessitates pattern matching between character strings, resulting in a longer processing time in proportion to the amount of example sentences. In contrast, conversation assistance device 100 according to the present embodiment can rapidly obtains the category of a keyword based on keyword-category data 425 contained in index data 424. In addition, conversation assistance device 100 can retrieve at high speeds a template corresponding to the category based on category-template data 426.

(Creation of Index Data)

Index data 424 according to the present embodiment shall be created based on a category list 700 that associates dictionary 423, a category name and a category number with a template 500.

A specific example of category list 700 will now be described with reference to FIG. 7. FIG. 7 shows a specific example category list. With reference to FIG. 7, a first entry 700a in category list 700 shows that a category whose category name is "PLACE1" has a category number "C3001". A second entry 700b in category list 700 shows that a category whose category name is "GOODS1" has a category number "C0010".

A specific example of dictionary 423 will now be described with reference to FIG. 8. FIG. 8 shows a specific example of dictionary 423. In FIG. 8, characters corresponding to a Japanese input and characters corresponding to a Japanese expression are Japanese words. Characters corresponding to a Chinese expression are Chinese words.

A first entry 800a in the dictionary shows that a Japanese expression "バッグ", Japanese input "ばっぐ", an English expression "bag", and a Chinese expression "包," correspond to one another. First entry 800a also shows that "バッグ", "ばっぐ", "bag", and "包" have a word number of "5432", and category numbers of "C0010" and "C0011".

For a word contained in dictionary 423, Japanese input 612 and Japanese expression 614 of keyword-category data 425 are created based on the Japanese expression and the Japanese input in the entry of dictionary 423. Word number 613 and category number 616 of keyword-category data 425 are also created based on the word number and the category number in the entry of dictionary 423, respectively.

To register a word other than a variable section candidate as a keyword, a Japanese input and a Japanese expression of keyword-category data 425 can also be created from the Japanese input and the Japanese expression of keyword 580 in template 500.

According to the present embodiment, a single or a plurality of Japanese inputs shall be registered in association with a single Japanese expression. For example, because the Japanese inputs "包" and "にほん" are associated with the Japanese expression "日本", enabling the user to retrieve a template number "10100" by way of the category number "C3001" by inputting either "包" or "にほん".

Further, category-template data 426 is created based on the category name of a variable section included in template 500 and category list 700.

Index data 424 thus created based on template 500, category list 700, and dictionary 423 suitably reflects the correspondence between an input word/phrase and template 500.

<Predicted Keyword List>

Predicted keyword list 428 has registered a plurality of predetermined keywords classified by an initial single or plurality of characters of each keyword. Predicted keyword list 428 is intended to assist a user keyword input.

A specific example of predicted keyword list 428 will be described now with reference to FIGS. 9 and 10. FIGS. 9 and 10 each show a specific example of data contained in predicted keyword list 428. In FIGS. 9 and 10, characters listed below reading (input character 910) are Japanese hiragana characters. That is, characters listed on the left are Japanese hiragana characters. Characters listed below candidate 922 are Japanese kanji, katakana or hiragana, or a combination thereof. That is, characters listed on the right are Japanese kanji, katakana or hiragana, or a combination thereof.

With reference to FIGS. 9 and 10, predicted keyword list 428 stores a search result 920 of predicted words showing a prefix match and an exact match to input character 910, respectively. Herein, the "prefix match" means that the whole character string of input character 910 is included in a predicted word when a reference is made from the beginning of the character string of the predicted word. The "exact match" means that the character string of a predicted word and input character 910 exactly match.

Predicted words contained in search result 920 are not limited to those showing a prefix match or an exact match to input character 910. A case where input character 910 is included in the course of the character string of a predicted word is called "a partial match." Predicted keyword list 428 may store search result 920 of predicted words in any or all of the prefix match, partial match, and exact match cases.

FIG. 9 shows the prefix match case, and FIG. 10 shows the exact match case. With reference to FIG. 9, search result 920 contains a candidate 922, a candidate number 923, and a word number 924 of a predicted word. Word number 924 identifies candidate 922, and matches the word number shown in FIG. 8. In the example shown in FIG. 9, the total number of candidates showing a prefix match to a reading "あ" is 964, and word number 924 identifying "アート" has a value of 2415.

Similarly, in the example shown in FIG. 10, the total number of candidates showing an exact match to a reading "あーてぃちょーく" is 1, and word number 924 identifying "アーティチョーク" has a value of 711.

Historical Example Sentence Information and Registered Example Sentence Information Registered example sentence information 430 is information on user registered example sentences among example sentences determined as output objects. Historical example sentence information 432 is information on a history of example sentences determined as output objects.

Registered example sentence information 430 will now be described with reference to FIG. 11. FIG. 11 shows a specific example of data contained in registered example sentence information 430.

With reference to FIG. 11, registered example sentence information 430 contains a keyword identified by an input character, an example sentence search result, a translation result, and translation dictionary data associated with one another. Translation dictionary data (corresponding to template 500) contains a sentence number (corresponding to template number 510), the number of variable sections, the number of words per variable section, as well as a word number and a character string indicating a word per variable section, in association with one another.

An input keyword is a user input word or a word predicted from a user input character in order to search for an example sentence.

The example sentence search result is an example sentence determined by a user among at least one example sentence retrieved based on the input keyword. The example sentence search result may include a section sandwiched by a 2-byte filled-in square and a 1-byte underscore and a section sandwiched by a 2-byte square and a 1-byte underscore. These sections are variable sections described previously. The section sandwiched by a 2-byte filled-in square and a 1-byte underscore indicates a focused variable section, and the section sandwiched by a 2-byte square and a 1-byte underscore indicates an unfocused variable section. The example sentence search result is not limited to the expression of this example, but may have a style in which the word of a variable section is changed in font (such as by an underline, a change in color of characters, or a boldface).

The translation result is a translation translated based on the example sentence search result. The sentence number is a number assigned in advance to each example sentence. The number of variable sections indicates the number of variable sections included in an example sentence. The word per variable section is at least one word that can replace the variable section. The number of words per variable section indicates the number of words registered as words that can replace the variable section.

For example, registered example sentence information 430 corresponding to an input keyword "アジアの" contains an example sentence search result of: "こちらの ツアーはアジアのお客様に大変人気です。"; "This tour is very popular with our Asian customers."; and data on a sentence number "5826".

Contained as data on the sentence number "5826" are the number of variable sections "3", the number of words "2" of a variable section 1, a character string indicating words for variable section 1 "(11: こちらの /this/12: あちらの /that/)", the number of words "2" of a variable section 2, a character string indicating words for variable section 2 "(2331: ツアー /tour/2345: クルーズ /cruise/)", the number of words "19" of a variable section 3, and a character string indicating words for variable section 3 "(301: アジアの/Asian/302: アフリカの/African/303: 中東の /Middle Eastern/304: 東アジアの/East Asian/305: 西アジアの /West Asian/306: 南米の /South American/307: 北米の/North American/308: オセアニアの/Oceanian/

309: ヨーロッパの/European/310: ペルシャの/Persian/ 311: 西洋の/Western/312: 日本の/Japanese/313: アメリカの/American/314: ドイツの/German/315: イギリスの/British/316: フランスの/French/317: イタリアの/Italian/318: 韓国の/South Korean/319: 中国の/Chinese/)". Each character string indicating the words for each of variable sections 1 to 3 is shown including the word number and the character string (in Japanese and English).

Some example sentences may have three variable sections as described, while others may have no variable section. A sentence having no variable section will be particularly called an example sentence only consisting of fixed sections. Even in the case of an example sentence only consisting of fixed sections, a predicated keyword and an example sentence can also be retrieved based on an input character, and a translation result can be obtained.

Data contained in historical example sentence information 432 is similar to data contained in registered example sentence information 430 described with reference to FIG. 11.

Part or all of a data structure recorded in the translation dictionary data shall be stored as registered example sentence information 430 and historical example sentence information 432. Therefore, user registered example sentences among example sentences determined as output objects and histories of the example sentences determined as output objects are utilized again as they are. This not only saves the labor of searching for an identical example sentence again, but also enables the user to change variable sections in the example sentences to obtain a wide variety of example sentences and translations, as will be described later.

As described above, various types of data are stored in memory unit 420. Processing unit 440 will now be described.

Referring back to FIG. 4, processing unit 440 includes a keyword selection unit 442, an example sentence selection unit 444, a translation output unit 446, a registered example sentence management unit 448, and a historical example sentence management unit 449.

Keyword selection unit 442 selects a keyword based on an instruction received by input unit 410. Keyword selection unit 442 includes a prediction conversion unit 443 that extracts words predicted from a character received by input unit 410 as keyword candidates, based on predicted keyword list 428.

Keyword selection unit 442 causes display unit 462 to display the keyword candidates extracted by prediction conversion unit 443 in a manner selectable as a keyword candidate. More specifically, keyword selection unit 442 searches for keywords each having Japanese input 612 that matches as an input character string, referring to index data 424. Prediction conversion unit 443 then causes display unit 462 to display expressions 614 of retrieved keywords. Keyword selection unit 442 selects a single keyword candidate from among the keyword candidates displayed on display unit 462 based on the instruction received by input unit 410.

More specifically, keyword selection unit 442 causes display unit 462 to display keyword candidates as shown in FIG. 10. As described previously, FIG. 10 shows the search result of predicted keywords each showing exact match to the input character string.

Example sentence selection unit 444 selects an example sentence based on the keyword selected by keyword selection unit 442, index data 424, and the instruction received by input unit 410. More specifically, example sentence selection unit 444 searches index data 424 to extract template 500 associated with the selected keyword. The search has already been described in detail in the explanation of index data 424. Example sentence selection unit 444 causes display unit 462 to display example sentences in a selectable manner based on retrieved template 500. Further, example sentence selection unit 444 selects a single example sentence from among the example sentences displayed on display unit 462, based on the instruction received by input unit 410.

Translation output unit 446 causes display unit 462 to display the example sentence selected by example sentence selection unit 444 and a translation of the example sentence. Particularly, translation output unit 446 causes display of variable sections of the example sentence in a selectable manner, and replacement of a word/phrase of a variable section based on the instruction received by input unit 410. The replacement will be described later in detail. Translation output unit 446 causes audio output unit 464 to audio output a translation based on the instruction received by input unit 410.

Registered example sentence management unit 448 manages user registered example sentences among example sentences selected by example sentence selection unit 444. More specifically, for an example sentence selected by example sentence selection unit 444 and registered by the user, registered example sentence management unit 448 associates an input keyword, an example sentence search result, a translation result, translation dictionary data (the sentence number, the number of variable sections, the number of words per variable section, and the word number and the character string indicating a word of a variable section) with one another, and causes memory unit 420 to store them as registered example sentence information 430 described with reference to FIG. 11. For an example sentence having no variable section (only consisting of fixed sections), stored in memory unit 420 is translation dictionary data in which the number of variable sections and the number of words per variable section are "0" and the word number and the character string indicating a word of a variable section are NULL.

Registered example sentence management unit 448 reads registered example sentences stored in memory unit 420 as registered example sentence information 430, based on the instruction received by input unit 410, and causes display unit 462 to display a list of the read registered example sentences such that a registered example sentence can be selected. Registered example sentence management unit 448 further selects a registered example sentence from among the registered example sentences displayed on display unit 462 based on the instruction received by input unit 410.

Translation output unit 446 causes display unit 462 to display the registered example sentence selected by registered example sentence management unit 448 and a translation of the registered example sentence. Display of the registered example sentence is similar to display of the example sentence selected by example sentence selection unit 444 described above. It should be noted that the example sentence selected by example sentence selection unit 444 is displayed based on template 500, while the registered example sentence is displayed based on data stored as registered example sentence information 430.

Historical example sentence management unit 449 manages the history of the example sentence selected by example sentence selection unit 444. More specifically, for the example sentence selected by example sentence selection unit 444, historical example sentence management unit 449 associates an input keyword, an example sentence search result, a translation result, and translation dictionary data (the sentence number, the number of variable sections, the number of words per variable section, and the word number and the character string indicating a word of a variable section) with one another, and causes memory unit 420 to store them as historical example sentence information 432 similar to registered example sentence information 430 described with reference to FIG. 11.

Historical example sentence management unit 449 reads historical example sentences stored in memory unit 420 as historical example sentence information 432, based on the instruction received by input unit 410, and causes display unit 462 to display a list of the read historical example sentences such that a historical example sentence can be selected. Historical example sentence management unit 449 further selects a historical example sentence from among the historical example sentences displayed on display unit 462, based on the instruction received by input unit 410.

Translation output unit 446 causes display unit 462 to display the historical example sentence selected by historical example sentence management unit 449 and a translation of the historical example sentence. Display of the historical example sentence is similar to display of the example sentence selected by example sentence selection unit 444 described above. It should be noted that the historical example sentence is displayed based on data stored as historical example sentence information 432.

(3. Operation of Conversation Assistance Device)

The operation of conversation assistance device 100 is generally divided into:

(1) activation of a conversation assistance application;
(2) keyword reception;
(3) example sentence determination;
(4) keyword addition;
(5) output of a single conversational sentence;
(6) word replacement;
(7) selection of a registered example sentence; and
(8) selection of a historical example sentence.

Hereinafter, each of (1) to (8) will be described sequentially.

(1) Activation of Conversation Assistance Application

In the present embodiment, conversation assistance device 100 activates the conversation assistance application when "conversation assistance" is selected in a menu screen 1010 shown in FIG. 12, or when conversation assistance key 314 is pressed down. It should be noted that the menu screen shown in FIG. 12 is merely an example, and the menu screen that conversation assistance device 100 displays on display 130 is not limited to that which will be described below.

With reference to FIG. 12, the names of contents (e.g., the names of dictionaries) or the names of applications (e.g., conversation assistance headed with a note sign) are displayed in menu screen 1010. A sentence for assisting a user operation is displayed at a lower part of menu screen 1010.

Any of the names of contents and the names of applications displayed in menu screen 1010 can be selected. Processing unit 440 newly selects a content shown directly above (or directly below) the currently selected name of content in response to pressing down of up key 304a (or down key 304b).

The selected name of content or the name of application is displayed so as to be recognizable as being selected, such as in a different color or enclosed within a frame. In menu screen 1010, the conversation assistance is selected, and enclosed within a frame.

When search/determination key 306 is pressed down, processing unit 440 activates an application corresponding to the selected name of content or the name of application.

Processing unit 440 activates the conversation assistance application based on an instruction to activate the conversation assistance application to display an initial screen 1020 shown in FIG. 13 on display 130. More specifically, detecting pressing of search/determination key 306 or pressing of conversation assistance key 314 with "conversation assistance" being selected in menu screen 1010, processing unit 440 causes display 130 to display initial screen 1020. When return key 308 is pressed down while initial screen 1020 is displayed, processing unit 440 causes display 130 to display menu screen 1010.

With reference to FIG. 13, initial screen 1020 includes a title 1022, a battery mark 1023, a hint 1024, a character input box 1026, and language mode setting 1028.

Title 1022 represents the name of application currently activated, that is, "conversation assistance", and a language mode. Herein, the "language mode" is information that designates which language is to be translated into which language in the conversation assistance.

In the present embodiment, selection can be made between two language modes (a mode of translating Japanese into English and a mode of translating Japanese into Chinese), and characters indicating a selected language mode are displayed at title 1022. When the mode of translating Japanese into English is selected, "Japanese to English" is displayed at title 1022. When the mode of translating Japanese into Chinese, "Japanese to Chinese" is displayed at title 1022.

Battery mark 1023 represents the state of charge of a battery that drives conversation assistance device 100. The form of display of battery mark 1023 changes in accordance with the state of charge of the battery.

Hint 1024 displays a sentence explaining an operation that a user should or can perform.

Character input box 1026 displays characters in accordance with pressing down of character key 302 or input to handwriting pad 120. As previously described, for a character input, character recognition may be performed from an input stroke with a stylus pen by means of a handwritten character recognition program not shown or the like for achieving keyword input. Alternatively, speech recognition may be performed by means of an audio input unit (e.g., microphone) and a speech recognition program not shown for achieving keyword input.

Language mode setting 1028 shows a language mode being selected. More specifically, the color of a square located on the left of characters indicating each language mode shows which language mode is selected. Initial screen 1020 shown in FIG. 13 is displayed when the mode of translating Japanese into English is selected, and the square next to "Japanese to English" is filled in.

The user can select a language mode by pressing down switch key 316 while initial screen 1020 is displayed on display 130. That is, processing unit 440 switches between the language modes when it detects pressing down of switch key 316 while initial screen 1020 is displayed.

It should be noted that a default language mode, that is, the language mode until the conversation assistance application is started up at first and switch key 316 is pressed down shall be the mode of translating Japanese into English. Processing unit 440 causes memory unit 420 to store the language mode at the time when conversation assistance ends, and when the conversation assistance application is activated for the second time and later, it selects the language mode at the time when previous conversation assistance ended.

The types of language modes are not limited to the above-described two. For example, there may be a mode of translating a language other than Japanese into another language. Language modes available in conversation assistance device 100 are programmed during manufacturing. A manufacturer of conversation assistance device 100 may program language modes available in conversation assistance device 100 appropriately (e.g., in accordance with a sales area of conversation assistance device 100).

The number of language modes available in conversation assistance device 100 is not limited to two. Conversation assistance device 100 may handle three or more language modes. Conversely, conversation assistance device 100 may handle only a single language mode. In this case, display of language mode setting 1028 in initial screen 1020 is not required.

(2) Keyword Reception

Figure 14:
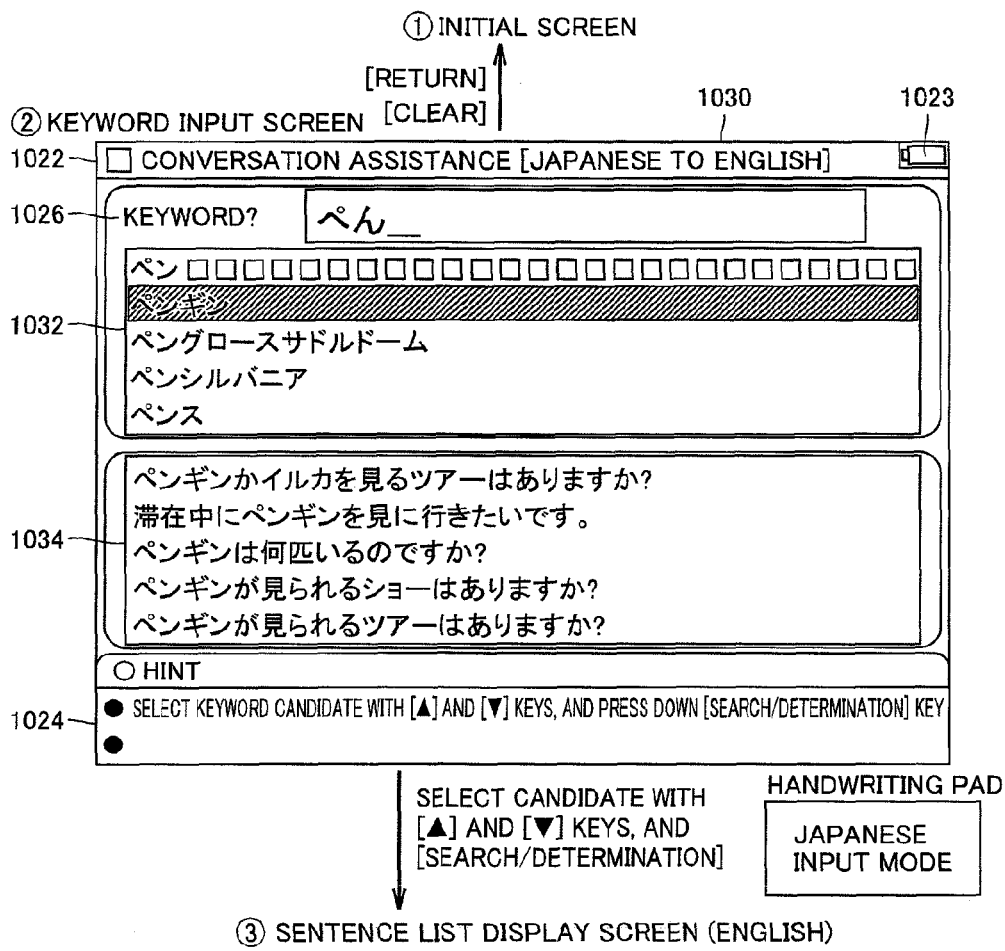
FIG. 14 illustrates a keyword input screen 1030.

When a character is input while initial screen 1020 is displayed, processing unit 440 causes display 130 to display a keyword input screen 1030 shown in FIG. 14 for assisting a user keyword input. When return key 308 or clear key 310 is pressed down while keyword input screen 1030 is displayed, processing unit 440 causes display 130 to display initial screen 1020.

FIG. 14 shows a screen for translating Japanese (first language) into English (second language). In FIG. 14, a keyword input in character input box 1026, a sentence displayed in a candidate keyword list 1032, and a sentence displayed in an example sentence preview 1034 are in Japanese (first language).

With reference to FIG. 14, keyword input screen 1030 includes title 1022, battery mark 1023, hint 1024, and character input box 1026, similarly to initial screen 1020. Keyword input screen 1030 shown in FIG. 14 is displayed when a character string "ぺん" is input. Accordingly, "ぺん" is displayed in character input box 1026.

Various screens as will be described below also include title 1022, battery mark 1023, hint 1024, and character input box 1026. However, these displays play roles similar to those of initial screen 1020, and will therefore not be mentioned basically in the following description of screens.

In addition to the above-mentioned displays, keyword input screen 1030 further includes candidate keyword list 1032 and example sentence preview 1034.

Candidate keyword list 1032 displays keywords corresponding to the characters input in character input box 1026. Herein, keywords "ペン", "ペンギン", "ペングローースサドルドーム", "ペンシルバニア", and "ペンス" corresponding to a candidate keyword character string "ぺん" are displayed in candidate keyword list 1032.

Keywords included in candidate keyword list 1032 have been retrieved by prediction conversion unit 443 included in keyword selection unit 442 based on predicted keyword list 428. Herein, prediction conversion unit 443 retrieves keywords whose character strings at the beginning match the input character string, based on candidate keyword list 1032.

The user can select each keyword included in candidate keyword list 1032 with up key 304a, down key 304b, preceding page key 322, succeeding page key 324, and so forth. When all predicted words cannot be displayed on display 130, keyword selection unit 442 provides scroll-display of predicted words included in candidate keyword list 1032 in response to pressing down of the various keys.

In the present embodiment, the number of predicted words included in candidate keyword list 1032 is not particularly limited. However, the number of predicted words included in candidate keyword list 1032 may be limited depending on capability or the like of conversation assistance device 100.

Display 130 displays a keyword being selected so as to be recognizable as being selected. Keyword input screen 1030 is displayed when a keyword "ペンギン" is selected, and a line including "ペンギン" is displayed by hatching. Herein, in displaying the keyword being selected (focused), the font may be changed (such as by an underline, a boldface, or a change in color of characters), a sign (mark) may be assigned, or the like. The same applies to an example sentence list 1044, which will be described later.

When prediction conversion unit 443 cannot retrieve a keyword corresponding to input characters, then, in the present embodiment, keyword selection unit 442 causes display 130 to display a message indicating that there is no keyword corresponding to the input characters (e.g., "No corresponding candidate"). Input unit 410 does not accept any instruction to select or determine a keyword while this message is displayed. More specifically, the screen displayed on display 130 does not change while this message is shown even when the user presses down up key 304a, down key 304b or search/determination key 306. Another mode may be applied in which the candidate keyword list is blanked to show failure to retrieve a keyword.

It should be noted that prediction conversion unit 443 can retrieve a word having an expression not exactly matching but similar to an input character string. For example, prediction conversion unit 443 retrieves a predicted word without distinguishing between katakana and hiragana. More specifically, prediction conversion unit 443 retrieves a word "ペンギン" (in katakana notation) as a predicted word when a word "ぺん" is input in hiragana, similarly to the case when a word "ペン" is input in katakana. Another example of device of associating an input character string with a keyword and a specific description thereof will be given later.

Example sentence preview 1034 displays example sentences including a selected keyword. Keyword selection unit 442 searches template database 422 for example sentences related to the selected keyword, based on index data 424. Specific processing performed by keyword selection unit 442 in determining example sentences to be displayed in example sentence preview 1034 is similar to the processing performed by example sentence selection unit 444 in creating a sentence list display screen, which will be described later. Therefore, detailed description of this processing will not be given here. Example sentence preview 1034 facilitates a user selection of a desired example sentence. The user can select a keyword while looking at related example sentences, and is thus less likely to select an undesired keyword. That is, this reduces the possibility that example sentences related to a user-selected keyword include no example sentence that the user expects.

When the number of characters of a keyword exceeds the number of characters displayable in a line on the screen, keyword selection unit 442 causes display of characters at the beginning of the keyword in candidate keyword list 1032. When the number of characters of an example sentence exceeds the number of characters displayable in a line on the screen, keyword selection unit 442 causes display of characters at the beginning of the example sentence in candidate keyword list 1032.

Figure 15:
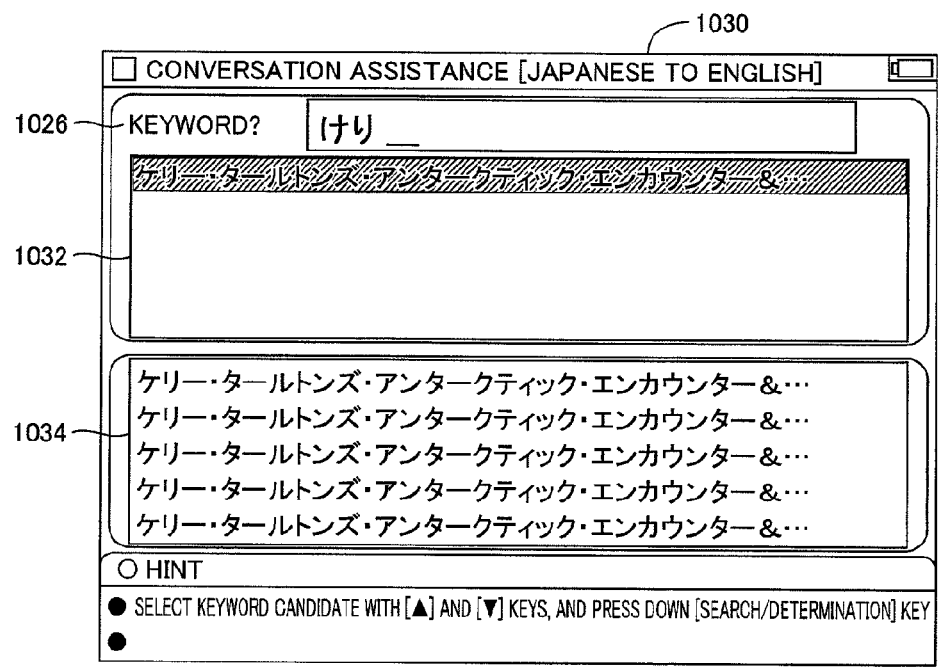
FIG. 15 illustrates keyword input screen 1030 displaying a long keyword and example sentences.

Such an example screen is shown in FIG. 15. FIG. 15 shows a screen that keyword selection unit 442 causes display unit 462 to display when prediction conversion unit 443 extracts a word "ケリー・タールトンズ・アンタークティック・エンカウンター&アンダー ワールド" as a predicted word. FIG. 15 also shows a screen for translating Japanese (first language) into English (second language). In FIG. 15, a keyword input in character input box 1026, a sentence displayed in candidate keyword list 1032, and a sentence displayed in example sentence preview 1034 are in Japanese (first language).

With reference to FIG. 15, in candidate keyword list 1032, characters from the beginning of a predicted word to the (number of characters displayable on display unit 462 minus 1)th character are displayed, that is, "ケリー・タールトンズ・アンター クティック・エン カウンター &" is displayed, followed by " . . . . " Keyword selection unit 442 may cause display of characters from the beginning of a predicted word to the (number of characters displayable on display unit 462) th character without displaying " . . . . " Omissions are also made in the example sentences displayed in example sentence preview 1034, similarly to the predicted word. While this example deals with the case where the number of characters displayable on the display panel is limited, the character font may be reduced in size, or word wrap may be adopted.

(3) Example Sentence Determination

Figure 16:
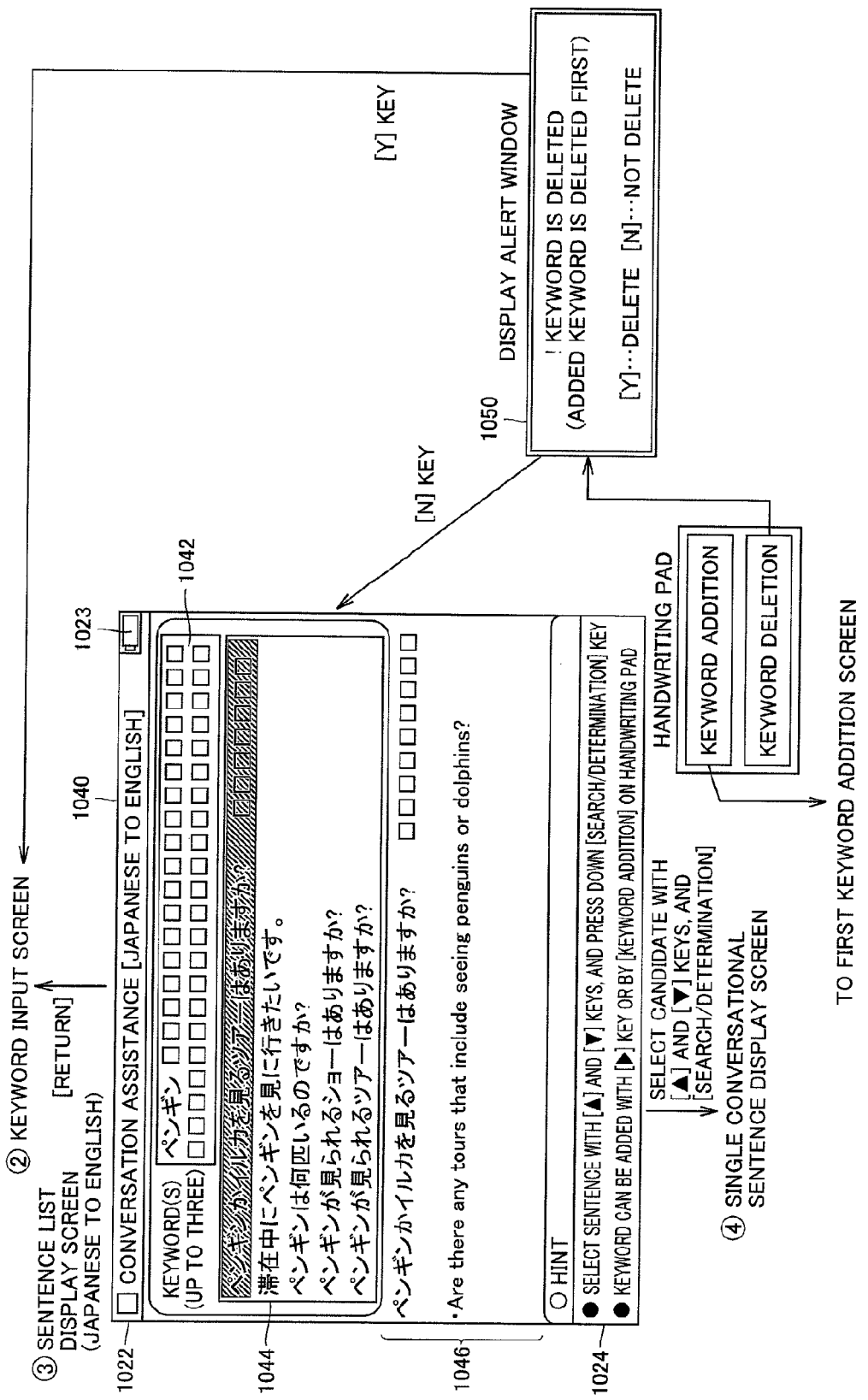
FIG. 16 illustrates a sentence list display screen 1040.

When one of keywords displayed in candidate keyword list 1032 is selected while keyword input screen 1030 is displayed, processing unit 440 causes display of a sentence list display screen 1040 shown in FIG. 16 to assist a user to decide an example sentence. FIG. 16 shows a screen for translating Japanese (first language) into English (second language). In FIG. 16, a keyword displayed in a keyword display box 1042, sentences displayed in example sentence list 1044, and the first sentence in a translation preview 1046 are in Japanese (first language). The second sentence in translation preview 1046 is in English (second language).

With reference to FIG. 16, sentence list display screen 1040 includes keyword display box 1042, example sentence list 1044, and translation preview 1046.

Keyword display box 1042 displays the keyword selected in keyword input screen 1030. As will be described later, keyword selection unit 442 can set an additional keyword. Keyword display box 1042 also displays the set additional keyword as well as the keyword selected in keyword input screen 1030. Such a display example will be given later. It is to be noted that conversation assistance device 100 according to the present embodiment can accept up to three keywords. However, the maximum number of keywords is not limited to three.

Example sentence list 1044 displays example sentences retrieved by example sentence selection unit 444. The example sentences displayed in example sentence list 1044 are associated with a keyword displayed in keyword display box 1042, and have been extracted by example sentence selection unit 444. Herein, an example sentence associated with a keyword means an example sentence having a variable section whose keyword can be replaced.

In the present embodiment, example sentence selection unit 444 shall display up to twenty retrieved example sentences in example sentence list 1044. The user can easily identify the example sentences because the number of example sentences displayed is limited. However, the maximum number of example sentences displayed in example sentence list 1044 is not limited to twenty. Example sentence selection unit 444 may not necessarily limit the number of example sentences displayed.

Referring back to FIG. 4, example sentence extraction processing performed by example sentence selection unit 444 will now be described in detail. In the present embodiment, example sentence selection unit 444 extracts example sentences associated with a keyword based on index data 424. More specifically, example sentence selection unit 444 extracts example sentences associated with a keyword as will be described below.

First, example sentence selection unit 444 obtains category number 616 of a selected keyword referring to keyword-category data 425. More specifically, example sentence selection unit 444 extracts an entry including expression 614 that matches the selected keyword, and obtains category number 616 of the extracted entry as category number 616 of the selected keyword.

Example sentence selection unit 444 then obtains template number 510 corresponding to obtained category number 616 based on category-template data 426. When there are a plurality of template numbers 510 corresponding to category number 616, example sentence selection unit 444 obtains all template numbers 510 corresponding to the category number.

Finally, example sentence selection unit 444 searches for and extracts a template having template number 510 obtained from template database 422. When a plurality of template numbers 510 have been obtained, example sentence selection unit 444 retrieves templates corresponding to the respective template numbers 510 as obtained. Example sentence selection unit 444 then extracts a category sentence of a retrieved template in which a variable section replaceable by a keyword related to a keyword has been replaced by the keyword, and other variable sections have been replaced by words of a typical word sentence, as an example sentence related to the keyword.

With reference to FIGS. 6A and 6B, the processing performed by example sentence selection unit 444 when extracting a template number based on an input character string will now be described more specifically.

For example, a keyword having expression 614 of "バッグ" is selected, example sentence selection unit 444 extracts keyword-category data 425c having expression 614 of "バッグ", and obtains category numbers "C0010" and "C0011" of extracted keyword-category data 425c.

Example sentence selection unit 444 then obtains template numbers 510 (10100, 10151, 10200) corresponding to obtained category number "C0010" and template number 510 corresponding to "C0011", based on category-template data 426. Then, example sentence selection unit 444 searches through template database 422 and obtains templates 500 having obtained template numbers 510.

For example, when a keyword having expression 614 of "日本", example sentence selection unit 444 extracts keyword-category data 425a and 425b having expression 614 of "日本". Example sentence selection unit 444 then obtains category number "C3001" of expression 614 of "日本" from extracted keyword-category data 425a and 425b.

Example sentence selection unit 444 then searches for category-template data 426b related to obtained category number "C3001" to retrieve template numbers (10100, 17151, 18000, 18500) corresponding to obtained category number "C3001". Then, example sentence selection unit 444 searches through template database 422 and retrieves templates 500 having obtained template numbers 510.

Example sentence selection unit 444 replaces a variable section of category sentence (Japanese) 530 of obtained template 500 by a word to create an example sentence. Example sentence selection unit 444 replaces a variable section for which a keyword selected by keyword selection unit 442 is a candidate word, by the selected keyword. Other variable sections are replaced by words included in typical word sentence 520. As described previously, an example sentence having no variable section (only consisting of fixed sections) can also be created similarly.

Referring again to FIG. 16, one example sentence among the example sentences shown in example sentence list 1044 is a selection target, and shown by hatching. FIG. 16 shows the case where an example sentence of "ペンギンかイルカを見るツアーは ありますか" is a selection target. Example sentence selection unit 444 changes the example sentence of the selection target in accordance with an instruction such as pressing down of up key 304*a*, down key 304*b*, preceding page key 322, or succeeding page key 324.

When search/determination key 306 is pressed down while sentence list display screen 1040 is displayed, example sentence selection unit 444 causes display 130 to display a single conversational sentence display screen including a translation of the example sentence selected in example sentence list 1044. The single conversational sentence display screen and the operation of conversation assistance device 100 after the single conversational sentence display screen is displayed will be described later.

When the number of characters of an example sentence displayed in example sentence list 1044 exceeds the number of characters displayable in a line on the screen, example sentence selection unit 444 shall cause display of characters at the beginning of each example sentence in example sentence list 1044. Such an example screen is shown in FIG. 17. Omission of characters of an example sentence is similar to that performed by keyword selection unit 442 described with reference to FIG. 15. FIG. 17 also shows a screen for translating Japanese (first language) into English (second language). In FIG. 17, keywords displayed in keyword display box 1042, a sentence displayed in example sentence list 1044, and the first sentence in translation preview 1046 are in Japanese (first language). The second sentence in translation preview 1046 is in English (second language).

Translation preview 1046 displays the example sentence selected in example sentence list 1044 and a translation of the selected example sentence. The displayed translation has been created by example sentence selection unit 444 based on the selected example sentence and template database 422. Translation preview 1046 facilitates a user selection of a desired example sentence. The user can select an example sentence while viewing a translation, and is thus less likely to select an unsuitable example sentence.

(4) Keyword Addition and Deletion

Example sentence selection unit 444 controls handwriting pad 120 while sentence list display screen 1040 is displayed, so that handwriting pad 120 receives an instruction on keyword addition and an instruction on keyword deletion. When handwriting pad 120 receives an instruction, keyword selection unit 442 starts keyword addition or deletion processing. It is to be noted that example sentence selection unit 444 also starts the keyword addition processing when right key 304*c* is pressed down while sentence list display screen 1040 is displayed.

When handwriting pad 120 receives the instruction on keyword addition, keyword selection unit 442 starts processing for setting first additional keyword. With reference to FIGS. 18 to 21, the processing for setting the first additional keyword will now be described. FIGS. 18 to 21 each illustrate a screen displayed on the display in setting the first additional keyword.

Figure 19:
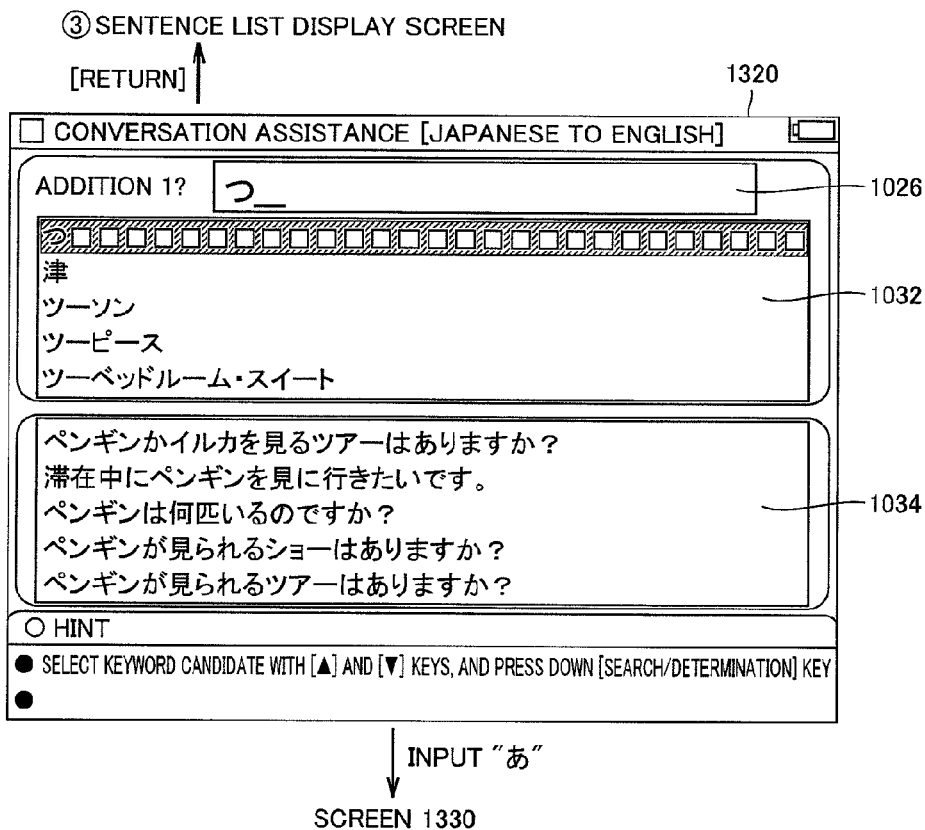
FIG. 19 is a second diagram for illustrating a screen displayed on display 130 for determining the first additional keyword.
Figure 20:
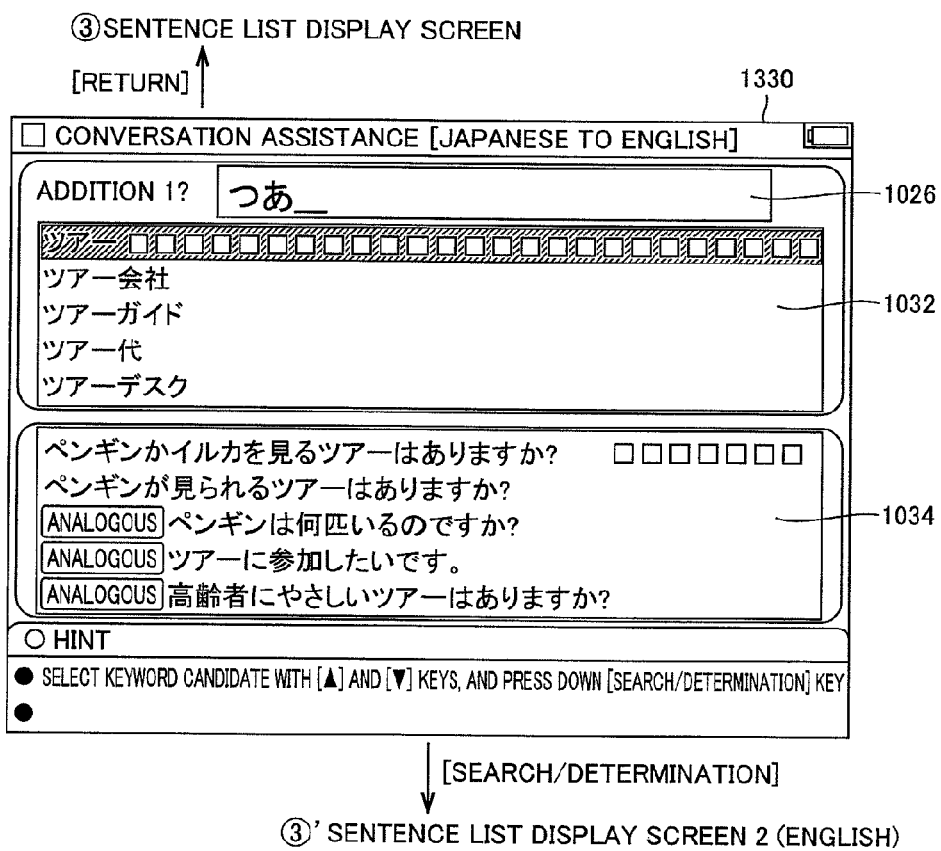
FIG. 20 is a third diagram for illustrating a screen displayed on display 130 for determining the first additional keyword.
Figure 21:
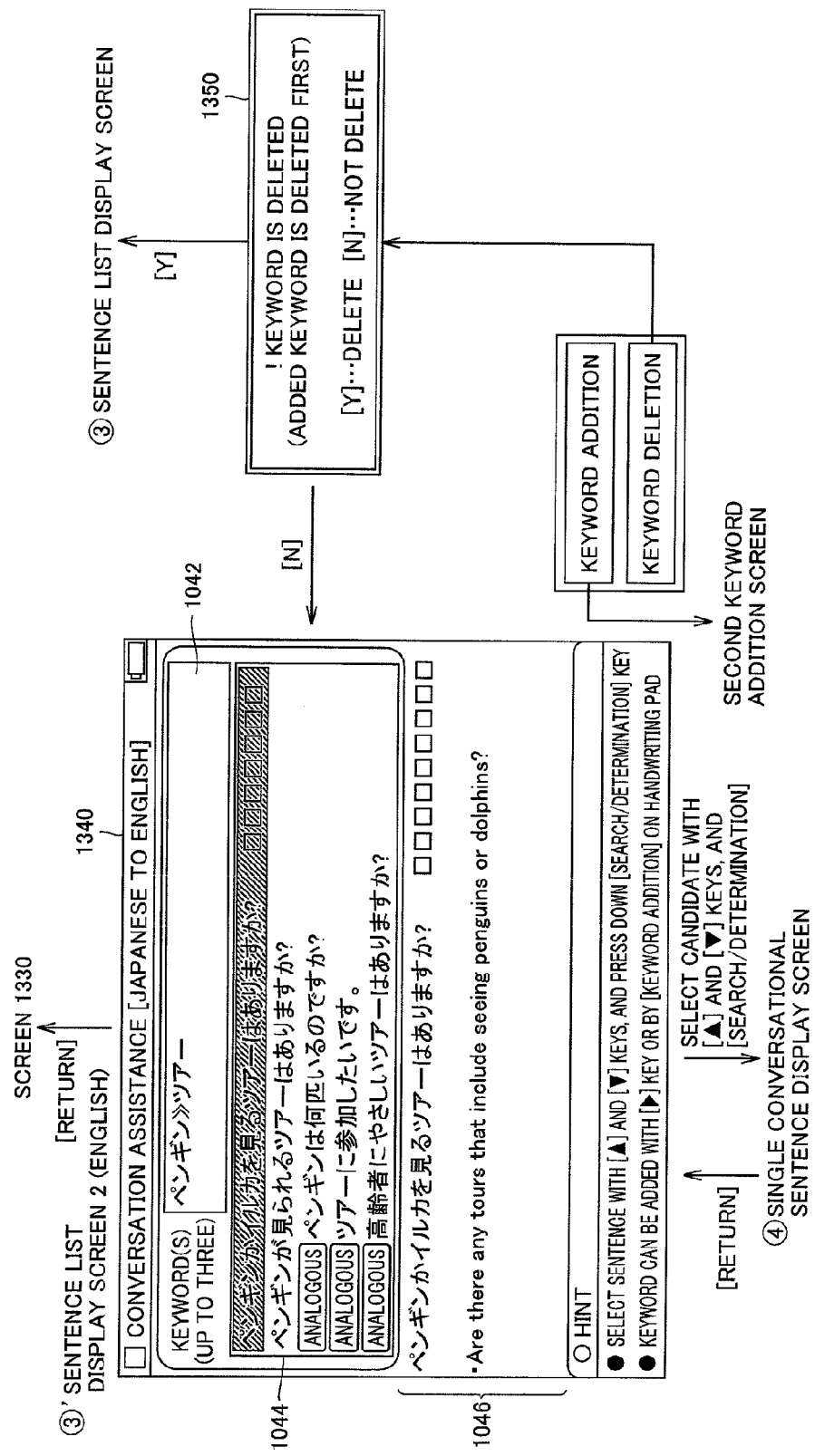
FIG. 21 is a fourth diagram for illustrating a screen displayed on display 130 for determining the first additional keyword.

In each of FIGS. 18 to 20, a keyword input in character input box 1026, a sentence displayed in candidate keyword list 1032, and sentences displayed in example sentence preview 1034 are in Japanese (first language). In FIG. 21, keywords input in keyword display box 1042, sentences displayed in example sentence list 1044, and the first sentence in translation preview 1046 are in Japanese (first language). The second sentence in translation preview 1046 is in English (second language).

When handwriting pad 120 receives the instruction on keyword addition, keyword selection unit 442 first causes display of a keyword addition screen 1310 shown in FIG. 18. The keyword addition screen includes a character input box, a candidate keyword list, and an example sentence preview.

Because no character has been input after the instruction on keyword addition, no character is displayed in the character input box. No keyword is displayed in the candidate list keyword list. The example sentence preview shows example sentences related to the already determined keyword "ペンギン".

In each of FIGS. 18 to 20, a keyword input in character input box 1026, text displayed in candidate keyword list 1032, and sentences displayed in example sentence preview 1034 are in Japanese (first language). In FIG. 21, keywords input in keyword display box 1042, sentences displayed in example sentence list 1044, and the first sentence in translation preview 1046 are in Japanese (first language). The second sentence in translation preview 1046 is in English (second language).

When handwriting pad 120 receives the instruction on keyword addition, keyword selection unit 442 first displays a keyword addition screen 1310 shown in FIG. 18. The keyword addition screen includes a character input box, a candidate keyword list, and an example sentence preview. Because no character has been input after the instruction on keyword addition, no character is displayed in the character input box. No keyword is displayed in the candidate list keyword list. The example sentence preview shows example sentences related to the already determined keyword "ペンギン".

When return key 308 is pressed down while keyword addition screen 1310 is displayed, keyword selection unit 442 causes the display to display sentence list display screen 1040. More specifically, processing unit 440 terminates the keyword addition processing and restarts the processing for selecting an example sentence.

When a character "つ" is input while keyword addition screen 1310 is displayed, keyword selection unit 442 causes display 130 to display keyword addition screen 1320 shown in FIG. 19. With reference to FIG. 19, the candidate keyword list in keyword addition screen 1320 displays keywords related to "つ".

When return key 308 is pressed down while keyword addition screen 1320 is displayed, keyword selection unit 442 causes the display to display sentence list display screen 1040. More specifically, processing unit 440 terminates the keyword addition processing and restarts the processing for selecting an example sentence.

When a character "あ" is input while keyword addition screen 1320 is displayed, keyword selection unit 442 causes display 130 to display keyword addition screen 1330 shown in FIG. 20. With reference to FIG. 20, the candidate keyword list in keyword addition screen 1330 displays keywords related to "つあ". Herein, a screen in which the keyword "ツアー" has been selected is shown.

The example sentence preview in keyword addition screen 1330 displays example sentences related to at least one of "ペンギン" and "ツアー". Herein, keyword selection unit 442 causes the example sentence preview to display example sentences including only one of "ペンギン" and "ツアー", and example sentences including both in a distinguishable manner. Specifically, keyword selection unit 442 causes display of the example sentences including only one of the keywords, with "analogous" marks assigned at the head. In the example sentence preview, the example sentences including both keywords are located above the example sentences including only one of the keywords. Such a display allows the user to easily identify how the example sentences displayed in the example sentence preview relate to the input keywords.

Keyword selection unit 442 may distinguish between example sentences including all of selected keywords and other example sentences by arranging the example sentences in an order based on the number of selected keywords included in each of the example sentences. Alternatively, example sentences may be arranged in an order based on the degree of relationship, which has been determined in advance between a keyword and each example sentence.

When return key 308 is pressed down while keyword addition screen 1330 is displayed, keyword selection unit 442 causes the display to display sentence list display screen 1040. More specifically, processing unit 440 terminates the keyword addition processing and restarts the processing for selecting an example sentence.

When search/determination key 306 is pressed down while keyword addition screen 1330 is displayed, keyword selection unit 442 causes display of a second sentence list display screen 1340 shown in FIG. 21. Second sentence list display screen 1340 includes a keyword display box, an example sentence list, and a translation preview.

The keyword display box displays the initially set keyword "ペンギン" and the keyword "ツアー" selected in keyword addition screen 1330. The keyword display box also displays ">>" between the initially set keyword and the additional keyword. Separation from the additional keyword is not limited to this example, and may be achieved with another symbol such as ",", "&", or "+". Alternatively, the font may be changed per keyword, or the character color may be changed.

When search/determination key 306 is pressed down while second sentence list display screen 1340 is displayed, example sentence selection unit 444 causes display 130 to display a single conversational sentence display screen including a translation of the example sentence selected in the example sentence list in keyword addition screen 1330. The single conversational sentence display screen and the operation of conversation assistance device 100 after the single conversational sentence display screen is displayed will be described later. When return key 308 is pressed while second sentence list display screen 1340 is displayed, example sentence selection unit 444 causes display 130 to display keyword addition screen 1330 again.

While second sentence list display screen 1340 is displayed, example sentence selection unit 444 controls handwriting pad 120, so that handwriting pad 120 receives the instruction on addition of a further keyword (second additional keyword) and the instruction on keyword deletion.

With reference to FIGS. 22 to 25, processing for setting the second additional keyword will be described. FIGS. 22 to 25 each illustrate a screen displayed on the display in setting the second additional keyword.

Figure 22:
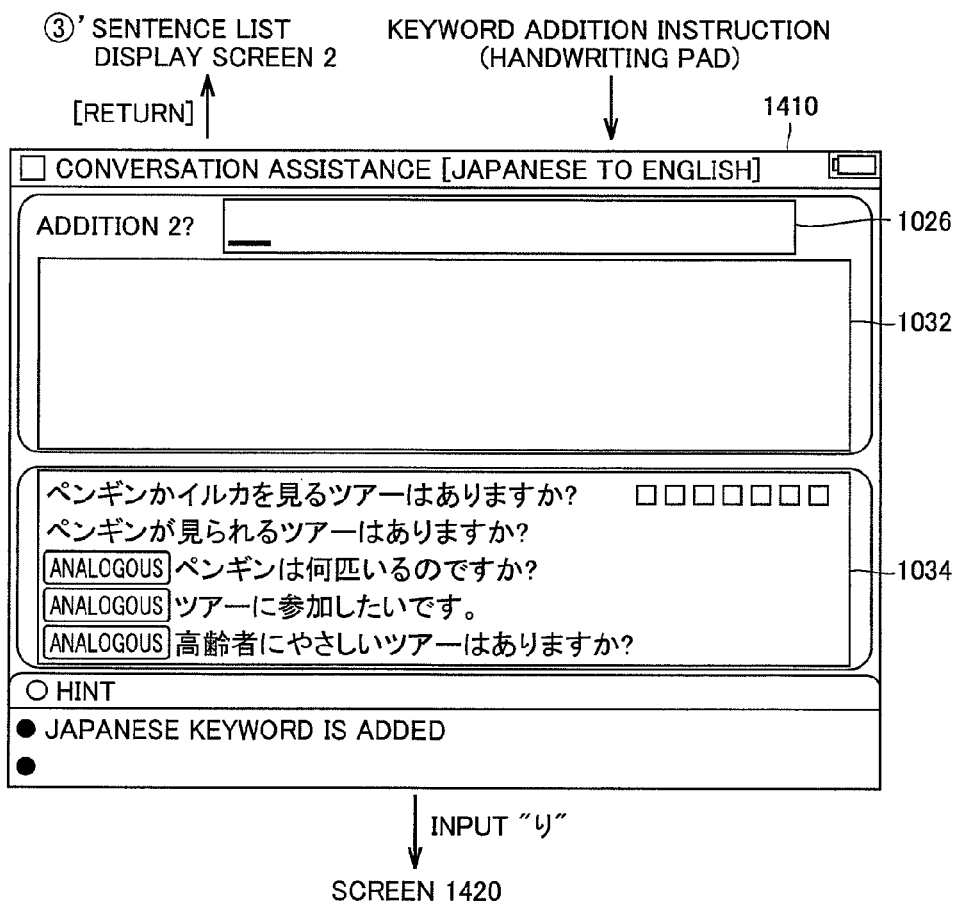
FIG. 22 is a first diagram for illustrating a screen displayed on display 130 for determining a second additional keyword.
Figure 23:
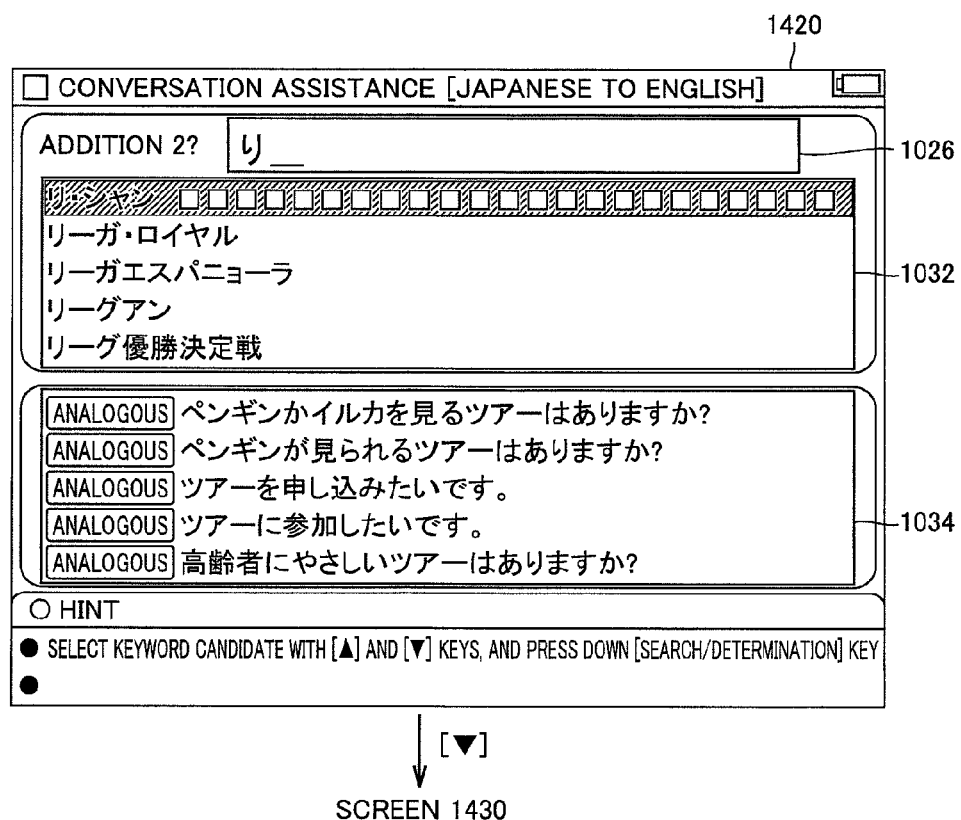
FIG. 23 is a second diagram for illustrating a screen displayed on display 130 for determining the second additional keyword.
Figure 24:
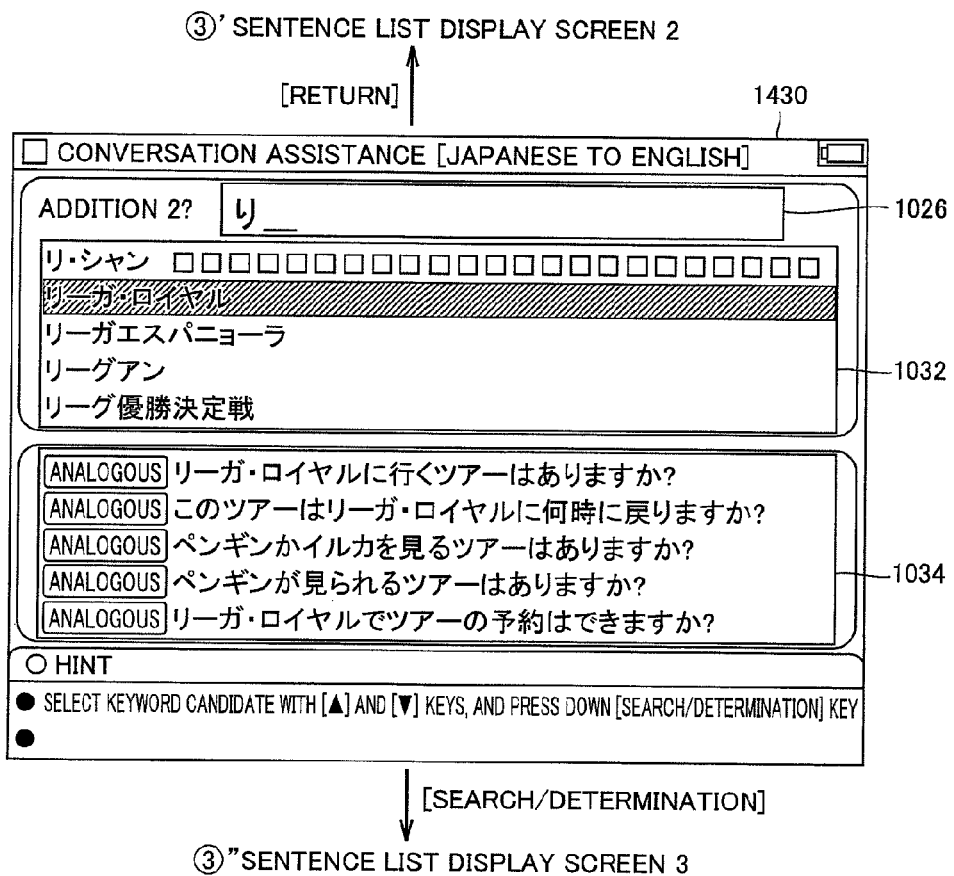
FIG. 24 is a third diagram for illustrating a screen displayed on display 130 for determining the second additional keyword.
Figure 25:
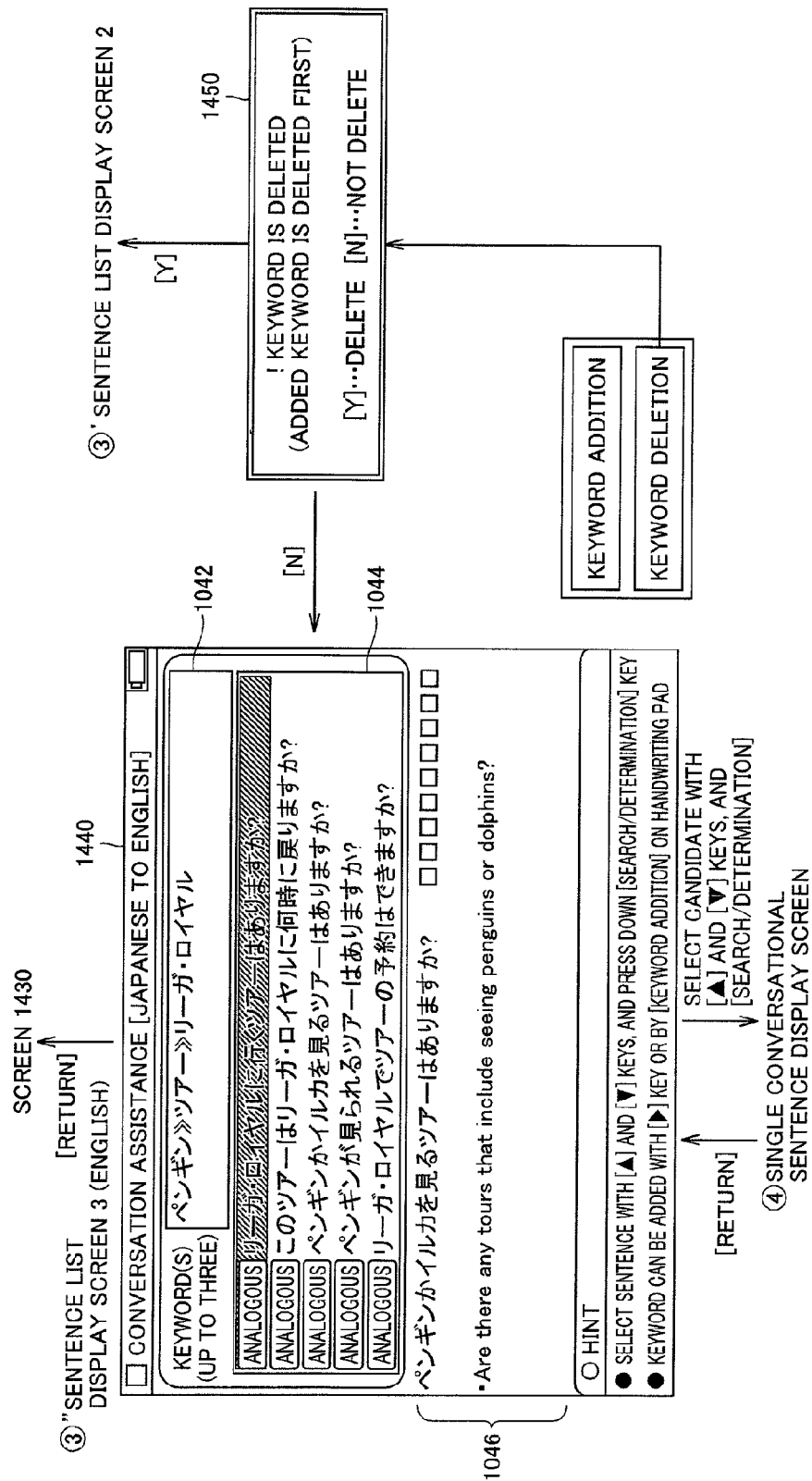
FIG. 25 is a fourth diagram for illustrating a screen displayed on display 130 for determining the second additional keyword.

In each of FIGS. 22 to 24, a keyword input in character input box 1026, a sentence displayed in candidate keyword list 1032, and sentences displayed in example sentence preview 1034 are in Japanese (first language). In FIG. 25, keywords displayed in keyword display box 1042, sentences displayed in example sentence list 1044, and the first sentence in translation preview 1046 are in Japanese (first language). The second sentence in translation preview 1046 is in English (second language).

Upon receipt of the instruction on keyword addition while second sentence list display screen 1340 is displayed, keyword selection unit 442 causes display 130 to display keyword addition screen 1410 shown in FIG. 22. When return key 308 is pressed down while keyword addition screen 1410 is displayed, keyword selection unit 442 causes display of second sentence list display screen 1340.

Keyword addition screen 1420 shown in FIG. 23 is a screen of which display on display 130 is caused by keyword selection unit 442 when "リ" is input while second sentence list display screen 1340 is displayed. Keyword addition screen 1420 has a similar structure to the screen displayed in setting the first additional keyword.

The keyword display box in keyword addition screen 1420 displays keywords related to "リ". Herein, a keyword "リ・シャン" has been selected. The example sentence preview causes display of example sentences associated with the keywords "ペンギン" and "ツアー" having been set so far, as well as "リ・シャン". The method of display of the example sentences caused by keyword selection unit 442 is similar to that of display of FIG. 20 and so forth.

Keyword addition screen 1430 shown in FIG. 24 is a screen of which display on display 130 is caused by keyword selection unit 442 when down key 304b is pressed down while keyword addition screen 1420 is displayed. In keyword addition screen 1430, a keyword directly below the keyword selected in keyword addition screen 1420 is selected.

When search/determination key 306 is pressed down while keyword addition screen 1430 is displayed, keyword selection unit 442 causes display 130 to display a third sentence list display screen 1440 shown in FIG. 25. The operation of conversation assistance device 100 while third sentence list display screen 1440 is displayed is similar to that while sentence list display screen 1040 or second sentence list display screen 1340 is displayed. For example, when handwriting pad 120 receives the instruction on keyword deletion, keyword selection unit 442 causes display 130 to display an alert window 1450. However, handwriting pad 120 does not accept keyword addition, because the maximum number of keywords that can be set has already been set.

(5) Output of Single Conversational Sentence

Figure 26:
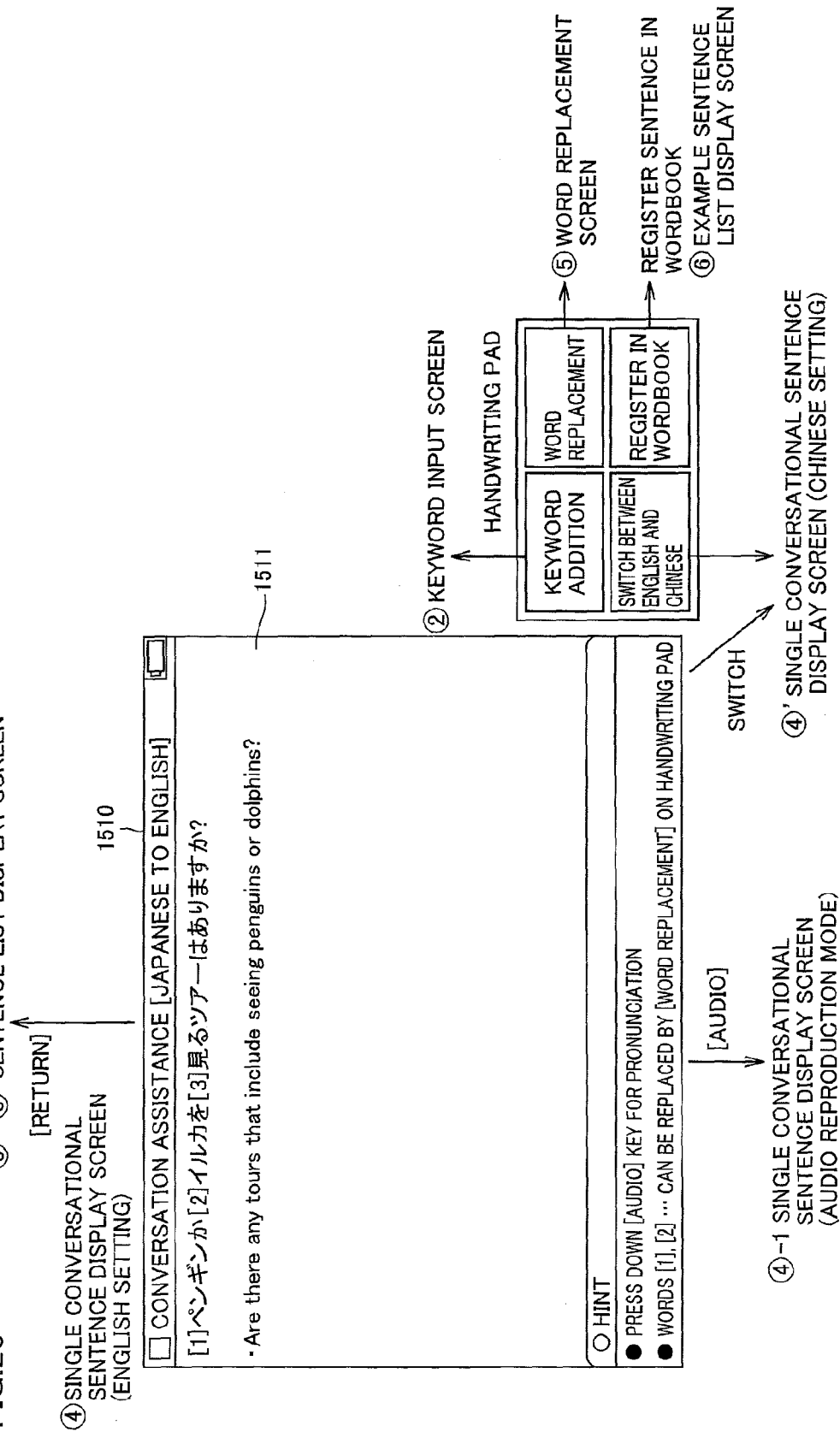
FIG. 26 shows a single conversational sentence display screen 1510 in English setting.

When search/determination key 306 is pressed down while sentence list display screen 1040, second sentence list display screen 1340, or third sentence list display screen 1440 is displayed, translation output unit 446 causes display 130 to display a single conversational sentence display screen 1510 as shown in FIG. 26. Since the language mode from Japanese to English has been set, translation output unit 446 causes display of single conversational sentence display screen 1510 in English setting. In FIG. 26, the first sentence in a conversational sentence display area 1511 is in Japanese (first language). The second sentence in conversational sentence display area 1511 is in English (second language).

With reference to FIG. 26, single conversational sentence display screen 1510 includes an example sentence selected in sentence list display screen 1040, second sentence list display screen 1340, or third sentence list display screen 1440 and a translation corresponding to the selected example sentence in the set language (herein, English). Single conversational sentence display screen 1510 is a screen displayed when the example sentence "ペンギンかイルカを見るツアーはありますか?" has been selected.

Translation output unit 446 creates the translation based on template database 422. Specifically, translation output unit 446 creates the translation by replacing a variable section of category sentence (English) 550 by an English word corresponding to a Japanese word that replaces a variable section of category sentence (Japanese) 530.

Data indicating correspondence between Japanese words and English words shall be stored in advance in memory unit 420. Specifically, candidate words that can replace variable sections are given indices, and translation output unit 446 searches for an English word corresponding to a Japanese word based on the indices. However, the method in which translation output unit 446 creates a translation of an example sentence is not limited to this example.

When an example sentence is selected, processing unit 440 associates an input keyword, an example sentence search result, a translation result, and data on a data structure of a translation dictionary for conversation assistance (the sentence number, the number of variable sections, the number of words of a variable section per variable section, and the character string indicating a word of a variable section per variable section) related to the selected example sentence with one another, and causes memory unit 420 to store them as historical example sentence information 432 similar to registered example sentence information 430 described with reference to FIG. 11.

Figure 27:
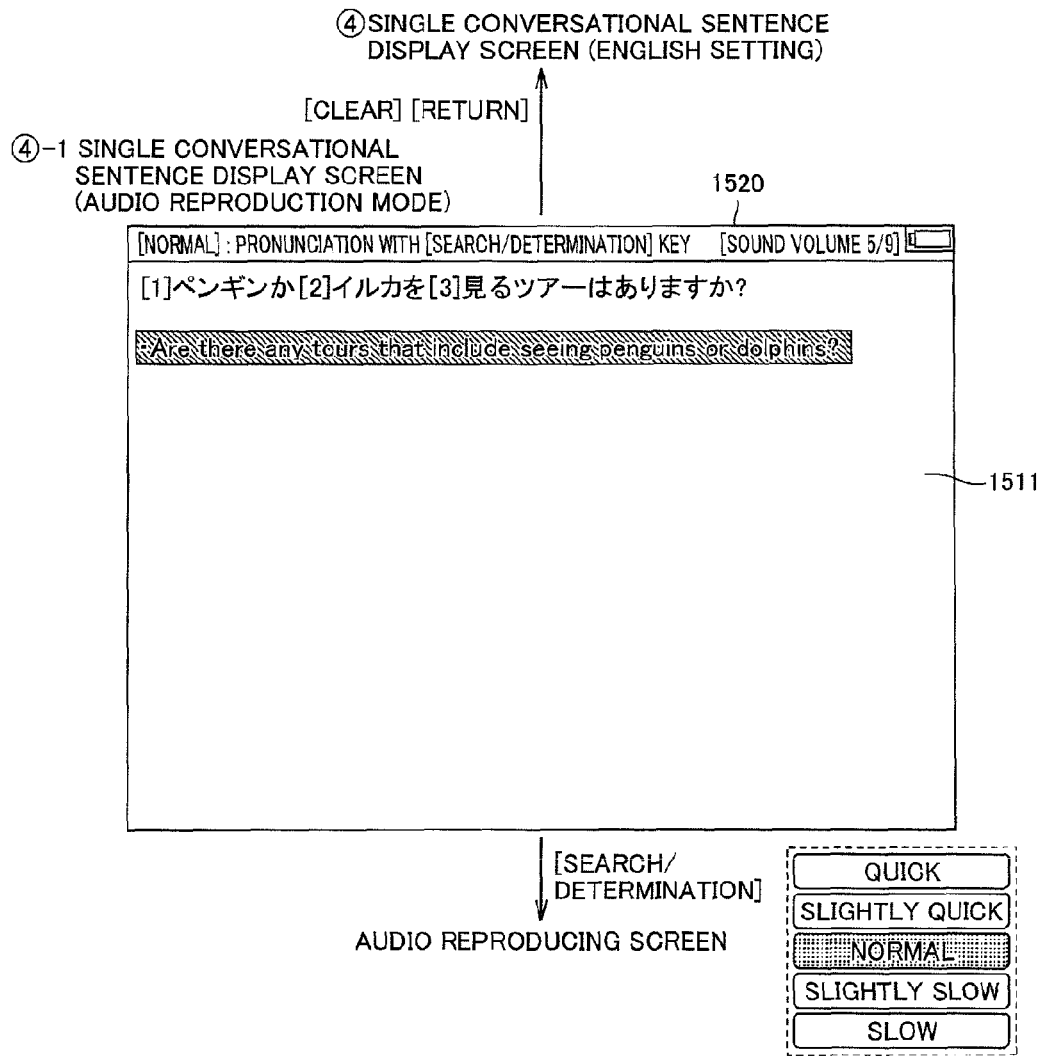
FIG. 27 shows a single conversational sentence display screen 1520 in an audio reproduction mode.

When audio key 318 is pressed down while single conversational sentence display screen 1510 is displayed, translation output unit 446 causes display 130 to display a single conversational sentence display screen 1520 in an audio reproduction mode shown in FIG. 27. In FIG. 27 as well, the first sentence in conversational sentence display area 1511 is in Japanese (first language). The second sentence in conversational sentence display area 1511 is in English (second language). In single conversational sentence display screen 1520, the setting of an output sound volume is shown at the title. In single conversational sentence display screen 1520, a translation is displayed by hatching.

When clear key 310 or return key 308 is pressed down while single conversational sentence display screen 1520 in the audio reproduction mode is displayed, translation output unit 446 causes display 130 to display single conversational sentence display screen 1510 again.

While single conversational sentence display screen 1520 is displayed, translation output unit 446 controls handwriting pad 120, so that handwriting pad 120 receives an instruction on setting the audio output speed of a translation. Herein, five types of speed setting are available. FIG. 27 shows the case where a "normal" output speed is selected, and "normal" is highlighted in handwriting pad 120.

Figure 28:
FIG. 28 shows an audio reproducing screen 1530.

When search/determination key 306 is pressed down while single conversational sentence display screen 1520 is displayed, translation output unit 446 causes display 130 to display an audio reproducing screen 1530 shown in FIG. 28, and outputs a translation by means of TTS (abbreviation of Text to Speech, which is a speech synthesis technique) in accordance with the setting of sound volume and speed. In FIG. 28 as well, the first sentence in conversational sentence display area 1511 is in Japanese (first language). The second sentence in conversational sentence display area 1511 is in English (second language). Audio reproducing screen 1530 includes an indication 1532 showing that audio is being reproduced. TTS is merely an example, and audio data recorded in advance in association with example sentences/translations may be used.

With reference to FIG. 26 again, while single conversational sentence display screen 1510 is displayed, translation output unit 446 controls handwriting pad 120, so that handwriting pad 120 receives instructions on keyword addition, word replacement, language mode change, and wordbook registration of example sentences.

When handwriting pad 120 receives the instruction on keyword addition, translation output unit 446 causes display of a keyword addition screen to start the processing for setting an additional keyword. The additional keyword setting processing is similar to that already described. When the maximum number of keywords has already been set, handwriting pad 120 does not accept the instruction on keyword addition.

When handwriting pad 120 receives the instruction on word replacement, translation output unit 446 starts the word replacement processing. The word replacement processing will be described later.

When "register in wordbook" displayed in handwriting pad 120 is selected while single conversational sentence display screen 1510 is displayed, processing unit 440 associates an input keyword, an example sentence search result, a translation result, data on a data structure of a translation dictionary for conversation assistance (the sentence number, the number of variable sections, the number of words of a variable section per variable section, and the character string indicating a word of a variable section per variable section) related to a displayed example sentence with one another, and causes memory unit 420 to store them as registered example sentence information 430 described with reference to FIG. 11.

Figure 29:
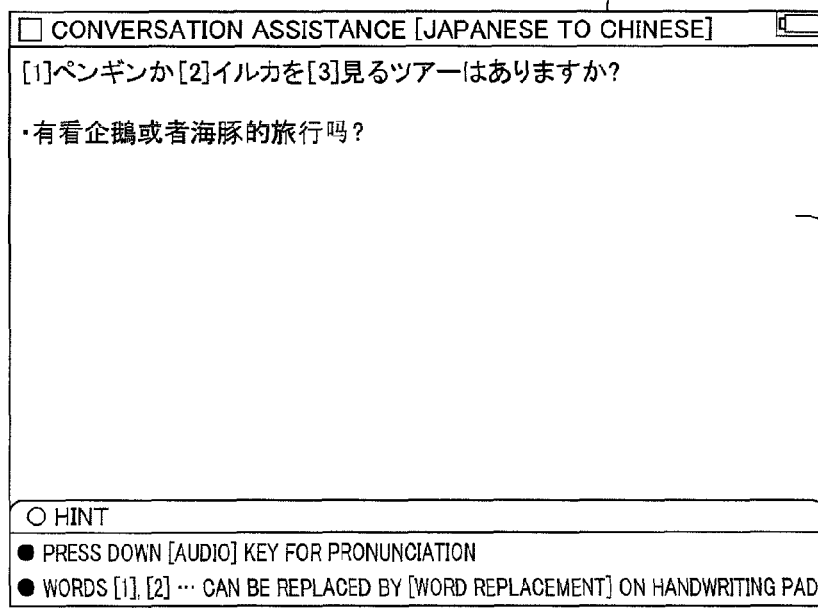
FIG. 29 shows a single conversational sentence display screen 1540 in Chinese setting.

When handwriting pad 120 receives the instruction on language mode change, translation output unit 446 changes the language mode and causes display 130 to display a single conversational sentence display screen 1540 in a new language mode shown in FIG. 29. In FIG. 29, the first sentence in conversational sentence display area 1511 is in Japanese (first language). The second sentence in conversational sentence display area 1511 is in Chinese (third language). When switch key 316 is pressed down as well, translation output unit 446 changes the language mode and causes display 130 to display single conversational sentence display screen 1540 in a new language mode (in Chinese setting).

Figure 30:
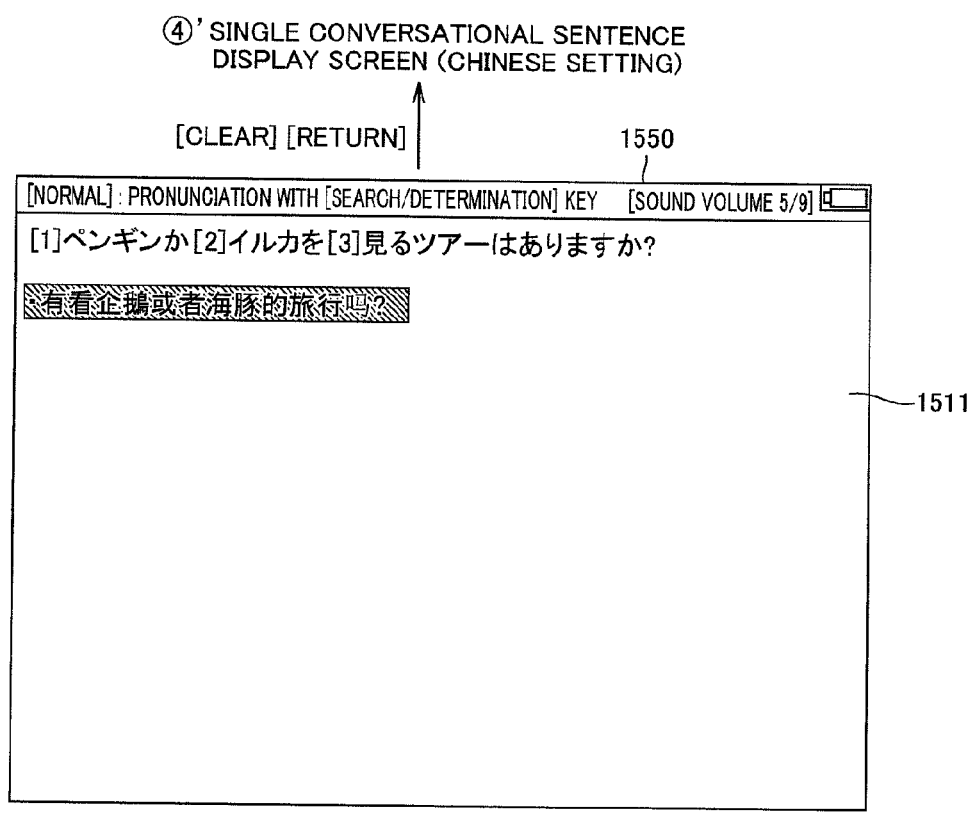
FIG. 30 shows a single conversational sentence display screen 1550 in the audio reproduction mode.

With reference to FIG. 29, single conversational sentence display screen 1540 in Chinese setting displays a Chinese translation of an example sentence. When audio key 318 is pressed down while single conversational sentence display screen 1540 is displayed, translation output unit 446 causes display 130 to display a single conversational sentence display screen 1550 in the audio reproduction mode shown in FIG. 30. In FIG. 30, the first sentence in conversational sentence display area 1511 is in Japanese (first language). The second sentence in conversational sentence display area 1511 is in Chinese (third language).

(6) Word Replacement

Conversation assistance device 100 according to the present embodiment can replace a word of a variable section in an example sentence displayed in the single conversational sentence display screen. The processing for replacing a word of a variable section will now be described.

The user can replace a word of a variable section by performing predetermined processing while the single conversational sentence display screen is displayed. The operation for replacing a word is generally divided into a key input for designating a variable section and an input of the word replacement instruction to handwriting pad 120.

First, the key input for designating a variable section will be described. With reference to FIG. 26 again, translation output unit 446 causes display of signs that specify variable sections in single conversational sentence display screen 1510, in association with variable sections of an example sentence. Herein, [1], [2] and [3] placed in front of words of the variable sections are signs that specify the variable sections. However, signs specifying variable sections are not limited to these, but may be alphabetic characters, numbers or the like. Translation output unit 446 may distinguish between the variable sections by different formats, such as different fonts or different types of underlines.

When a key corresponding to a sign that specifies a variable section is pressed down, translation output unit 446 starts the processing for replacing a word of the variable section corresponding to the pressed-down key. In this manner, the user can start the processing for replacing a word of the variable section by a simple operation.

Figure 31:
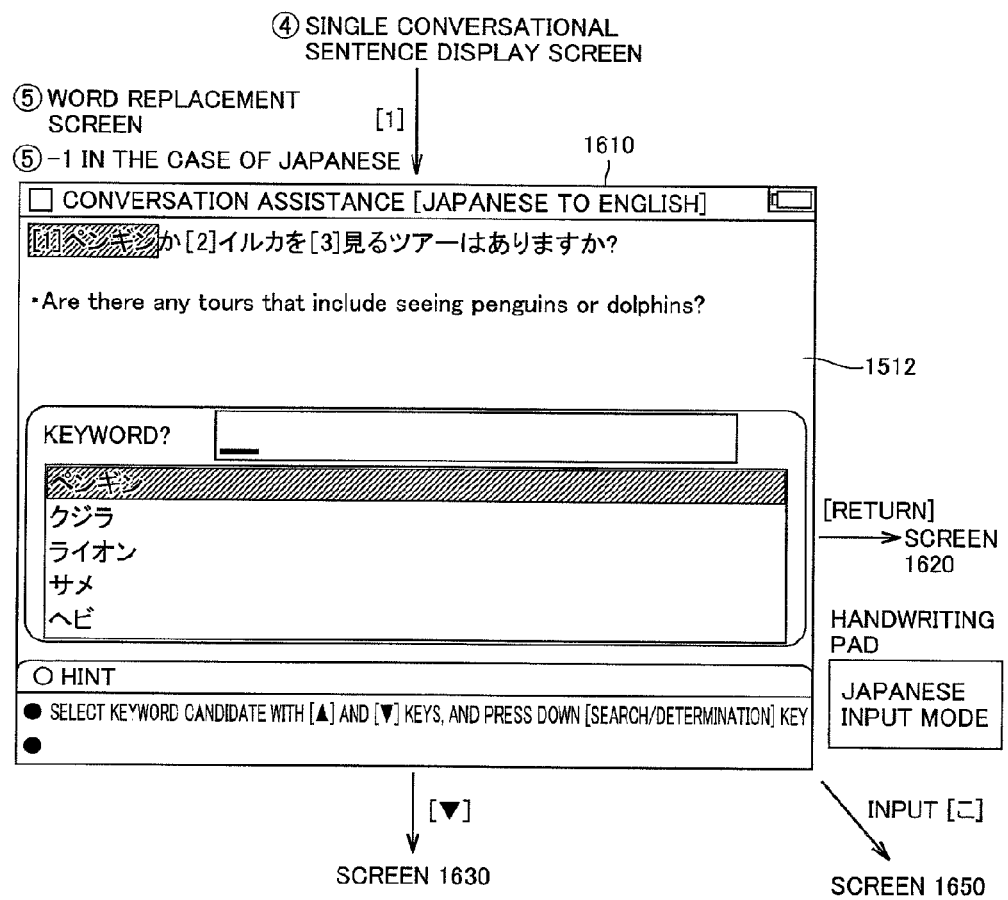
FIG. 31 shows a word replacement screen 1610 in which a variable section has been selected.

Specifically, when a [1] key is pressed down while single conversational sentence display screen 1510 is displayed, translation output unit 446 causes display 130 to display a word replacement screen 1610 shown in FIG. 31. In FIG. 31, the first sentence in conversational sentence display area 1512 is in Japanese (first language). The second sentence in conversational sentence display area 1512 is in English (second language). In word replacement screen 1610, a variable section corresponding to the pressed-down key is displayed by hatching. Candidate words that can replace the variable section corresponding to the pressed-down key are also displayed at a lower part of the screen. The candidate words are also in Japanese (first language).

Translation output unit 446 may emphasize the variable section corresponding to the pressed-down key by means other than hatching, such as an underline, color change, or font change. Translation output unit 446 may also provide unselected variable sections with hatching, an underline, color change, or font change for user visibility.

Figure 32:
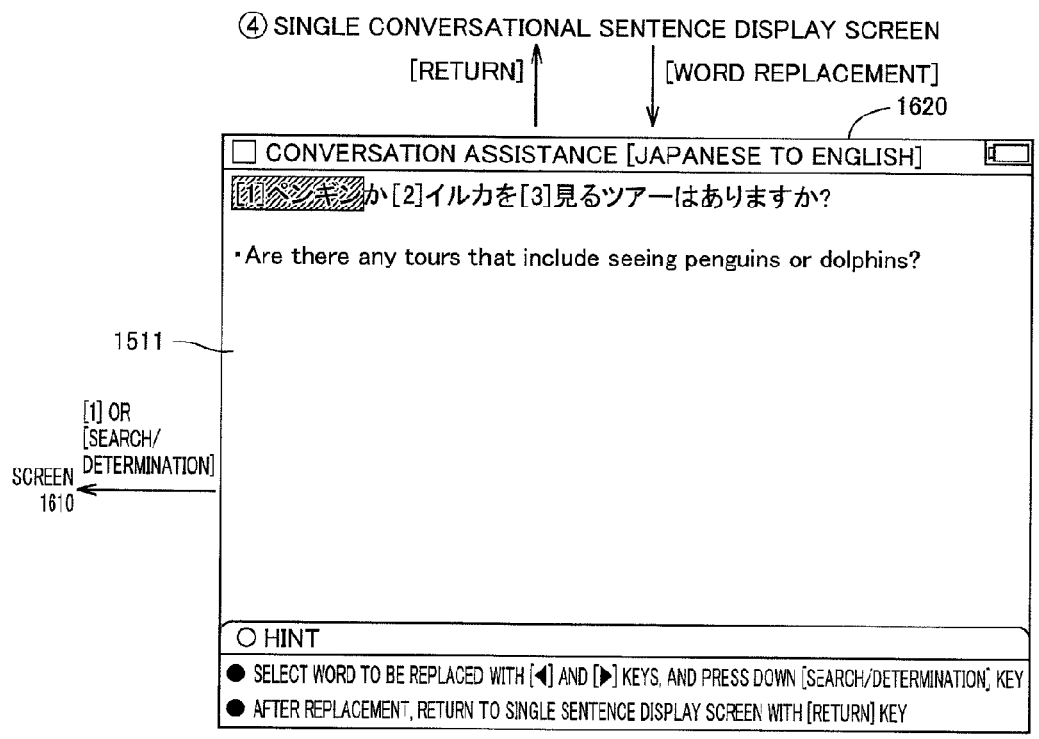
FIG. 32 shows a word replacement screen 1620 in which no variable section has been selected.

When handwriting pad 120 receives the word replacement instruction while single conversational sentence display screen 1510 is displayed as well, translation output unit 446 starts the word replacement processing. In this case, translation output unit 446 causes display 130 to display a word replacement screen 1620 shown in FIG. 32. In FIG. 32, the first sentence in conversational sentence display area 1511 is in Japanese (first language). The second sentence in conversational sentence display area 1511 is in English (second language). Word replacement screen 1620 is a word replacement screen before a variable section is selected. Translation output unit 446 also causes display 130 to display word replacement screen 1620 when return key 308 is pressed down while word replacement screen 1610 is displayed.

With reference to FIG. 32, a selected variable section is displayed by hatching in word replacement screen 1620. FIG. 32 shows a screen in which the first variable section has been selected. When right key 304*c* or left key 304*d* is pressed down while word replacement screen 1620 is displayed, translation output unit 446 changes the variable section of selection target.

When search/determination key 306 is pressed down while word replacement screen 1620 is displayed, translation output unit 446 causes display 130 to display word replacement screen 1610. When a key corresponding to a sign that specifies a variable section is pressed down, translation output unit 446 causes display 130 to display a word replacement screen for the variable section corresponding to the pressed-down key. When the [1] key is pressed down, translation output unit 446 causes display 130 to display word replacement screen 1610.

With reference to FIG. 31 again, replacement of a word of a selected variable section will now be described. Methods of replacing words are generally divided into direct selection and determination of a keyword displayed in the word replacement screen, and selection and determination of a keyword after input of a character to narrow down keywords.

Figure 33:
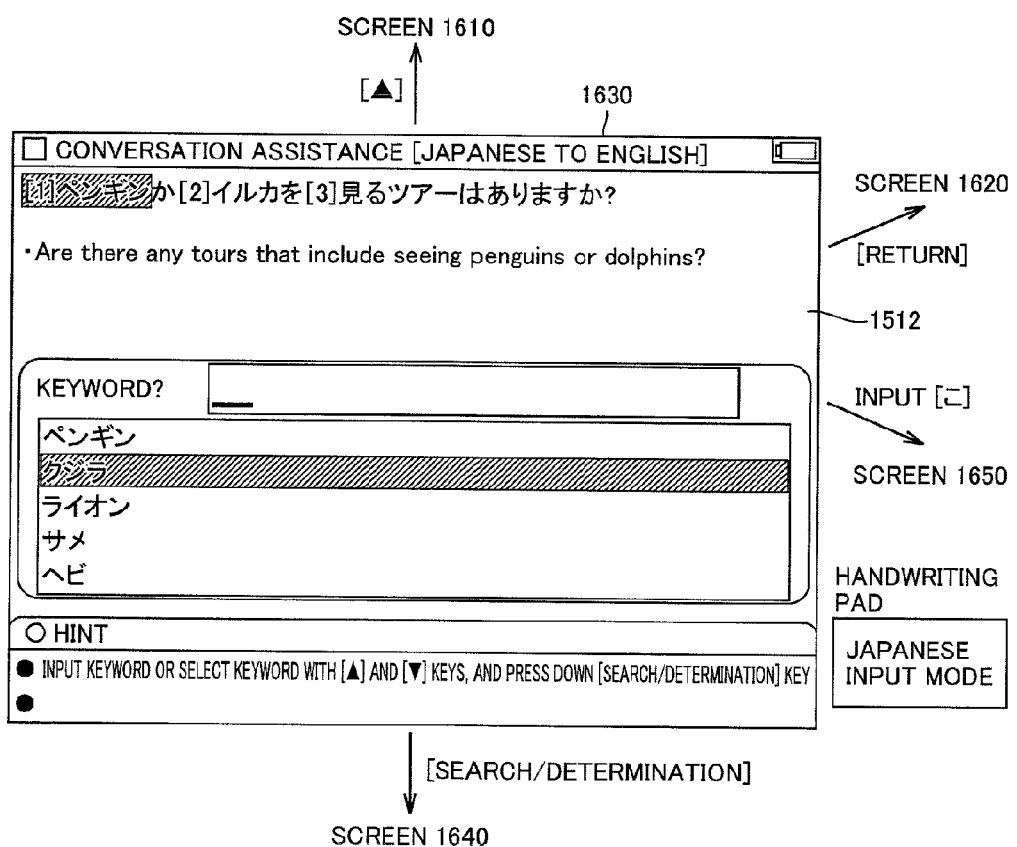
FIG. 33 shows a word replacement screen 1630 in which a variable section has been selected.

The former method will be described first. For example, when down key 304*b* is pressed down while word replacement screen 1610 is displayed, translation output unit 446 causes display 130 to display a word replacement screen 1630 shown in FIG. 33 in which a selected keyword has been changed. In FIG. 33, the first sentence in conversational sentence display area 1512 is in Japanese (first language). The second sentence in conversational sentence display area 1512 is in English (second language). The keyword selected in word replacement screen 1630 is "クジラ".

Figure 34:
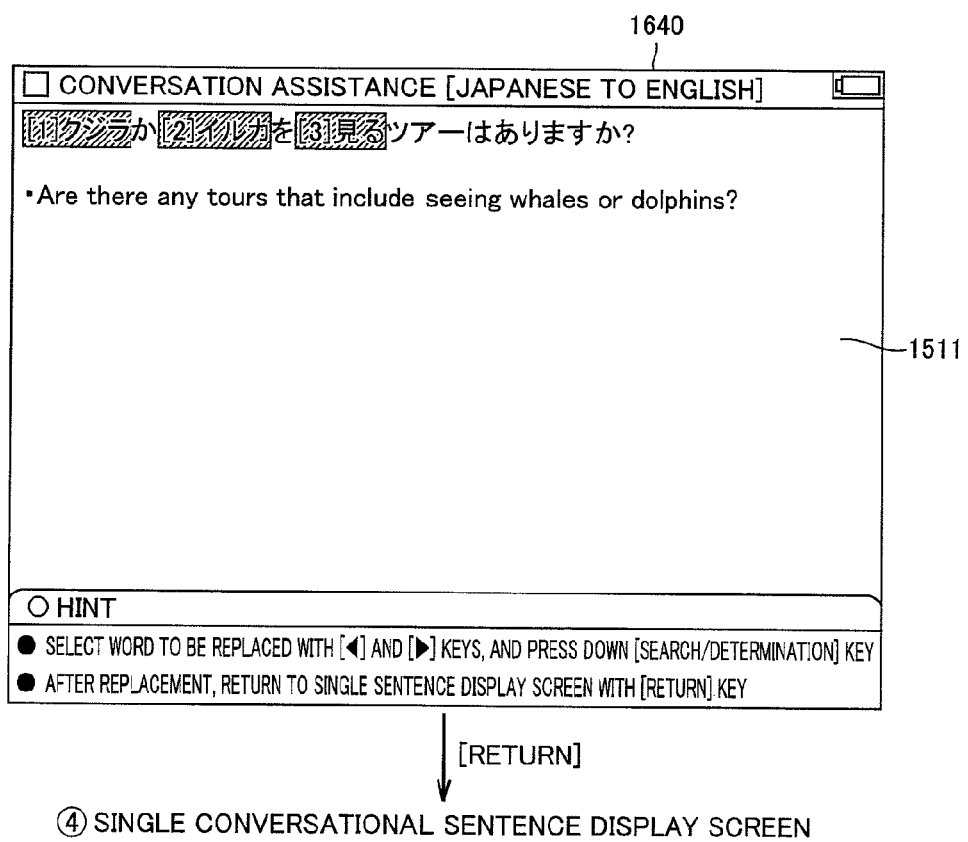
FIG. 34 shows a word replacement screen 1640 in which a word to replace the variable section has been changed to "クジラ".

When search/determination key 306 is pressed down while word replacement screen 1630 is displayed, translation output unit 446 causes display 130 to display a word replacement screen 1640 shown in FIG. 34. In FIG. 34, the first sentence in conversational sentence display area 1511 is in Japanese (first language). The second sentence in conversational sentence display area 1511 is in English (second language). Word replacement screen 1640 includes an example sentence in which the selected variable section has been replaced by the word (クジラ) selected in word replacement screen 1630, and a translation of the example sentence. When return key 308 is pressed down while word replacement screen 1640 is displayed, translation output unit 446 causes display 130 to display a single conversational sentence display screen for the example sentence after word replacement.

Referring back to FIG. 33, when return key 308 is pressed down while word replacement screen 1610 is displayed, translation output unit 446 causes display 130 to display word replacement screen 1620 before a variable section is selected. Displayed when up key 304*a* is pressed down is word replacement screen 1610 as a matter of course.

The latter method, that is, narrowing down keywords by character input, will now be described. When a character is input while a word replacement screen (such as word replacement screen 1610 shown in FIG. 31 or word replacement screen 1630 shown in FIG. 33) in which a variable section has been selected is displayed, translation output unit 446 extracts candidate words associated with the input character from among candidate words for the selected variable section, and causes display 130 to display the word replacement screen displaying the extracted words. As will be described later with reference to FIGS. 37 and 38, each variable section is configured such that not only a keyword can be selected and determined, but also a user can input any character string (e.g., a numeric character indicating a date or a number). Such keyword input shall be called free input.

Translation output unit 446 extracts words associated with the input character through processing similar to that of prediction conversion unit 443. More specifically, translation output unit 446 extracts words showing partial match to the input character string as words associated with the input character string. The following description assumes that translation output unit 446 extracts candidate words showing prefix match to the input character string. However, translation output unit 446 may extract candidate words based on another criterion such as exact match or partial match.

Figure 35:
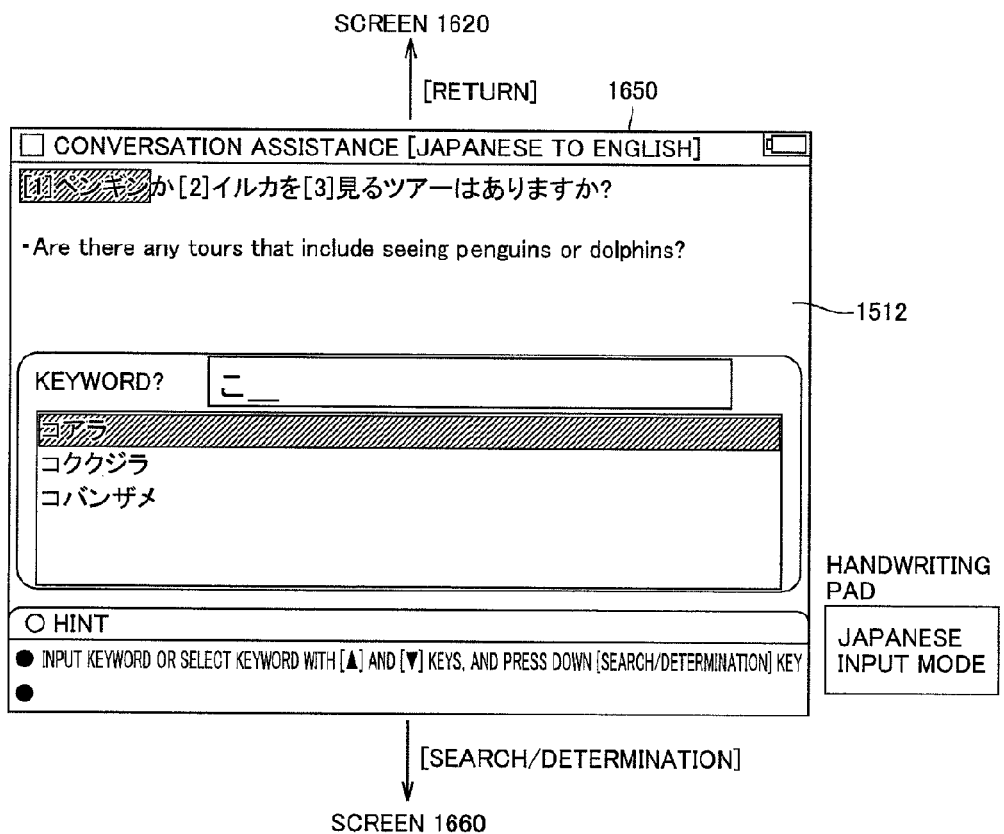
FIG. 35 shows a word replacement screen 1650 after a character "こ" is input.

Specifically, when a character "こ" is input while word replacement screen 1610 or word replacement screen 1630 is displayed, translation output unit 446 causes display 130 to display a word replacement screen 1650 shown in FIG. 35. In FIG. 35, the first sentence in conversational sentence display area 1512 is in Japanese (first language). The second sentence in conversational sentence display area 1512 is in English (second language). Word replacement screen 1650 displays words beginning with the character "こ" among candidate words that can replace the selected variable section.

Figure 36:
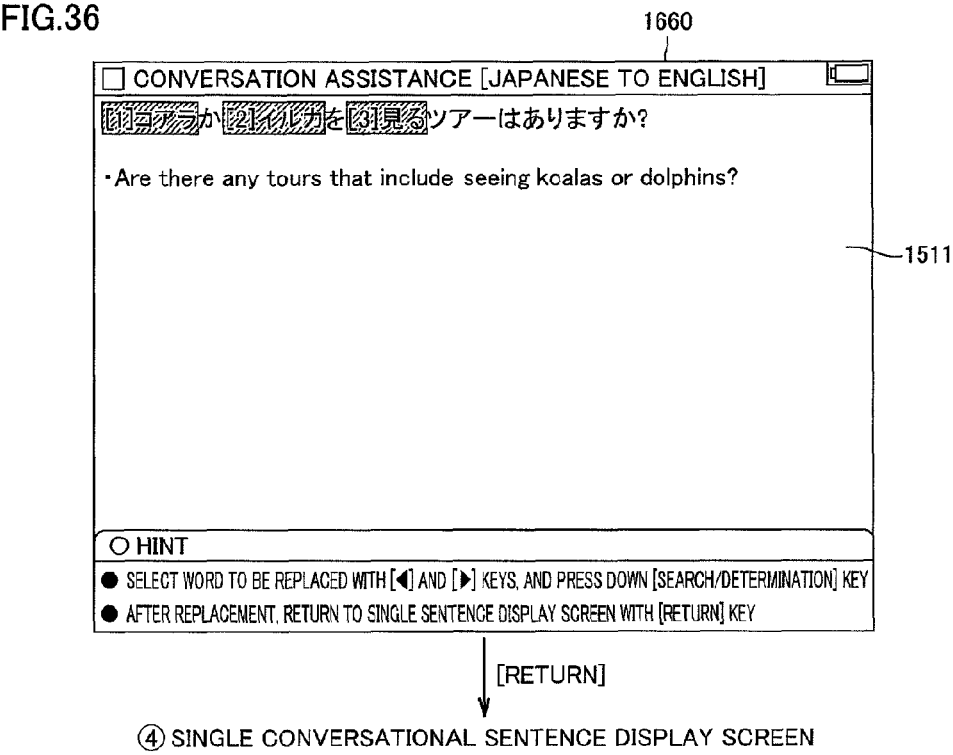
FIG. 36 shows a word replacement screen 1660 in which a word to replace the variable section has been changed to "コアラ".

When search/determination key 306 is pressed down while word replacement screen 1650 is displayed, translation output unit 446 causes display 130 to display a word replacement screen 1660 shown in FIG. 36. In FIG. 36, the first sentence in conversational sentence display area 1511 is in Japanese (first language). The second sentence in conversational sentence display area 1511 is in English (second language). Word replacement screen 1640 includes an example sentence in which the selected variable section has been replaced by the word (コアラ) selected in word replacement screen 1650, and a translation of the example sentence. When return key 308 is pressed down while word replacement screen 1660 is displayed, translation output unit 446 causes display 130 to display a single conversational sentence display screen for an example sentence after word replacement.

In the above-described example, translation output unit 446 does not change the example sentence and its translation in the word replacement screen until the user selects a candidate for replacing the variable section and pressing down search/determination key 306. For example, although the candidate word "クジラ" is selected in the screen shown in FIG. 33, the example sentence and its translation being displayed are the same as when the variable section is "ペンギン".

However, translation output unit 446 may change the example sentence and its translation being displayed, depending on the change of a selected candidate word. In this case, when the selected candidate word is changed to "クジラ" as shown in FIG. 33, for example, translation output unit 446 causes display of an example sentence and its translation when the variable section is "クジラ" (those shown in FIG. 34).

In the case of changing an example sentence and its translation being displayed when a candidate word is determined, the screen less flickers and is more visible. In the case of changing an example sentence and its translation being displayed when a selected candidate word is changed, the user can decide a candidate word upon identification of a translation after the change.

In replacing the variable section by a word, translation output unit 446 conjugates a replacing word, if necessary, depending on a word before or after the variable section. For example, for replacing the variable section in a category sentence of "日本で{VB_BUY1+v.kanou}ないバッグはどれですか?" by a word "買う", "買う" is conjugated into "買え" based on "+v. kanou" (designating the possibility expression) in the category sentence for replacement. This processing provides a correct style for an example sentence displayed.

In displaying words that can replace the variable section, translation output unit 446 causes display of words yet to be conjugated, rather than words having been conjugated. More specifically, translation output unit 446 causes display of "買う" and "行く" as candidate words, rather than "買え" and "行け", for example. This can save processing time for displaying candidate words. In addition, the candidate words are displayed naturally like a dictionary.

Of course, a replaced word is conjugated suitably in a resulting sentence with the variable section replaced, even though candidate words are displayed in basic form. By way of example, assume replacing a variable section "行く" (with possibility and collocation designated) in a sentence of "残念ながら行けません". When a replacement candidate "する" is selected, the replacement results in "残念ながらできません". The replacement does not result in "するません" or "しません".

For some variable sections, the character type of replaceable words may be limited, and a user input may be more practical than selection from among replacement candidates. Such variable sections include, for example, numeric variable sections such as an amount of money and a postal code, and alphabetic variable sections such as label and area indication. In the case where such a variable section is selected as a change target, when there are a plurality of character input modes, translation output unit 446 automatically changes a character input mode so as to conform to the character type that can be input in the variable section. Herein, the character input mode represents a setting for defining the character type to be input when a certain key is pressed down. When there are a plurality of character input modes, changing the input modes enables the user to input a plurality of character types (hiragana, alphabet, number) with a single key. This operation will now be described specifically with reference to FIGS. 37 and 38.

Figure 37:
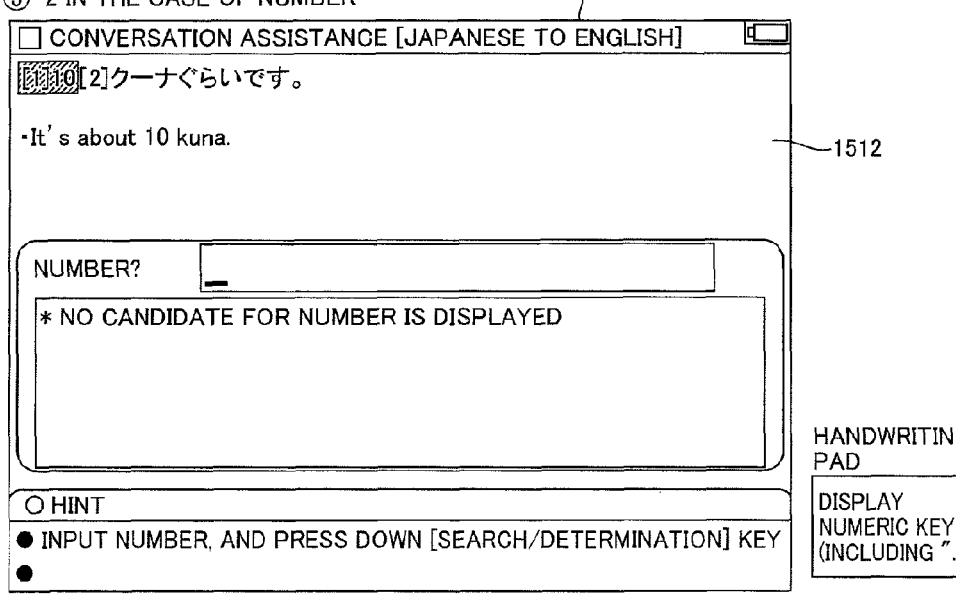
FIG. 37 shows a word replacement screen 1710 displayed when a numeric variable section has been selected.

FIG. 37 shows a word replacement screen 1710 displayed when a numeric variable section is selected. In FIG. 37, the first sentence in conversational sentence display area 1512 is in Japanese (first language). The second sentence in conversational sentence display area 1512 is in English (second language). When displaying word replacement screen 1710, translation output unit 446 changes the input mode to numeric input. Translation output unit 446 also causes handwriting pad 120 to display numeric keys so that the numeric input can be received. When search/determination key 306 is pressed down after the numeric input is received, translation output unit 446 causes display of an example sentence with the selected variable section replaced by the input number, and a translation of the example sentence.

Figure 38:
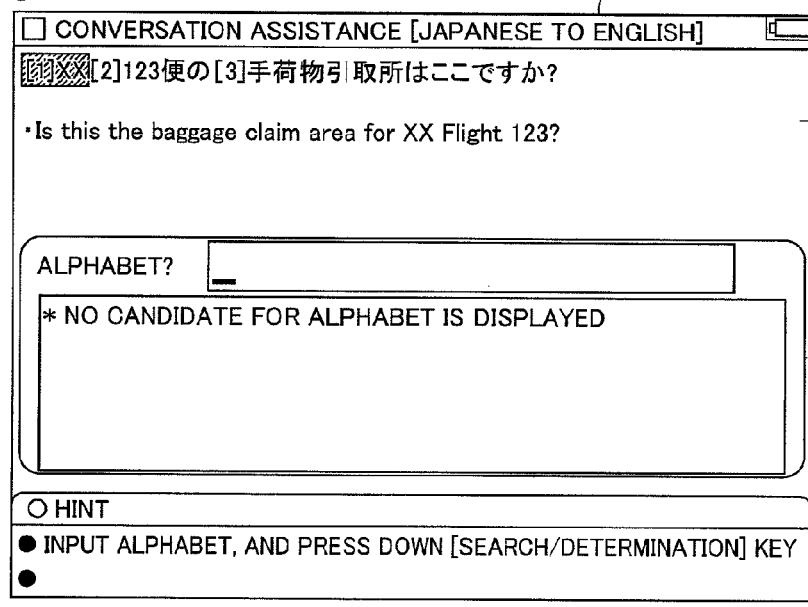
FIG. 38 shows a word replacement screen 1810 displayed when a numeric variable section has been selected.

FIG. 38 shows a word replacement screen 1810 displayed when a numeric variable section is selected. In FIG. 38, the first sentence in conversational sentence display area 1512 is in Japanese (first language). The second sentence in conversational sentence display area 1512 is in English (second language). When displaying word replacement screen 1810, translation output unit 446 changes the input mode to numeric input. Translation output unit 446 also causes handwriting pad 120 to display numeric keys so that numeric input can be received. When search/determination key 306 is pressed down after the numeric input is received, translation output unit 446 causes display of an example sentence with the selected variable section replaced by the input number, and a translation of the example sentence. When a variable section limited in the type of replaceable characters, such as a date or name of month is selected, translation output unit 446 causes display 130 to display a word replacement screen corresponding to the selected variable section. While this word replacement screen is displayed, translation output unit 446 does not accept input of characters that cannot replace the selected variable section.

Figure 39:
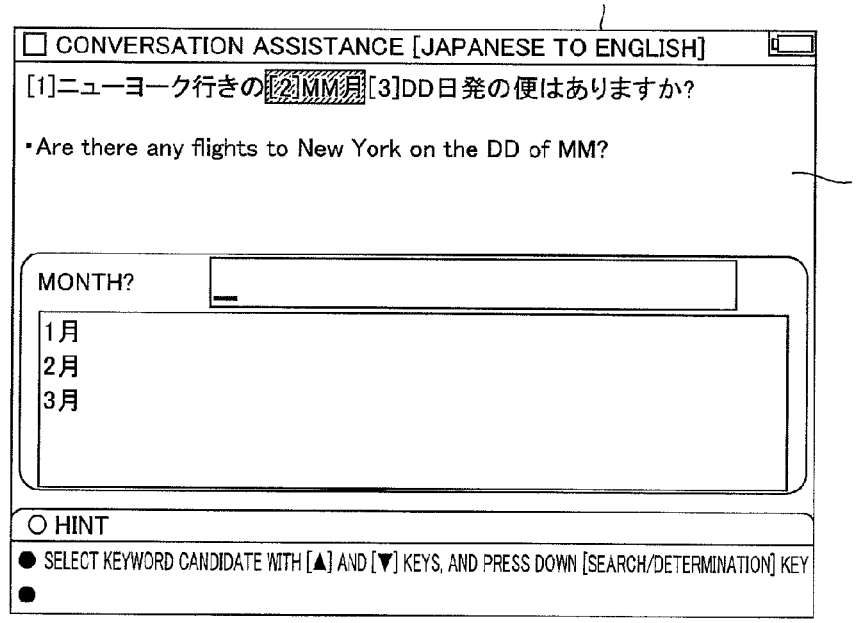
FIG. 39 shows an example of a word replacement screen corresponding to a selected variable section.

FIG. 39 shows an example of a word replacement screen corresponding to a selected variable section. In FIG. 39, the first sentence in conversational sentence display area 1512 is in Japanese (first language). The second sentence in conversational sentence display area 1512 is in English (second language). In a word replacement screen 1910 shown in FIG. 39, a variable section "MM月" is selected. The variable section "MM月" can be replaced by a name of month. Word replacement screen 1910 displays words (1月, 2月, ...) that can replace the variable section "MM月", allowing the user to select a word from among the displayed words.

Alternatively, the user can also input a number to designate the name of month for replacing the variable section "MM月". However, a number such as "13" cannot designate a name of month. When a number not corresponding to a name of month is input, translation output unit 446 provides display or audio output that the input of such a number is inappropriate, and invalidates the input number.

(Variation of Word Replacement Screen)

Word replacement screens are not limited to those described above. For example, translation output unit 446 may cause display 130 to display a word replacement screen as will be described below such that the user can easily replace a word of a variable section.

As a first variation, translation output unit 446 can create a word replacement screen in which words that can replace a variable section are arranged in the order of expressions. More specifically, a word replacement screen can be created in which a set of words having characters in a common expression at a predetermined position is displayed.

The arrangement of words by translation output unit 446 according to the first variation will be described with reference to FIG. 40. Each word shown in FIG. 40 is formed by Japanese kanji. The words in the leftmost column in FIG. 40 are not arranged in the order of expressions (arranged in the order of reading). Words in the central column in FIG. 40 are classified by characteristic expressions such as "素", "酢" and "姿" with which the words begin, according to cooking methods. Words in the rightmost column in FIG. 40 are classified by characteristic expressions such as "揚", "煮" and "焼" with which the words end, according to cooking methods. When words are arranged in the order of expressions as indicated in the central and rightmost columns, the user can easily identify analogous words. In addition, by classifying words particularly by the expressions with which the words end, words belonging to the same category, such as a XYZ hotel and an ABC company, are more likely to be displayed as a set, so that the user can identify the category more easily.

As a second variation, translation output unit 446 can create a word replacement screen in which words that can replace a variable section are arranged in the order of subcategories. More specifically, a word replacement screen can be created in which words belonging to a common subcategory are displayed as a set. Herein, subcategories of words shall be stored in advance in memory unit 420.

For example, the subcategory of each word shall be registered in dictionary 423 in association with each word. It should be noted that a category is further classified into subcategories. Setting subcategories in this manner enables a further classification of words that can replace a variable section designated by a category. Alternatively, as another example, a frequency or importance of words can also be registered as subcategory data.

Arrangement of words by translation output unit 446 according to the second variation will be described with reference to FIG. 41. Each word shown in FIG. 41 is formed by Japanese kanji or katakana. Words shown in the left column are arranged in the order of reading. Meanwhile, words shown in the right column are arranged according to subcategories in which the former half shows "persons indicated by occupations" and the latter half shows "persons indicated by family relationships." When words are indicated as in the right column, the user can easily identify categories. The display in the order of reading offers an easy search if a target word is exactly defined, however, the display according to the second variation allows the user to easily identify subcategories of words, and to easily define a target word based on the meaning or concept of the word.

Herein, if switching among the basic display, the first variation, and the second variation can be made according to a user instruction, flexibility can be increased further.

A third variation of grouping words that can replace a variable section will now be described. When the number of words that can replace a variable section exceeds a predetermined number, translation output unit 446 according to the third variation causes display of a set of words beginning with a predetermined number of common characters, by a single representative indication.

FIGS. 42A and 42B each show a display example of words according to the third variation. FIG. 42A shows an example where words beginning with three common characters are displayed by grouping. A character string shown on the left in FIG. 42A with "+" added at the head and " . . . " added at the end (such as ニース and ニーダ) is a representative indication of a plurality of grouped words. When the representative indication is selected, translation output unit 446 causes display of a plurality of words corresponding to the representative indication. When characters equal to or greater than a predetermined number are input, translation output unit 446 expands the grouping and causes display of words corresponding to the input characters.

Such a display style is effective when all words cannot be displayed in a screen. For example, translation output unit 446 adopts such grouping display when the number of words exceeds the number of words displayable in the screen. This grouping display allows the user to easily select a desired word. This display is advantageous particularly when the number of words is large.

FIG. 42B shows an example where, in addition to the indication shown in FIG. 42A, the number of words corresponding to each representative indication is displayed on the right of each representative indication. This display can avoid cases such as where there are few corresponding words although a representative indication is selected, or where there are too many words, allowing the user to smoothly search for a desired word.

A fourth variation in which the number of words that can replace each variable section is displayed in association with each variable section in a word replacement screen will now be described. In displaying the word replacement screen, translation output unit 446 according to the fourth variation obtains the number of words that can replace a variable section in an example sentence to be displayed, based on template database 422 and dictionary 423.

Specifically, translation output unit 446 obtains the category of words that can replace a variable section based on template database 422. Translation output unit 446 then searches through dictionary 423 for words included in the obtained category to obtain the total number of retrieved words as the number of words that can replace a variable section. Alternatively, translation output unit 446 may utilize index data 424 instead of dictionary 423. In the case where data that associates each category with words belonging to each category is stored in memory unit 420, translation output unit 446 may utilize the data instead of dictionary 423.

Figure 43:
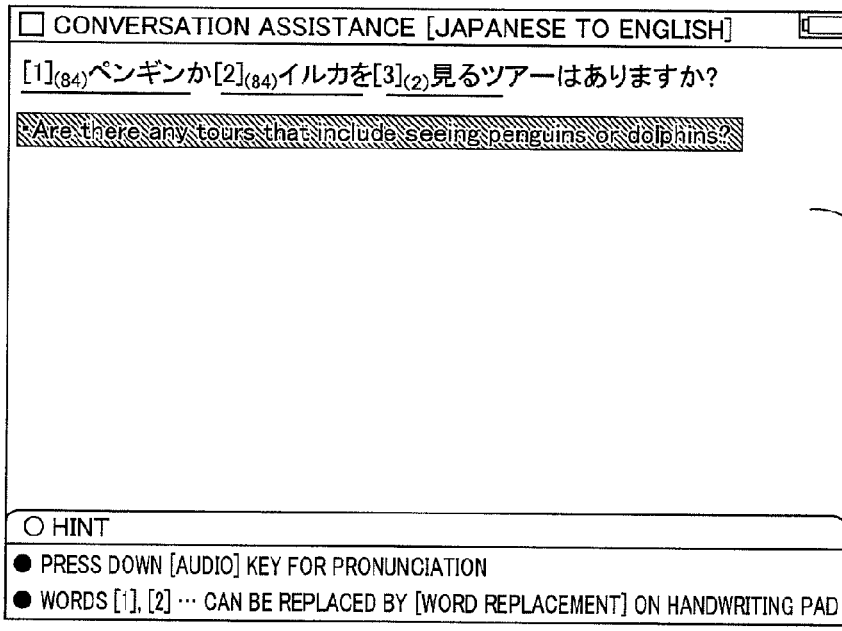
FIG. 43 shows an example of a word replacement screen according to a fourth variation.

FIG. 43 shows an example of a word replacement screen according to the fourth variation. In FIG. 43, the first sentence in conversational sentence display area 1511 is in Japanese (first language). The second sentence in conversational sentence display area 1511 is in English (second language). With reference to FIG. 43, the number of words that can replace each variable section is displayed on the left of the word of each variable section displayed in the word replacement screen. Displaying the number of candidates before replacement allows the user to identify in advance how many variations of example sentences exist.

As a fifth variation, an example of displaying a translation of a replacing word simultaneously as reference information on the replacing word will now be described. In displaying candidates for a replacing word, translation output unit 446 according to the fifth variation retrieves a translation of a candidate word from dictionary 423, and causes display of them with the candidate word.

Figure 44:
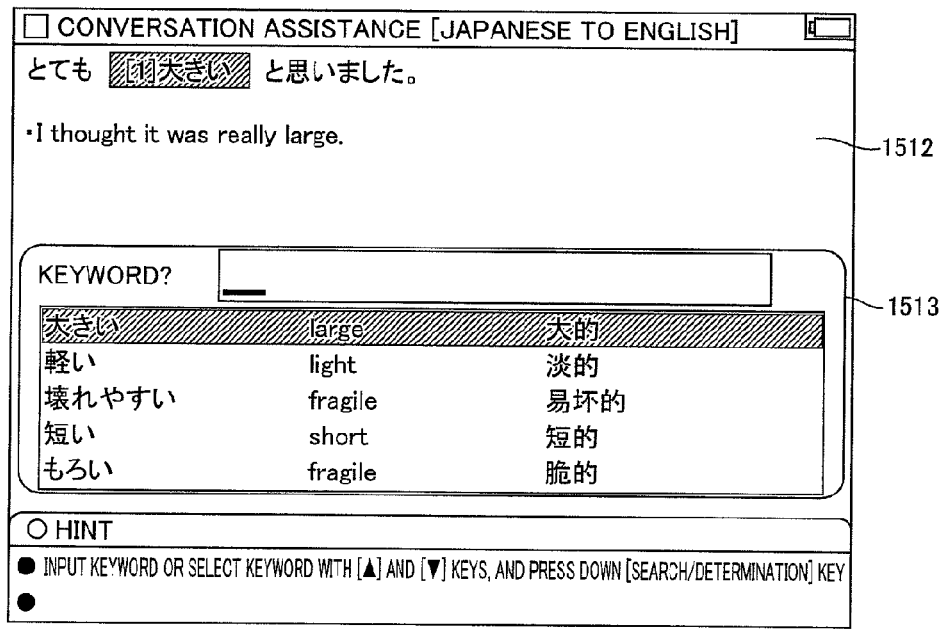
FIG. 44 shows an example of a word replacement screen according to a fifth variation.

FIG. 44 shows an example of a word replacement screen according to the fifth variation. In FIG. 44, the first sentence in conversational sentence display area 1512 is in Japanese (first language). The second sentence in conversational sentence display area 1512 is in English (second language). In candidate word area 1513 displayed below conversational sentence display area 1512, words listed on the left are in Japanese (first language), words listed in the middle are in English (second language), and words listed on the right are in Chinese (third language).

With reference to FIG. 44, besides candidate words (in Japanese as the first language), English (second language) and Chinese (third language) words corresponding to the candidate words are displayed. By identifying translations in advance before replacement, the user can advance the procedure efficiently. This can particularly avoid a situation where the translation is the same even though a word of a variable section is replaced (such a situation occurs when, for example, "壊れやすい" is replaced by "もろい" in translating into English in the example shown in FIG. 44). In addition, with this function, conversation assistance device 100 can be utilized as a word-memo-equipped learning tool.

The above-described variations may be embodied alone or in combination as appropriate. These variations allow the user to change more easily a word of a variable section to a desired word.

(7) Selection of Registered Example Sentence

Figure 45:
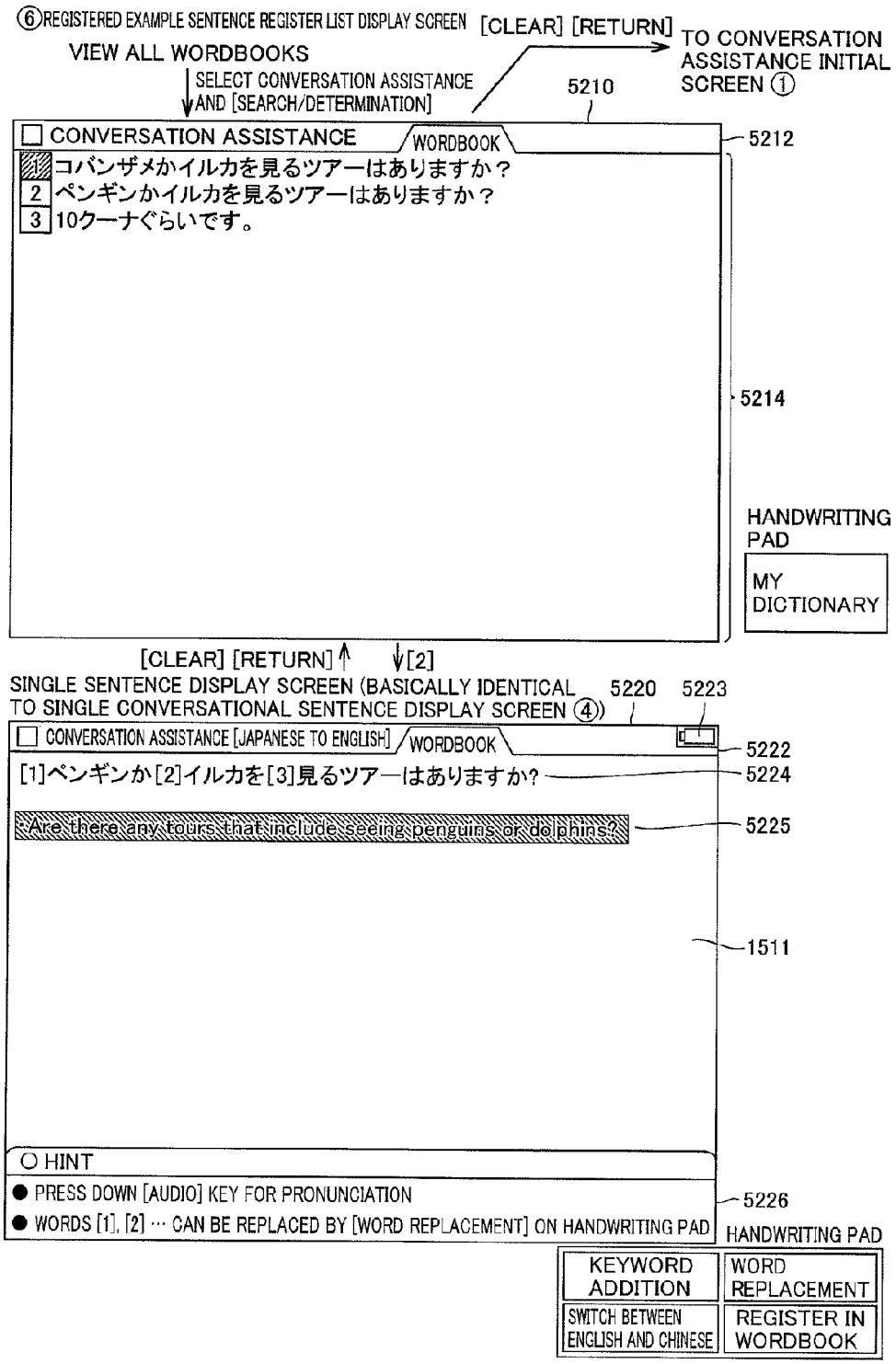
FIG. 45 illustrates, for a wordbook function of a conversation assistance application, a screen displayed on a display and a transition of the screen, as well as the state of a handwriting pad.

Selection of a registered example sentence will now be described in detail with reference to FIG. 45. FIG. 45 illustrates, for a wordbook function of the conversation assistance application, a screen displayed on display 130 and a transition of the screen, as well as the state of handwriting pad 120. In FIG. 45, sentences in a registered example sentence list display box 5214 are in Japanese (first language).

In the present embodiment, in a wordbook list screen displayed by an operation for viewing wordbooks of all applications, when "conversation assistance" is selected by operation of search/determination key 306 with "conversation assistance" selected in the list, then, conversation assistance device 100 displays a wordbook screen 5210 of the conversation assistance application.

With reference to FIG. 45, wordbook screen 5210 includes a title 5212 and registered example sentence list display box 5214. Herein, the "wordbook" means a function of storing user obtained example sentences, translations, and translation dictionary data. This is achieved by selecting the item "register in wordbook" in the handwriting pad shown in FIG. 26. This allows the user to intentionally hold obtained example sentences and their translations, and to utilize them again later.

Title 5212 represents the name of application currently activated, that is, "conversation assistance." Registered example sentence list display box 5214 displays a search result of example sentences read from data stored in memory unit 420 as registered example sentence information 430, as a list of registered example sentences, each of which is headed with a list number.

In registered example sentence list display box 5214 in wordbook screen 5210 shown in FIG. 45, registered example sentences headed with the list numbers "1" to "3", respectively, are listed.

When character key 302 indicating a list number is pressed down while wordbook screen 5210 is displayed, processing unit 440 causes display 130 to display a single sentence display screen 5220 of a registered example sentence of that list number. This single sentence display screen 5220 is similar to the single conversational sentence display screen described with reference to FIG. 26. In FIG. 45, first sentence 5224 in conversational sentence display area 1511 is in Japanese (first language). Second sentence 5225 in conversational sentence display area 1511 is in English (second language).

When return key 308 or clear key 310 is pressed down while wordbook screen 5210 is displayed, processing unit 440 causes display 130 to display initial screen 1020 described with reference to FIG. 20.

When return key 308 or clear key 310 is pressed down while single sentence display screen 5220 is displayed, processing unit 440 causes display 130 to display wordbook screen 5210 again.

(8) Selection of Historical Example Sentence

Figure 46:
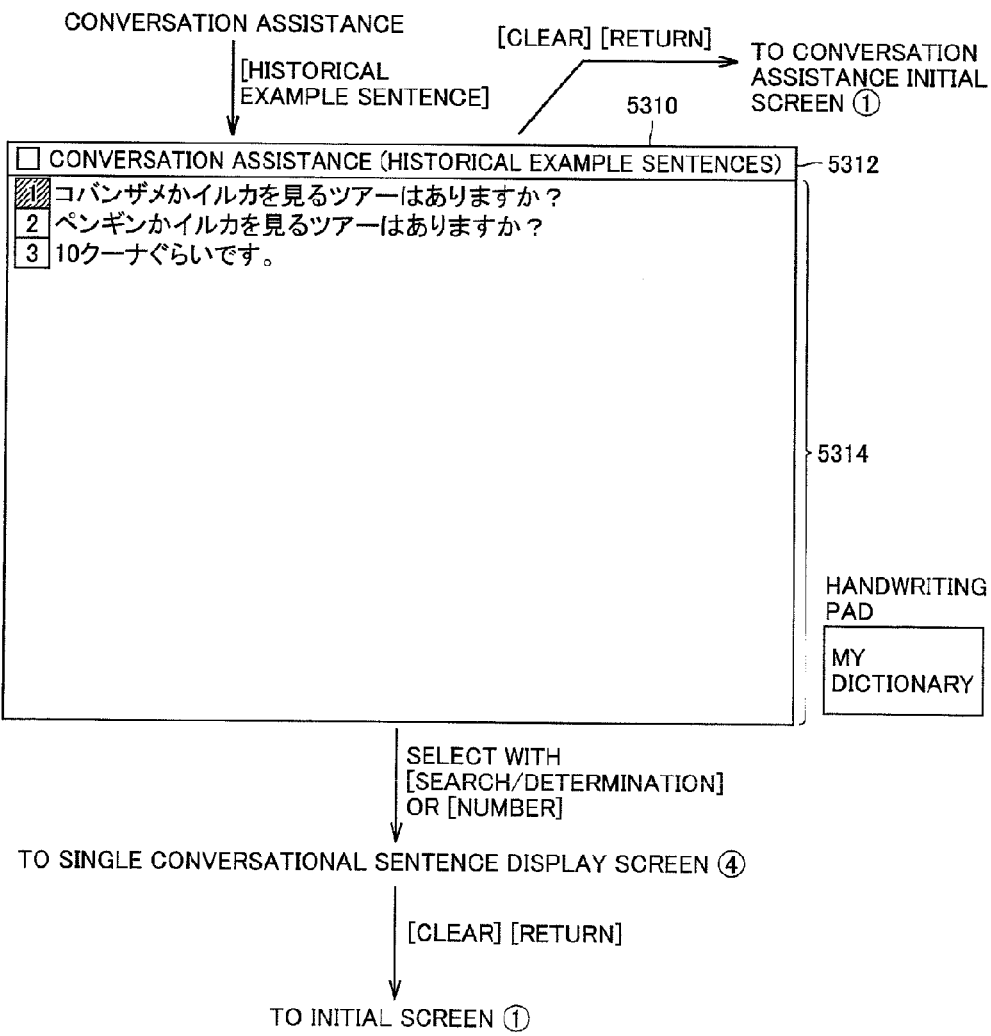
FIG. 46 illustrates, for a historical example sentence function of the conversation assistance application, a screen displayed on the display and a transition of the screen, as well as the state of the handwriting pad.

Selection of a historical example sentence will be described in detail with reference to FIG. 46. FIG. 46 illustrates, for a historical example sentence function of the conversation assistance application, a screen displayed on display 130 and a transition of the screen, as well as the state of handwriting pad 120. In FIG. 46, sentences in a historical example sentence list display box 5314 are in Japanese (first language). Herein, the "historical example sentence" means a function of storing user obtained example sentences, their translations, and translation dictionary data. The difference from the aforementioned "wordbook" lies in that the conversation assistance device automatically holds user obtained example sentences and their translations. Automatic recording enables the user to go back to and utilize again records of obtained example sentences and their translations without user's intentional storage.

In the present embodiment, conversation assistance device 100 displays a historical example sentence screen 5310 of the conversation assistance application when an operation for viewing historical example sentences is performed.

With reference to FIG. 46, historical example sentence screen 5310 includes a title 5312 and a historical example sentence list display box 5314.

Title 5312 represents the name of the application currently activated, that is, "conversation assistance" and the name of the function currently executed, that is, "historical example sentence". Historical example sentence list display box 5314 shows a search result of example sentences read from data stored in memory unit 420 as historical example sentence information 432, as a list of historical example sentences, each of which is headed with a list number.

In historical example sentence list display box 5314 in historical example sentence screen 5310 shown in FIG. 46, historical example sentences headed with the list numbers "1" to "3", respectively, are listed.

When character key 302 indicating a list number is pressed down while historical example sentence screen 5310 is displayed, or when search/determination key 306 is pressed down with a list number selected, processing unit 440 causes display 130 to display a single conversational sentence display screen of a historical example sentence of that list number. This single conversational sentence display screen is similar to the single conversational sentence display screen described with reference to FIG. 31.

When return key 308 or clear key 310 is pressed down while this single conversational sentence display screen is displayed or while historical example sentence screen 5310 is displayed, processing unit 440 causes display 130 to display initial screen 1020 described with reference to FIG. 13.

(4. Device for Keyword)

Conversation assistance device 100 according to the present embodiment uses the following devices in keyword input or in displaying a result in response to keyword input:
 (i) addition of variations of reading;
 (ii) supplementary explanation on polysemous word entry;
 (iii) use of a sentence end expression as a keyword; and
 (iv) keyword division.

These devices will be explained below.

(i) Addition of Variations of Reading

Conversation assistance device 100 according to the present embodiment can accommodate variations of user input readings by utilizing data in which a plurality of readings are assigned to a single keyword. This data structure will be described below with reference to FIG. 5.

Keyword 580 of template 500*a* shown in FIG. 5 shows that this template 500*a* has four keywords corresponding to four variable sections of the category sentence, respectively. Herein, a keyword corresponding to the n-th variable section is expressed as "n:(keyword expression)=(character input (Japanese input))". Another keyword "ですか" included in keyword 580 will be described later.

One keyword expression is assigned to each keyword. Herein, four keywords having expressions of "日本", "買う", "バッグ", and "どれ", respectively, are shown.

When a character string indicated by a character input is input during the keyword selection processing, conversation assistance device 100 assumes that a keyword corresponding to that character input has been selected. In the present embodiment, a plurality of character strings are assigned, as character inputs, to a keyword having a plurality of variations of character inputs. For example, to a keyword having the expression "日本", two character strings "にっぽん" and "にほん", both of which are readings of "日本", are assigned as character inputs.

With this data structure, example sentence selection unit 444 can cause display unit 462 to display many example sentences corresponding to a character input received by input unit 410. Conversation assistance device 100 according to the present embodiment can therefore be more likely to display example sentences related to a user intended keyword.

In the case of utilizing data in which only a single character string is associated with a single keyword, a user intended example sentence cannot be retrieved if a user input character string is different, if only a little, from a character string assigned to a keyword. In contrast, conversation assistance device 100 according to the present embodiment can also cover such a case.

More specifically, the operation of conversation assistance device 100 according to the present embodiment when a character string is input will now be described. Conversation assistance device 100 searches for example sentences utilizing index data 424 created based on template 500, rather than directly utilizing keywords 580 included in template 500.

When input unit 410 receives a character string input, keyword selection unit 442 obtains expression 614 of a keyword having Japanese input 612 that matches the input character string, based on keyword-category data 425.

Example sentence selection unit 444 obtains category number 616 corresponding to expression 614 obtained by keyword selection unit 442, based on keyword-category data 425, and then obtains template number 510 corresponding to obtained category number 616 based on category-template data 426.

The operation of processing unit 440 after template number 510 is obtained is similar to that described in other portions. More specifically, example sentence selection unit 444 searches for template 500 having obtained template number 510, and causes display unit 462 to display example sentences (Japanese) designated by retrieved template 500. Translation output unit 446 causes display unit 462 to display a translation (English or Chinese) of an example sentence selected from among the displayed example sentences.

As described above, the reason for utilizing index data 424 rather than directly utilizing keywords 580 of template 500 is to increase the search speed. However, conversation assistance device 100 may also search for example sentences by directly utilizing keywords 580. In this case, example sentence selection unit 444 obtains template 500 for which a keyword having a character input that matches an input character string is set. Example sentence selection unit 444 then causes display unit 462 to display example sentences based on obtained template 500.

A character input corresponding to a keyword is not limited to the Japanese character string as shown in FIG. 5. For example, for a keyword expressed in Japanese, an alphabetic character input may be set as a character input. Some of such examples are given below.

(Example 1) ウィンドウ: ウィンドウ =うぃんどう; うぃんどう=wiNdo:;uiNdou (Example 2) エディンバラ: エディンバラ=えでぃんばら; えじんばら =edimbara;ejimbara (Example 3) 日本: 日本 =にっぽん ;にほん =niqpoN;nihoN Example 1 shows data related to a keyword having an expression of "ウィンドウ". With the data, example sentence selection unit 444 extracts template 500 for which a keyword having the expression of "ウィンドウ" is set when any of character strings of "うぃんどう", "うぃんどう", "wiNdo:", and "uiNdou" is input. The same applies to Examples 2 and 3.

Besides, character inputs such as "バス =ばす;バス =basu; basu" may be set such that a keyword can be retrieved when either hiragana or katakana is input, for example.

The above-described device for setting character inputs corresponding to a keyword can be applied not only to conversation assistance device 100 according to the present embodiment, but also generally to apparatuses that extract a keyword in accordance with a character input and output a content associated with the keyword. For example, the device may also be applied to an electronic dictionary. In the case of an electronic dictionary, a word/phrase entry corresponds to a keyword, and data on a word/phrase meaning corresponds to a content.

(ii) Supplementary Explanation on Polysemous Word Entry

In displaying keywords on display 130, conversation assistance device 100 according to the present embodiment displays the keywords with supplementary explanations added to the keyword expressions as necessary so as to facilitate user selection of a suitable keyword.

A supplementary explanation is a character string set inherently to each of a plurality of different keywords having a common expression. Character strings set for keywords having a common expression are different from one another for distinction among the keywords.

A character string of a supplementary explanation that assists the user in selecting a suitable keyword is preferably used. Various types of supplementary explanations and their specific examples will be described below.

a) Supplementary Explanation by Difference in Meaning

For keywords having a common expression but different meanings, character strings indicating the meanings of the keywords can be used as supplementary explanations.

TABLE 1

| (Example) | | |
|---|---|---|
| バス (fish): | バス =ばす = basu | [bass/狼鱸] |
| バス (vehicle): | バス =ばす = basu | [bus/巴士] |
| バス (bath): | バス =ばす = basu | [bath/浴缸] |

Table 1 lists words having an identical katakana expression in Japanese (first language) but having different kanji expressions, that is, having different meanings. More specifically, each word corresponds to a different English word (second language). Each word also corresponds to a different Chinese word (third language).

The content shown in the example above includes indications on the display (entries): keyword expressions=character inputs (readings) of keywords=character inputs of keywords

[English expressions of keywords (English translations, i.e., translations in the second language)/Chinese expressions of keywords (Chinese translations, i.e., translations in the third language)]. In this example, the keywords are distinguished from one another by supplementary explanations of (fish), (vehicle) and (bath).

Particularly, for Japanese expressions of words that are not distinguished from one another in Japanese but are distinguished from one another in a foreign language, subclassifications of meanings can also be used as supplementary explanations.

EXAMPLE

いとこ (older male cousin on father's side): いとこ = いとこ =itoko
いとこ (older male cousin on mother's side): いとこ = いとこ =itoko
いとこ (older female cousin on father's side): いとこ = いとこ =itoko
いとこ (older female cousin on mother's side): いとこ = いとこ =itoko
いとこ (younger male cousin on father's side): いとこ = いとこ =itoko
いとこ (younger male cousin on mother's side): いとこ = いとこ =itoko
いとこ (younger female cousin on father's side): いとこ = いとこ =itoko
いとこ (younger female cousin on mother's side): いとこ = いとこ =itoko The concept generically expressed by the word "いとこ" in Japanese corresponds to different words in Chinese distinguished from one another. Therefore, displaying supplementary explanations indicating subclassifications of meanings corresponding to translations together with Japanese expressions facilitates user selection of a suitable keyword.

Particularly in the conversation assistance, a single original language (Japanese) expression preferably corresponds to a single expression in each foreign language. This is for replacing a word in a translation immediately after a candidate word for a variable section displayed in display 130 is selected. Therefore, it is preferable particularly in the conversation assistance to subclassify words at the stage of displaying original language expressions as described above, unlike a dictionary displaying a plurality of meanings and translations for a single word.

b) Supplementary Explanation by Difference in Usage

Supplementary explanations can also be set by the difference in usage. Such an example is given below.

TABLE 2

(Example)

| | | |
|---|---|---|
| すみません (call): | すみません = すみません = sumimaseN | [excuse me/对不起] |
| すみません (apology): | すみません = すみません = sumimaseN | [I'm sorry/对不起] |

Table 2 lists words having an identical hiragana expression in Japanese (first language), having no corresponding kanji expression, and being used under different situations. More specifically, each word corresponds to a different English word (second language). Each word also corresponds to a different Chinese word (third language).

Similarly to the above description, in particular, it is particularly preferable in conversation assistance to subclassify words at the stage of displaying original language expressions as described above.

c) Supplementary Explanation by Difference in Usage Scene

Supplementary explanations can also be set by the difference in usage scene.

Such an example is given below.

TABLE 3

(Example)

| | | |
|---|---|---|
| チェックイン (hotel): | チェックイン = ちぇっくいん ; ちぇっくいん = cheqkuiN; chieqkuiN | [check-in/办理入住手续] |
| チェックイン (airport): | チェックイン = ちぇっくいん ; ちぇっくいん = cheqkuiN; chieqkuiN | [check-in/办理登机手续] |

Table 3 lists words having an identical katakana expression in Japanese (first language), having no corresponding kanji expression, and being used under different situations. More specifically, each word corresponds to a different English word (second language). Each word also corresponds to a different Chinese word (third language).

Similarly to the above description, in particular, it is particularly preferable in conversation assistance to subclassify words at the stage of displaying original language expressions as described above.

d) Supplementary Explanation by Expression

When keywords can be distinguished from one another by an expression other than a set expression, the expression other than the set expression may be used as a supplementary explanation. Such an example is given below.

TABLE 4

(Example)

| | | |
|---|---|---|
| カキ (oyster): | カキ = かき = kaki | [oyster/牡蛎] |
| カキ (persimmon) | カキ = かき = kaki | [persimmon/柿子] |

Table 4 lists words having an identical katakana expression in Japanese (first language) and corresponding to different kanji expressions. More specifically, each word corresponds to a different English word (second language). Each word also corresponds to a different Chinese word (third language).

Such supplementary explanations can be utilized in a language such as Japanese in which a single word has a plurality of expressions.

e) Supplementary Explanation by Reading

As a variation of d), readings of keywords may be used as supplementary explanations. An ordinary dictionary hardly displays a plurality of keywords having different readings simultaneously. However, this may occur when candidate words for a variable section are displayed. Therefore, distinction by readings is effective in some cases. Examples of supplementary explanations by readings are given below.

Example 1

空(から): 空 =から =kara [empty/空的]
空(から): 空 =そら =sora [sky/天]

Example 2

羽田(はだ): 羽田 =はだ =hada [Hada/羽田]
羽田(はねだ): 羽田 =はねだ =haneda [Haneda/羽田]

This distinction is effective particularly in the case of Japanese names or the like expressed by different Roman characters as shown in Example 2.

(iii) Use of Sentence End Expression as Keyword

Further, conversation assistance device 100 according to the present embodiment sets a keyword corresponding to a sentence end pattern of a category sentence in template 500 as keyword 580 in template 500. Such keyword setting may be made by conversation assistance device 100 by analyzing the sentence end pattern of the category sentence in template 500, or may be provided in advance for template 500.

Herein, the sentence end pattern is an expression that determines the type of sentence (wish, request, negation, question, etc.). The expression that determines the type of sentence is called as such for the sake of convenience, because the sentence end expression corresponds to the type of sentence in Japanese. However, some languages indicate the type of sentence by an expression other than the sentence end expression. For a sentence in such a language, the type of sentence may be determined based on predetermined criteria to provide a keyword corresponding to the type of sentence. In English, for example, a sentence including words such as "Please" or "Would you . . . ?" is determined as being a request sentence. An example of correspondence between a sentence end pattern and a set keyword is given below. However, this is merely an example, and a keyword set for keyword 580 may be determined using different correspondence other than that shown here.

[Sentence End Pattern]

The following example shows sentence end expressions on the right of |, and keywords corresponding to the sentence end expressions on the left of |.

たい (wish) | たいです。
ください／頂けますか (request) | {て|で}ください{。|!}
ください／頂けますか (request) | {て|で}頂けますか？
ください／頂けますか (request) | {て|で}頂けませんか？
ない／ません (negation) | ない。
ない／ません (negation) | ません。
ませんか (question) | ませんか？
ますか (question) | ますか？
ましたか (question) | ましたか？
ましょうか (question) | ましょうか？
ですか (question) | ですか？
でしたか (question) | でしたか？
でしょうか (question) | でしょうか？
ですね (question) | ですね？

Through the use of these keywords, the user can narrow down the types of example sentences to be searched for. For example, the user can narrow down example sentences to be searched for by designating a combination of "行く"+"ください／頂けますか (request)" or "行く"+"ない／ません (negation)".

Specific examples of example sentences respectively including the above-shown certain sentence end patterns and keywords provided for the example sentences are shown below. In the following examples, each sentence headed with JD is typical word sentence (Japanese) 520. Each sentence headed with JP is category sentence (Japanese) 530. Each sentence headed with ED is typical word sentence (English) 540. Each sentence headed with EN is category sentence (English) 550. Character strings headed with BK indicate keywords 580.

Hereinafter, characters corresponding to JD, JP and BK are in Japanese (first language). Characters corresponding to ED and EN are in English (second language).

Example 1

JD {1:市内観光} を したい です 。
JP {1:&SIGHTSEEING-SURU} を したい です 。
ED I'd like to take a {1:city sightseeing tour}.
EN I'd like to take a {1:&SIGHTSEEING-SURU}.
BK 1:市内／観光 =しない／かんこう =shinai/kaNkou, たい (wish)= たい =tai Example 2

JD 場所 を 教え て ください 。
JP 場所 を 教え て ください 。
ED Could you tell me where it is?
EN Could you tell me where it is?
BK 場所 =ばしょ =basho, 教える =おしえる =oshieru[教えて = おしえて], ください/頂けますか (request)=ください; いただけますか =Kudasai;itadakemasuka Example 3

JD 指導し て頂け ます か
JP 指導し て頂け ます か
ED Would you coach me, please?
EN Would you coach me, please?
BK 指導 =しどう =shidou, ください/頂け ます か (request)= ください;いただけ ます か =kudasai;itadakemasuka Example 4

JD もう {1:ガソリン} が あり ません 。
JP もう {1: &FUEL} が あり ません 。
ED There's no more {1:gas}.
EN There's no more {1:&FUEL}.
BK もう =もう =mou, 1:ガソリン =がそりん =gasoriN, ある = ある =aru[あり =あり], ない／ません (negation)=ない; ません =nai;maseN Example 5

JD {2:待合室} で {1:どの ぐらい} 待た なく て は なり ません か ?
JP {2:&ROOM} で {1:&QADV_DURATION-BASE} 待た なく て は なり ません か ?
ED {1:How long} will I have to wait in the {2:waiting room}?
EN {1:&QADV_DURATION-BASE} will I have to wait in the {2:&ROOM}?
BK 2: 待合室 =まちあいしつ =machiaishitsu, 1: どの/ぐらい = どの/ぐらい =dono/gurai, 待つ =まつ =matsu[待た =また], (待機 =たいき =taiki),ませんか (question)= ませんか =maseNka Example 6

JD {1:小銭} は あり ます か ?
JP {1:&CURRENCY-CHANGE} は あり ます か ?
ED Do you have any {1:small change}?
EN Do you have any {1:&CURRENCY-CHANGE}?

BK 1:小銭 =こぜに =kozeni,ある =ある =aru[あり=あり],
ますか(question)=ます か =masuka

Example 7

JD {1:搭乗} の アナウンス は {2:もう} あり まし た か？
JP {1:&ACT-BOARD-gen} の アナウンス は {2:&AV_YET-mou} あり まし た か？
ED Has {1:boarding} been announced {2:yet}?
EN Has {1:&ACT-BOARD-gen} been announced {2:&AV_YET-mou}?
BK 1:搭乗=とうじょう=to:jou, アナウンス=あなうんす=anauNsu, 2:もう=もう=mou, ある=ある=aru[あり=あり], ましたか(question)=ましたか=mashitaka Example 8

JD {1:まず} 何か 飲み ま し ょ う か？
JP {1:&AV_TO-START} 何か 飲み ま し ょ う か？
ED {1:To start}, how about a drink?
EN {1:&AV_TO-START}, how about a drink?
BK 1:まず =まず =mazu, 何か =なにか =nanika, 飲む =のむ =nomu[飲み =のみ ], ましょうか(question)=ましょうか =masho:ka Example 9

JD {1:ここ} の 定休日 は いつ です か？
JP {1:&THIS_THAT-PLACE} の 定休日 は いつ です か？
ED Which days is {1:this place} closed?
EN Which days is {1:&THIS_THAT-PLACE} closed?
BK 1:ここ=ここ=koko, 定休日=ていきゅうび=teikyu:bi, いつ=いつ=itsu, です か(question)=ですか=desuka Example 10

JD {1:食事} の 前でしたか、それとも 後でしたか？
JP {1:&FOOD} の 前でしたか、それとも 後でしたか？
ED Was it before or after the {1:meal}?
EN Was it before or after the {1:FOOD}?
BK 1:食事=しょくじ=shokuji, 前=まえ=mae, それとも=それとも=soretomo, 後=あと=ato, でしたか(question)=でしたか=deshitaka Example 11

JD 何 番線 でし ょ う か？
JP 何 番線 でし ょ う か？
ED What track number is it?
EN What track number is it?
BK 何番線=なんばんせん=nambaNseN, でしょうか(question)=でしょうか=desho:ka Example 12

JD 私 は {1:払わ} なく て いい の です ね？
JP 私 は {1: &VB_PAY+v.mi1} なく て いい の です ね？
ED I don't need to {1:pay}, do I?
EN I don't need to {1:&VB_PAY+inf}, do I?
BK 私=わたし;わたくし =watashi;watalcushi, 1:払う=はらう=harau[払わ=はらわ], ない=ない=nai[なくて=なくて], いい=いいii, ですね(question)=ですね =desune (iv) Keyword Division In conversation assistance device 100 according to the present embodiment, some keywords have been subjected to "divided keyword designation." A plurality of partial character inputs are associated with a keyword having been subjected to divided keyword designation. When all of the plurality of partial character inputs are input, processing unit 440 extracts a keyword corresponding to the plurality of partial character inputs having been input.

When a portion of a keyword is selected as a search keyword, additional input of a partial character input corresponding to another portion in the same keyword enables retrieval of the original keyword or an example sentence corresponding to the keyword, provided that the keyword has been subjected to "divided keyword" designation.

For example, consider a keyword having been subjected to keyword setting as follows:

EXAMPLE

日本大使館： 日本/大使館 =にほん/たいしかん = nihoN/taishikaN

This keyword "日本大使館" is divided into two portions of "日本*" and "大使館". Partial character inputs of "にほん" and "たいしかん" or "nihoN" and "taishikaN" are set, respectively, in correspondence with these two portions. The keyword may be divided into two or more portions.

Designating the keyword "日本" by the character input "にほん" or "nihoN" and thereafter designating the keyword "大使館" by the character input "たいしかん" or "taishikaN" allows the user to retrieve this keyword. In contrast, designating "大使館" and then "日本" also allows the user to retrieve this keyword. In other words, the user can retrieve the keyword "日本大使館" without inputting "にほんたいしかん" or "nihoNtaishikaN" as a whole.

It is effective to perform divided keyword designation particularly on a long keyword or a keyword for which, for searching for the keyword, the user is supposed to perform character inputs upon dividing the keyword into a plurality of portions.

Partial character inputs may not be equal to mere division of a character input before division. To cover such a case, it is preferable to devise setting of partial character inputs. Specific examples of devised setting of partial character inputs are given below.

a) Voiced Consonant/P-sound Consonant to Unvoiced Consonant

A word in a voiced consonant or p-sound consonant in combination with another word may be returned to an unvoiced consonant by division. To cover such a situation, it is preferable to provide variations for partial character inputs. Such examples are given below.

Example 1

予約係： 予約／係＝よやく／がかり;かかり＝yoyaku/gakari;kakari

When "予約" and "係り" are input separately, the user may input the portion "係り" as "かかり". Therefore, keyword determination is performed as described above.

Simply performing the divided keyword designation as

予約係；予約／係＝よやく／がかり＝yoyaku/gakari cannot cover the above-mentioned situation.

Example 2

幼児靴：幼児／靴＝ようじ／ぐつ;くつ＝yo:ji/gutsu;kutsu

Example 3

料理本：料理／本＝りょうり／ぼン;ほン＝ryo:ri/boN;hoN b) Chinese-style Reading to Japanese-style Reading A word whose reading is limited to either Chinese-style reading or Japanese-style reading depending on the type of another word to be combined may be input either by Chinese-style reading or Japanese-style reading in the case of divisional input. To cover such a situation, it is preferable to provide variations for partial character inputs. Such examples are given below.

Example 1

薬品店： 薬品／店＝やくひン／てン;みせ＝yakuhiN/teN;mise

It is not simply designated as follows:

薬品店：薬品／店＝やくひン／てン＝yakuhiN/teN

This is because, when inputting "薬品" and "店" separately, the user may input the portion "店" as "みせ".

Example 2

りんご酒：りんご／酒＝りんご／しゅ;さけ＝riNgo/shu;sake

Example 3

便秘薬：便秘／薬＝べんぴ／やく;くすり＝bempi/yaku;kusuri c) Suffix to Noun

Instead of a portion of a keyword, the user may input another word having a similar meaning to that portion. To cover such a situation, it is preferable to provide variations for partial character inputs. Such examples are given below.

Example 1

保険料：保険／料＝ほけん／りょう;りょうきん＝hokeN/ryou;ryoukin

It is not simply designated as follows:

保険料：保険／料＝ほけん／りょう＝hokeN/ryou

Example 2

予約書：予約／書＝よやく／しょ;しょるい＝yoyaku/sho;shorui

Example 3

アイスクリーム屋： アイスクリーム／屋＝あいすくりーむ／や;みせ＝aisukuri-mu/ya;mise d) "～ない"

According to the present embodiment, a negative word "ない" may be a portion of a keyword. For example, a keyword such as "あまり (word) ない" can also be set. In this keyword, the word preceding "ない" is conjugated before and after division. To cover such a situation, it is preferable to provide variations for partial character inputs. Such examples are given below.

Example 1

あまり高くない： あまり／高く;高い／ない＝あまり／たかく;たかい／ない＝amari/takaku;takai/nai

It is not simply designated as follows:

あまり高くない： あまり／高く／ない＝あまり／たかく／ない＝amari/takaku;takai/nai

Example 2

あまり知られていない： あまり／知られてい;知られている／ない＝あまり／しられてい;しられている／ない＝amari/shiraretei;shirareteiru/nai e) "～て行く/て来る/ている/てみる" etc. [I]

A sentence may include an expression with a plurality of verbs combined, such as "～て行く/て来るている/てみる". For retrieving such a sentence also using an auxiliary verb such as "行く/来る/いる/みる" as a keyword, a verb such as "行く/来る/いる/みる" is also set as a division keyword. Examples are given below.

Example 1

歩いて行く：歩いて,歩く／行く＝あるいて;あるく／いく;ゆく＝aruite;aniku/iku;yuku

In this example, variations are provided for the portion "訪ねて来る". It is not designated as "歩いて行く：歩いて／行く＝あるいて／いく;ゆく＝aruite/iku;yuku".

Example 2

訪ねて来る：訪ねて;訪ねる／来る＝たずねて;たずねる／くる＝tazunete;tazuneru/kuru f) "～て行く/て来る/ている/てみる" etc. [II]

Unlike e), it is not preferable in some cases to set the verb such as "行く/来る/いる/みる" as a keyword. In such a case, the verb such as "行く/来る/いる/みる" is not set as a division keyword. Examples are given below.

Example 1

閉店している:閉店している;閉店 =へいてんしている;
へいてん =heiteNshiteiru;heiteN

This is an example of subjecting the keyword "閉店している:閉店している=へいてんしている=heiteNshiteiru" to the division designation.

This keyword may be divided as follows:

閉店している:閉店して;閉店/いる=へいてんして;
へいてん/いる=heiteNshite;heiteN/iru

With this division, this keyword is retrieved based on the words "閉店" and "いる". However, such a search result may not be preferable. The word "いる" herein is an auxiliary verb having a meaning of "continue . . . ing." The word "いる" may also be used as a main verb having a meaning of "exist." Therefore, an example sentence in which "いる" is used as a main verb may be less likely to be retrieved if "いる" is determined as a portion of a keyword as in the above example.

Example 2

乗ってみる:　　乗ってみる;乗る=のってみる;のる= noqtemiru;nora

This is an example of subjecting the keyword "乗ってみる:乗ってみる=のって みる=noqterairu" to the division designation.

This keyword may also be divided as follows:

乗ってみる:　　乗って;乗る/みる=のって;のる/みる= noqte;noru/miru

With this division, this keyword is retrieved based on the words "乗る" and "みる". However, such a search result may not be preferable. An example sentence in which "みる" is used as a main verb (i.e., in the meaning of "view") may be less likely to be retrieved when "みる" is set as a portion of a keyword as in the above example.

(5. Flow of Operation)

The flow of processing performed by conversation assistance device 100 will be described below.

Figure 47:
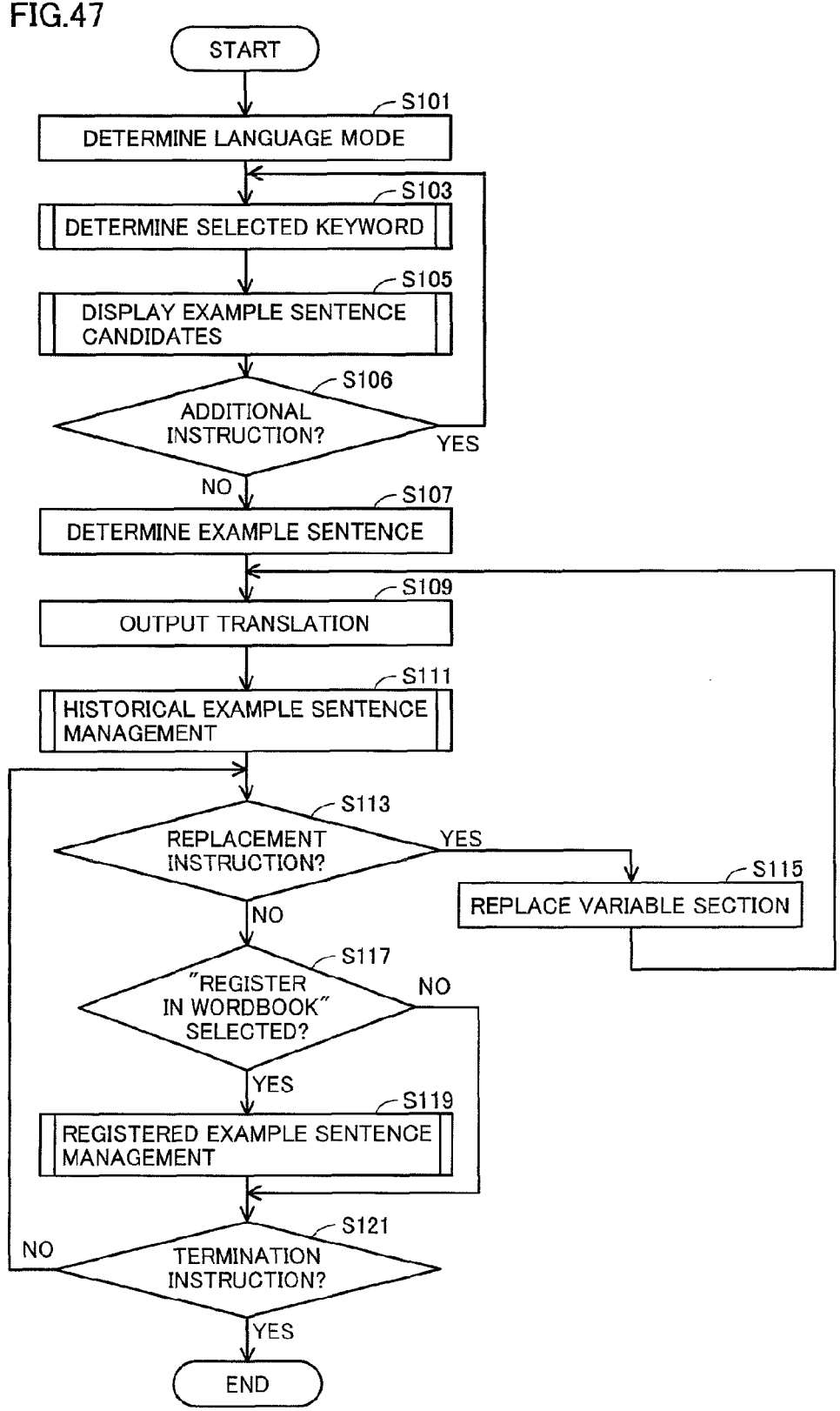
FIG. 47 is a flow chart generally showing the flow of an operation executed by conversation assistance device 100.

FIG. 47 is a flow chart generally showing the flow of the processing performed by conversation assistance device 100.

With reference to FIG. 47, processing unit 440 starts the conversation assistance application based on an instruction received by input unit 410. Then, at step S101, processing unit 440 processing unit 440 selects and determines a language mode from among a plurality of language modes based on the instruction received by input unit 410.

However, when only a single language mode (such as a mode of translating Japanese into English) is available in conversation assistance device 100, processing unit 440 advances the process into step S103 after the start of the conversation assistance application, without performing the processing at step S101.

At step S103, processing unit 440 determines a selected keyword among a plurality of predetermined keywords based on the instruction received by input unit 410. The processing for determining a selected keyword will be described later with reference to FIG. 48.

At step S105, processing unit 440 retrieves templates 500 related to the selected keyword determined at step S103. Processing unit 440 then causes display of example sentences in the first language (Japanese in the present embodiment) in retrieved templates 500, as example sentence candidates. The processing for displaying example sentence candidates will be described later with reference to FIG. 50.

At step S106, processing unit 440 determines whether input unit 410 has received an instruction on keyword addition. The keyword addition instruction includes input to handwriting pad 120 and pressing down of right key 304c while a sentence list display screen is displayed.

When a determination is made that input unit 410 has received the addition instruction (when determined as Yes at step S106), processing unit 440 repeats the processing at step S103 and so on. More specifically, processing unit 440 defines an additional keyword at step S103. Processing unit 440 causes, at step S105, display of example sentence candidates related to the keyword having been determined prior to keyword addition and the additional keyword.

When a determination is made that input unit 410 has not received the addition instruction (when determined as No at step S106), processing unit 440 advances the process into step S107.

At step S107, processing unit 440 selects an example sentence from among the displayed candidate sentences, based on the instruction received by input unit 410. More specifically, processing unit 440 selects an example sentence in accordance with input with up key 304a, down key 304b or the like and input with search/determination key 306.

At step S109, processing unit 440 outputs the example sentence selected at step S107 and a translation of the selected example sentence. Specifically, processing unit 440 causes display 130 to display a single conversational sentence display screen displaying the selected example sentence and a translation of the selected example sentence. Processing unit 440 causes speaker 140 to audio output a translation when audio key 318 is pressed down while the single conversational sentence display screen is displayed.

At step S111, processing unit 440 performs historical example sentence management processing. The historical example sentence management processing will be described later with reference to FIG. 51.

At step S113, processing unit 440 determines whether input unit 410 has received an instruction on variable section replacement. The instruction on variable section replacement includes pressing down of character key 302 and a word replacement instruction to the touch panel.

When a determination is made that input unit 410 has received the instruction on variable section replacement (Yes at step S113), processing unit 440, at step S115, creates an example sentence with a variable section replaced and a translation thereof based on the instruction received by input unit 410, and causes display unit 462 to display them.

More specifically, processing unit 440 selects a variable section whose word is to be replaced based on the instruction. Processing unit 440 then replaces the selected variable section of the example sentence by the word determined based on the instruction to create an example sentence after replacement. Further, processing unit 440 replaces a variable section of the translation corresponding to the selected variable section of the example sentence by a translation of the determined word to create a translation after replacement.

At step S117, processing unit 440 determines whether or not "Register in wordbook" displayed on handwriting pad 120 of input unit 410 has been selected. When a determination is made that "Register in wordbook" has not been selected (when determined as No at step S117), the processing to be performed proceeds into the processing at step S121.

When a determination is made that "Register in wordbook" has been selected (when determined as Yes at step S117), processing unit 440 performs, at step S119, registered example sentence management processing. The registered example sentence management processing will be described later with reference to FIG. 52.

At step S121, processing unit 440 determines whether or not input unit 410 has received an instruction to terminate the conversation assistance application. The instruction to terminate the conversation assistance application includes, for example, pressing down of the application switch key or pressing down of a power key.

When a determination is made that input unit 410 has received the termination indication (when determined as Yes at step S121), processing unit 440 terminates the conversation assistance operation.

When a determination is made that input unit 410 has not received the termination indication (when determined as No at step S121), processing unit 440 repeats the processing from step S113.

Figure 48:
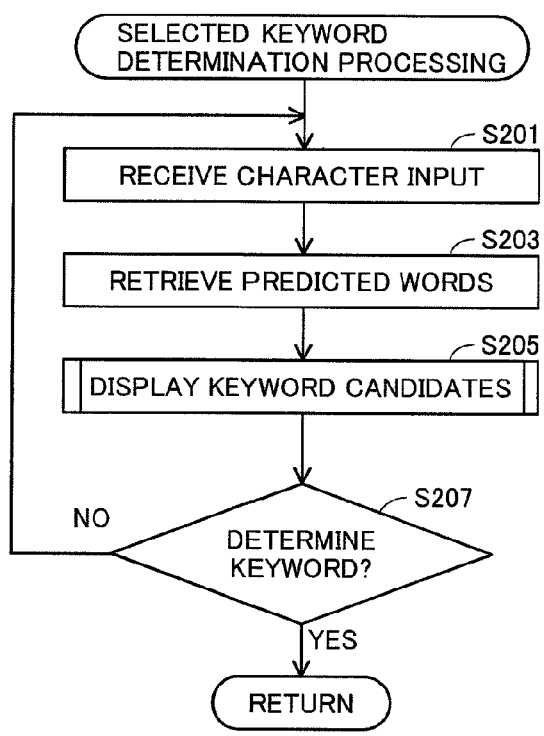
FIG. 48 is a flow chart showing the flow of a selective keyword determination operation executed by conversation assistance device 100 as a subroutine of the conversation assistance application.

FIG. 48 is a flow chart showing the flow of selective keyword determination processing performed by conversation assistance device 100 as a subroutine of the conversation assistance application.

With reference to FIG. 48, at step S201, processing unit 440 receives the character input instruction received by input unit 410, from input unit 410.

At step S203, processing unit 440 retrieves predicted words corresponding to the character input obtained at step S201 from predicted keyword list 428.

At step S205, processing unit 440 causes display unit 462 to display predicted words retrieved at step S203 as keyword candidates.

Figure 49:
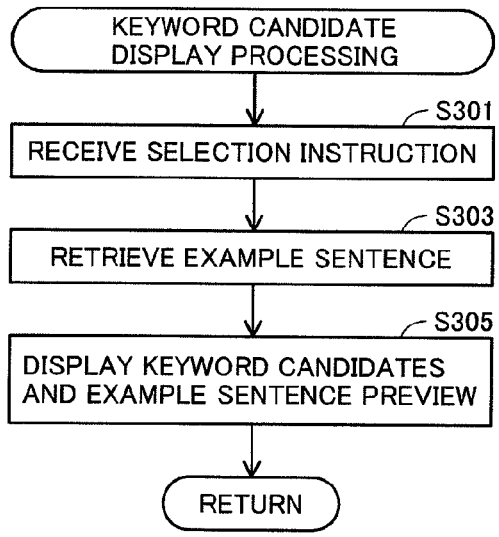
FIG. 49 is a flow chart showing the flow of a keyword candidate display operation executed by conversation assistance device 100 as a subroutine of the conversation assistance application.

Step S205 will now be described in detail with reference to FIG. 49. FIG. 49 is a flow chart showing the flow of keyword candidate display processing performed by conversation assistance device 100 as a subroutine of the conversation assistance application.

With reference to FIG. 49, at step S301, processing unit 440 receives an instruction to select a keyword candidate received by input unit 410, from input unit 410. More specifically, the selection instruction is an instruction in accordance with pressing down of up key 304a, down key 304b or the like.

At step S303, processing unit 440 retrieves an example sentence associated with the predicted word selected by the selection instruction received at step S301. Specifically, processing unit 440 obtains template number 510 associated with the predicted word selected based on index data 424. Processing unit 440 then retrieves template 500 having obtained template number 510 from template database 422.

At step S305, processing unit 440 causes display unit 462 to display keyword candidates and an example sentence preview that lists example sentences associated with the predicted word selected based on the instruction received at step S301. More specifically, processing unit 440 causes display in the example sentence preview, of typical word sentence (Japanese) 520 of template 500 retrieved at step S303. Processing unit 440 may cause display in the example sentence preview, of an example sentence with a variable section replaced by the selected predicted word.

After the processing at step S305, processing unit 440 returns the process to be performed to the process having invoked this keyword candidate display processing.

Referring to FIG. 48 again, processing unit 440 determines at step S207 whether input unit 410 has received an instruction on keyword determination. Specifically, processing unit 440 determines whether search/determination key 306 has been pressed down.

When a determination is made that input unit 410 has received the instruction on keyword determination (when determined as Yes at step S207), processing unit 440 determines a keyword selected when the determination instruction is received, as a selected keyword. Processing unit 440 then returns the process to be performed to the process having invoked this selected keyword determination processing.

When a determination is made that input unit 410 has not received the instruction on keyword determination (when determined as No at step S207), processing unit 440 repeats the processing from step S201.

Figure 50:
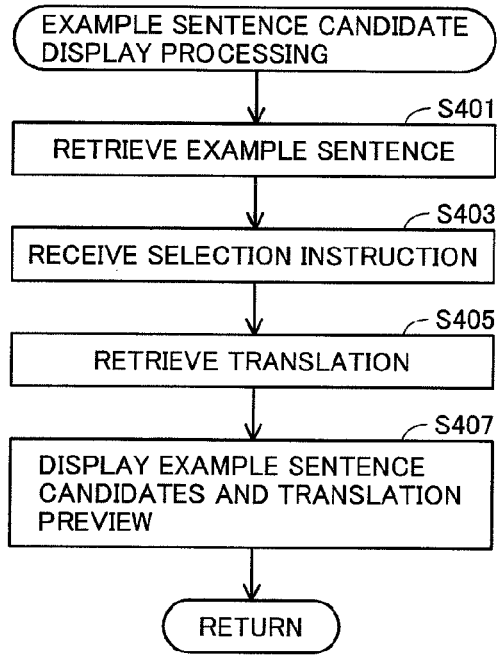
FIG. 50 is a flow chart showing the flow of an example sentence candidate display operation executed by conversation assistance device 100 as a subroutine of the conversation assistance application.

FIG. 50 is a flow chart showing the flow of example sentence candidate display processing performed by conversation assistance device 100 as a subroutine of the conversation assistance application.

With reference to FIG. 50, at step S401, processing unit 440 retrieves an example sentence associated with the selected keyword determined at step S103.

At step S403, processing unit 440 obtains an instruction, from input unit 410, to select the example sentence received by input unit 410. Without any selection instruction, processing unit 440 assumes that an instruction to select a default example sentence (e.g., the first example sentence in a search result) has been received.

At step S405, processing unit 440 retrieves, from template database 422, a translation of the example sentence designated by the selection instruction received at step S403.

At step S407, processing unit 440 causes display of the search result obtained at step S401 as example sentence candidates. Processing unit 440 causes display of the translation retrieved at step S405 as a translation preview.

Figure 51:
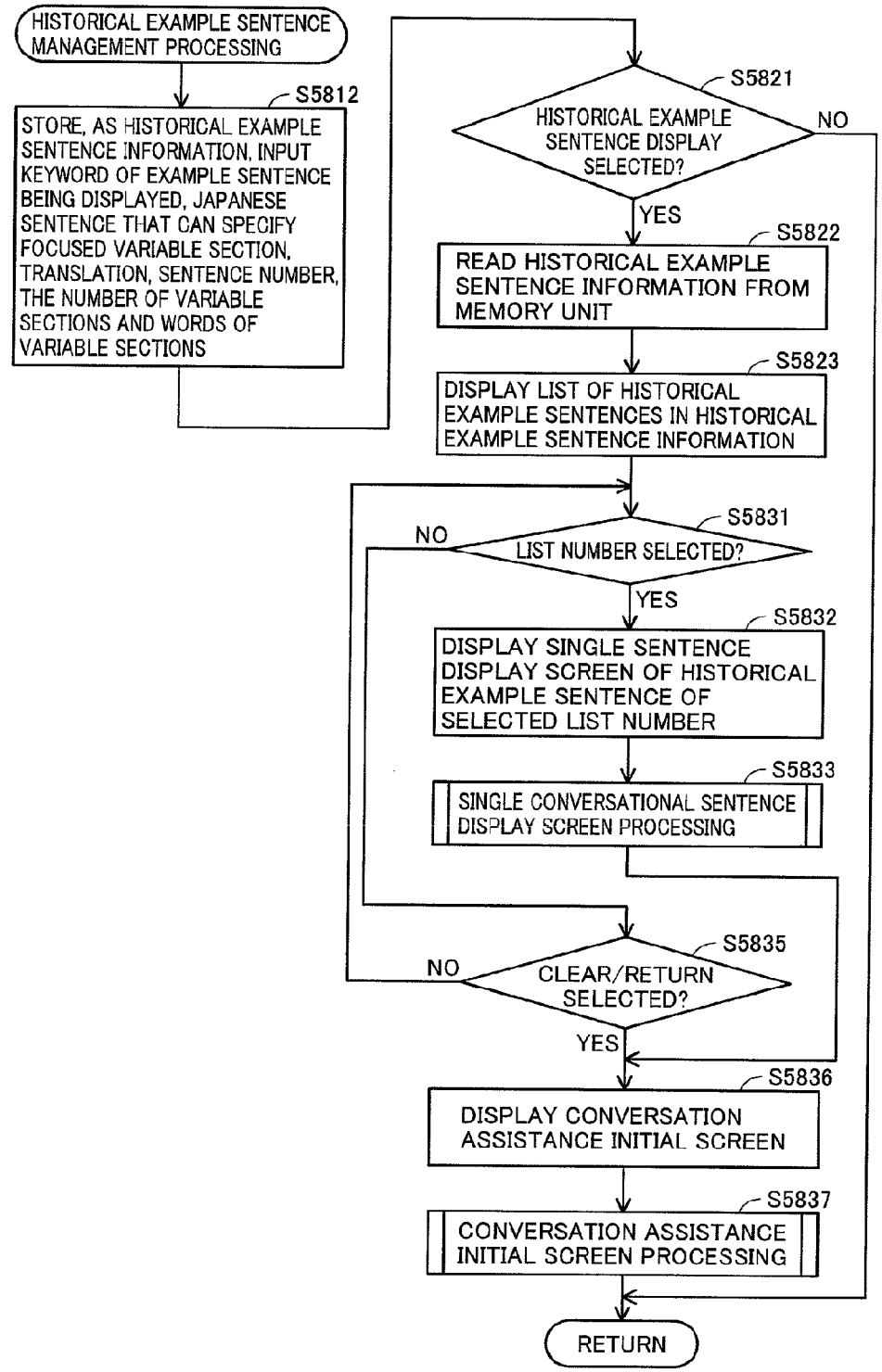
FIG. 51 is a flow chart showing the flow of a historical example sentence management operation executed by the conversation assistance device as a subroutine of the conversation assistance application.

FIG. 51 is a flow chart showing the flow of the historical example sentence management processing performed by conversation assistance device 100 as a subroutine of the conversation assistance application.

With reference to FIG. 51, at step S5812, processing unit 440 causes memory unit 420 to store an input keyword of an example sentence being displayed, the example sentence, its translation, the sentence number, the number of variable sections, words of variable sections (the number of words per variable section, the word number and the character string indicating a word per variable section) as historical example sentence information 432.

Then, at step S5821, processing unit 440 determines whether or not display of historical example sentences has been selected based on the instruction received by input unit 410. When a determination is made that display of historical example sentences has not been selected (when determined as No at step S5821), processing unit 440 returns the process to be performed to the process having invoked this historical example sentence management processing.

When a determination is made that the display of historical example sentences has been selected (when determined as Yes at step S5821), processing unit 440, at step S5822, reads a search result of example sentences in historical example sentence information 432 from memory unit 420 as historical example sentences. Then, at step S5823, processing unit 440 causes display unit 462 to display a list of read historical example sentences in historical example sentence information 432 such that a historical example sentence can be selected, as indicated in historical example sentence screen 5310 shown in FIG. 46. An instruction related to the display of historical example sentences may be implemented by means of a dedicated call button not shown, or the like.

Then, at step S5831, processing unit 440 determines whether or not a list number has been selected based on the instruction received by input unit 410.

When a determination is made that a list number has been selected (when determined as Yes at step S5831), processing unit 440 causes, at step S5832, display unit 462 to display a single conversational sentence display screen of a historical example sentence of the selected list number, as shown in the single conversational sentence display screen in FIG. 26.

Then, at step S5833, processing unit 440 performs single conversational sentence display screen processing which is the processing in the single conversational sentence display screen shown in FIG. 26. In the single conversational sentence display screen processing, when return key 308 or clear key 310 is pressed down to return the process to be performed to the main process, processing unit 440 advances the process to be performed to step S5836.

When a determination is made that a list number has not been selected (when determined as No at step S5831), processing unit 440 determines at step S5835 whether or not return key 308 or clear key 310 has been selected and pressed down. When a determination is made that neither return key 308 nor clear key 310 has been selected or pressed down (when determined as No at step S5835), processing unit 440 returns the process to be performed to the processing at step S5831.

When a determination is made that either return key 308 or clear key 310 has been selected and pressed down (when determined as Yes at step S5835), processing unit 440 advances the process to be performed to the processing at step S5836.

At step S5836, processing unit 440 causes display unit 462 to display initial screen 1020 of conversation assistance shown in FIG. 20. Then, at step S5837, processing unit 440 performs conversation assistance initial screen processing which is the processing in initial screen 1020.

In this manner, replacing a variable section based on historical example sentence information 432 facilitates obtaining and displaying various analogous example sentences. For example, if the number of example sentences in the search result of example sentences stored in historical example sentence information 432 is 1000, the average number of variable sections included in each example sentence is 3, and the average number of candidates per variable section is 100, then, 1000×100×100×100=1,000,000,000 example sentences can be obtained, which can improve convenience.

Figure 52:
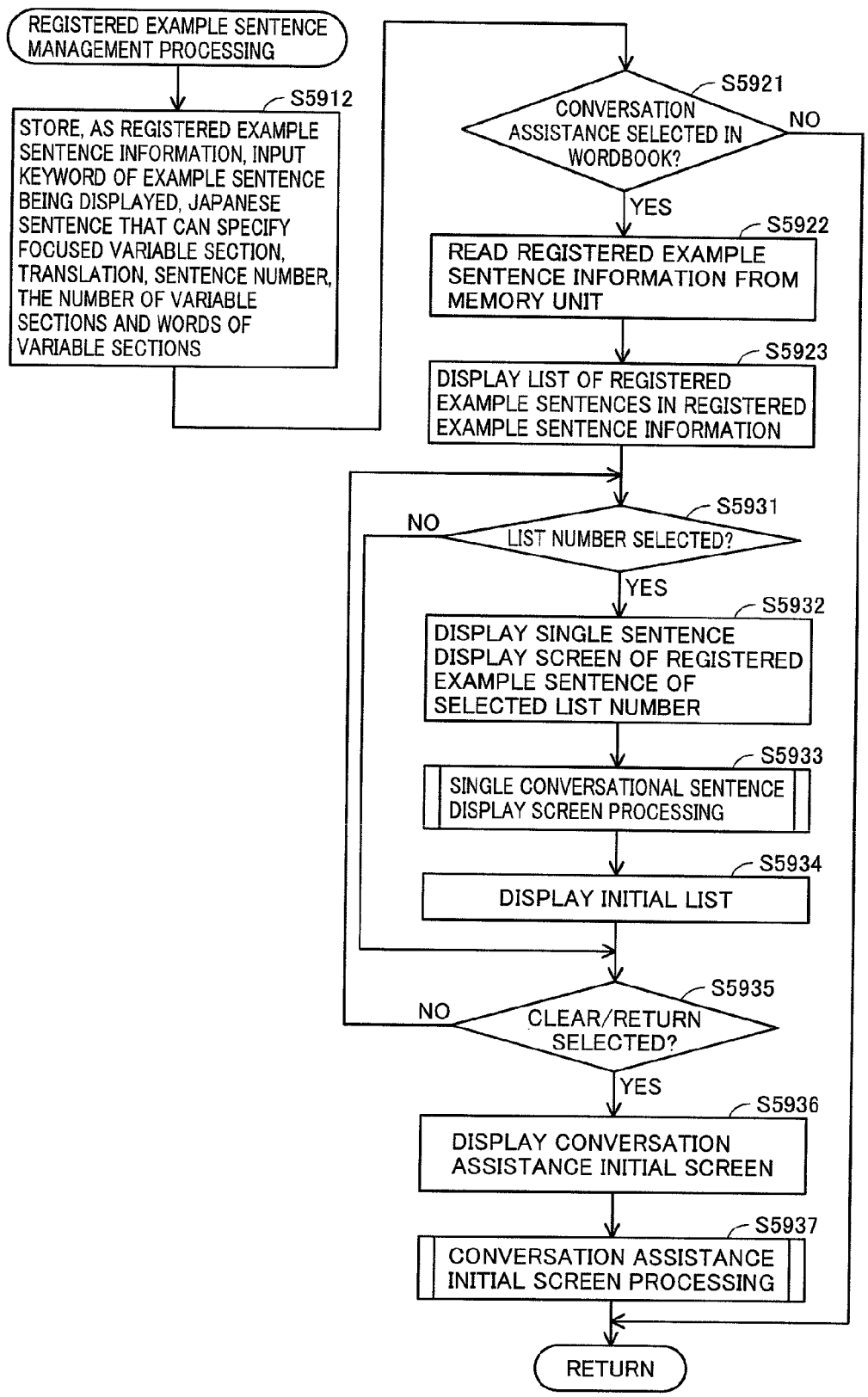
FIG. 52 is a flow chart showing the flow of a registered example sentence management operation executed by the conversation assistance device as a subroutine of the conversation assistance application.

FIG. 52 is a flow chart showing the flow of the registered example sentence management processing performed by conversation assistance device 100 as a subroutine of the conversation assistance application.

With reference to FIG. 52, at step S5912, processing unit 440 causes memory unit 420 to store an input keyword of an example sentence being displayed, the example sentence, its translation, the sentence number, the number of variable sections, words of variable sections (the number of words per variable section, the word number and the character string indicating a word per variable section) as registered example sentence information 430.

Then, at step S5921, processing unit 440 determines whether or not the "conversation assistance" application has been selected in a wordbook list screen of all applications in conversation assistance device 100, based on the instruction received by input unit 410. When a determination is made that "conversation assistance" has not been selected (when determined as No at step S5921), processing unit 440 returns the process to be performed to the process having invoked this registered example sentence management processing.

When a determination is made that the "conversation assistance" application has been selected (when determined as Yes at step S5921), processing unit 440 reads, at step S5922, a search result of example sentences in registered example sentence information 430 from memory unit 420 as registered example sentences. Then, at step S5923, processing unit 440 causes display unit 462 to display a list of the read registered example sentences in registered example sentence information 430 such that a registered example sentence can be selected, as shown in wordbook screen 5210 in FIG. 45.

Then, at step S5931, processing unit 440 determines whether or not a list number has been selected based on the instruction received by input unit 410.

When a determination is made that a list number has been selected (when determined as Yes at step S5931), processing unit 440 causes, at step S5932, display unit 462 to display a single sentence display screen of a registered example sentence of the selected list number, as shown in the single sentence display screen in FIG. 45.

Then, at step S5933, processing unit 440 performs the single conversational sentence display screen processing which is the processing in the single conversational sentence display screen shown in FIG. 26. In the single conversational sentence display screen processing, when return key 308 or clear key 310 is pressed down to return the process to be performed to the main process, processing unit 440 causes, at step S5934, display unit 462 to display again the initial list of registered example sentences, as shown in wordbook screen 5210 in FIG. 45.

When a determination is made that a list number has not been selected (when determined as No at step S5931) and after step S5934, processing unit 440 determines, at step S5935, whether or not return key 308 or clear key 310 has been selected and pressed down. When a determination is made that neither return key 308 nor clear key 310 has been selected or pressed down (when determined as No at step S5935), processing unit 440 returns the process to be performed to the processing at step S5931.

When a determination is made that either return key 308 or clear key 310 has been selected and pressed down (when determined as Yes at step S5935), processing unit 440 advances the process to be performed to the processing at step S5936.

At step S5936, processing unit 440 causes display unit 462 to display initial screen 1020 of conversation assistance shown in FIG. 20. Then, at step S5937, processing unit 440 performs the conversation assistance initial screen processing which is the processing in initial screen 1020.

In this manner, replacing a variable section based on registered example sentence information 430 facilitates displaying analogous example sentences. Replacing a variable section also facilitates displaying various example sentences. For example, if the number of example sentences in the search result of example sentences stored in registered example sentence information 430 is 1000, the average number of variable sections included in each example sentence is 3, and the average number of candidates per variable section is 100, then, 1000×100×100×100=1,000,000,000 example sentences can be obtained, which can improve convenience.

It should be construed that embodiments disclosed herein are by way of illustration in all respects, not by way of limitation. It is intended that the scope of the present invention is defined by claims, not by the description above, and includes all modifications equivalent in meaning and scope to the claims.

DESCRIPTION OF THE REFERENCE SIGNS 100 conversation assistance device, 110 input key, 120 handwriting pad, 130 display, 132 display controller, 140 speaker, 142 audio controller, 172 conversation assistance program, 180 hard disk, 210 first housing, 220 second housing, 230 stylus pen, 302 character key, 304 direction key, 304a up key, 304b down key, 304c right key, 304d left key, 306 determination key, 308 return key, 310 clear key, 312 back key, 314 conversation assistance key, 316 switch key, 318 audio key, 320 menu key, 322 preceding page key, 324 succeeding page key, 410 input unit, 420 memory unit, 422 template database, 423 dictionary, 424 index data, 425 keyword-category data, 426 category-template data, 428 predicted keyword list, 430 registered example sentence information, 432 historical example sentence information, 440 processing unit, 442 keyword selection unit, 443 prediction conversion unit, 444 example sentence selection unit, 446 translation output unit, 448 registered example sentence management unit, 449 historical example sentence management unit, 460 output unit, 462 display unit, 464 audio output unit, 500 template, 510 template number, 520 typical word sentence, 580 keyword, 612 Japanese input, 614 Japanese expression, 616 category number, 700 category list.

The invention claimed is:

1. An information processing device comprising:
   an input unit receiving a character input representing one of a plurality of expressions of a keyword;
   an output unit externally outputting information; and
   a memory unit storing data, wherein
   said data contains
      a plurality of stored keywords,
      a plurality of contents, each being stored in association with at least one of said plurality of stored keywords, and
      keyword data indicating each keyword of said plurality of stored keywords as being associated with a plurality of potential character inputs corresponding semantically to the keyword but differing in expression,
   said information processing device further comprising a processing unit that retrieves, from among said plurality of stored keywords based on said keyword data, a keyword stored in association with the plurality of potential character inputs which plurality includes the character input that was received by said input unit, and causes said output unit to output one of said plurality of contents corresponding to the retrieved keyword.

2. The information processing device according to claim 1, wherein
   each of said plurality of contents contains data for display of an associated one of said plurality of keywords and explanation data corresponding to the associated keyword, and
   said processing unit causes said output unit to output said data for display of the retrieved keyword and said explanation data of the retrieved keyword.

3. The information processing device according to claim 2, wherein
   said data for display contains an expression of one of said plurality of keywords, and
   said data for display of each of two or more of said plurality of keywords having said expression in common further contains data for distinction specific to each of said two or more of said plurality of keywords.

4. The information processing device according to claim 3, wherein
   said expression is a first language expression described in a first language,
   said explanation data is in a second language expression that expresses each of said plurality of keywords in a second language different from said first language, and
   said data for display of each of said two or more of said plurality of keywords having said first language expression in common and differing in said second language expression contains said first language expression and said data for distinction.

5. The information processing device according to claim 1, wherein
   each of said plurality of contents contains a first example sentence described in a first language and a second example sentence describing said first example sentence in a second language different from said first language, and
   said processing unit causes said output unit to output said first example sentence and said second example sentence corresponding to the retrieved keyword.

6. The information processing device according to claim 5, wherein each of said plurality of keywords corresponds to sentence end expressions of said first example sentence and said second example sentence.

7. The information processing device according to claim 1, wherein
   said keyword data associates one of said plurality of keywords with a plurality of partial character inputs, and
   when said input unit receives all of said plurality of partial character inputs, said processing unit retrieves the one of said plurality of keywords corresponding to said plurality of partial character inputs, and causes said output unit to output said content corresponding to the retrieved keyword.

8. An information processing method to be performed by an information processing device including a memory unit storing data, comprising the step of receiving a character input representing one of a plurality of expressions of a keyword, wherein
   said data contains
   a plurality of stored keywords,
   a plurality of contents, each being stored in association with at least one of said plurality of stored keywords, and
   keyword data indicating each keyword of said plurality of stored keywords as being associated with a plurality of potential character inputs corresponding semantically to the keyword but differing in expression,
   said information processing method further comprising the steps of:
   retrieving, from among said plurality of stored keywords based on said keyword data, a keyword stored in association with the plurality of potential character inputs which plurality includes the character input that was received; and
   outputting one of said plurality of contents corresponding to the retrieved keyword.

9. The information processing method according to claim 8, wherein each of said plurality of contents contains data for display of an associated one of said plurality of keywords and explanation data corresponding to the associated keyword,
   said information processing method further comprising the step of outputting said data for display of the retrieved keyword and said explanation data of the retrieved keyword.

10. The information processing method according to claim 8, wherein each of said plurality of contents contains a first example sentence described in a first language and a second example sentence describing said first example sentence in a second language different from said first language,
  said information processing method further comprising the step of outputting said first example sentence and said second example sentence corresponding to the retrieved keyword.

11. The information processing method according to claim 8, wherein
  said keyword data associates one of said plurality of keywords with a plurality of partial character inputs, and
  in said step of retrieving one of said plurality of keywords, when all of said plurality of partial character inputs are received, the one of said plurality of keywords corresponding to said plurality of partial character inputs is retrieved.

* * * * *